United States Patent
Ryan et al.

(10) Patent No.: US 6,506,873 B1
(45) Date of Patent: *Jan. 14, 2003

(54) DEGRADABLE POLYMER FIBERS; PREPARATION PRODUCT; AND, METHODS OF USE

(75) Inventors: Christopher Michael Ryan, Maple Grove; Nancy Uzelac Buehler, Minneapolis, both of MN (US); Scott Louis Gessner, Encinitas, CA (US); Andrea Lee Brosch, Eden Prairie, MN (US)

(73) Assignee: Cargill, Incorporated, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/072,326

(22) Filed: May 4, 1998

Related U.S. Application Data

(63) Continuation of application No. 08/850,319, filed on May 2, 1997, now abandoned.

(51) Int. Cl.$^7$ .............................................. C08G 63/08
(52) U.S. Cl. .................. 528/354; 528/328; 525/419; 525/410; 442/364; 442/365; 442/409; 442/414; 264/171.11; 264/172.11; 264/172.15
(58) Field of Search ................................. 528/354, 328; 525/419, 410; 442/364, 365, 409, 414; 264/171.11, 172.11, 172.15

(56) References Cited

U.S. PATENT DOCUMENTS

| | | |
|---|---|---|
| 4,442,062 A | 4/1984 | Fujii et al. |
| 5,010,145 A | 4/1991 | Ikada et al. |
| 5,142,023 A | 8/1992 | Gruber et al. |

(List continued on next page.)

FOREIGN PATENT DOCUMENTS

| | | |
|---|---|---|
| EP | 0 597 427 | 5/1994 |
| EP | 637641 | 2/1995 |
| EP | 0 669 358 | 8/1995 |
| EP | 723043 | 7/1996 |
| EP | 731198 | 9/1996 |

(List continued on next page.)

OTHER PUBLICATIONS

Matsui, M., "Biodegradable fibers made of poly-lactic acid", *Chemical Fibers International*, 46(5):318 (Oct. 1996).

R. M. Ikeda, Shrinkage Measurements of Stress-Induced Crystallization in Oriented Amorphous Pet, Journal of Polymer Science: Polymers Letters Edition, v. 18, pp. 325-331 (1980).

W. Hoogsteen et al., Crystal Structure, Conformation, and Morphology of Solution-Spun Poly(L-lactide) Fibers, Macromolecules, v. 23, pp. 634-642 (1990).

(List continued on next page.)

*Primary Examiner*—Duc Truong
(74) *Attorney, Agent, or Firm*—Merchant & Gould P.C.

(57) ABSTRACT

The present invention relates to a fibrous material which includes a plurality of polylactide containing fibers. The plurality of polylactide containing fibers can be considered low shrinkage or high shrinkage. The plurality of polylactide containing fibers are considered low shrinkage fibers if they provide a boiling water shrinkage propensity of less than about 20%. The plurality of polylactide containing fibers are considered high shrink fibers if they provide an average fiber boiling water shrinkage propensity of greater than about 10% and a heat of fusion of less than about 25 J/g. The invention additionally relates to the use of an extrusion process to provide low shrinkage fibers and high shrinkage fibers. The invention further relates to the use of these fibers in desirable products.

52 Claims, 23 Drawing Sheets

Melt Spinning Process

U.S. PATENT DOCUMENTS

| | | |
|---|---|---|
| 5,180,765 A | 1/1993 | Sinclair |
| 5,216,050 A | 6/1993 | Sinclair |
| 5,247,059 A | 9/1993 | Gruber et al. |
| 5,252,642 A | 10/1993 | Sinclair et al. |
| 5,274,073 A | 12/1993 | Gruber et al. |
| 5,294,469 A | 3/1994 | Suzuki et al. |
| 5,338,822 A | 8/1994 | Gruber et al. |
| 5,391,423 A | 2/1995 | Wunk et al. |
| 5,424,346 A | 6/1995 | Sinclair |
| 5,437,918 A | 8/1995 | Taniguchi et al. |
| 5,444,113 A | 8/1995 | Sinclair et al. |
| 5,475,080 A | 12/1995 | Gruber et al. |
| 5,484,881 A | 1/1996 | Gruber et al. |
| 5,502,158 A | 3/1996 | Sinclair et al. |
| 5,525,706 A | 6/1996 | Gruber et al. |
| 5,536,807 A | 7/1996 | Gruber et al. |
| 5,545,371 A | 8/1996 | Lu |
| 5,567,510 A | 10/1996 | Patnode et al. |
| 5,594,095 A | 1/1997 | Gruber et al. |

FOREIGN PATENT DOCUMENTS

| | | |
|---|---|---|
| EP | 747065 | 12/1996 |
| EP | 765959 | 2/1997 |
| FR | 2725731 | 4/1996 |
| FR | 2732196 | 4/1996 |
| JP | 07008520 | 1/1995 |
| JP | 07133569 | 5/1995 |
| JP | 08283558 | 10/1996 |
| JP | 9077124 | 3/1997 |
| JP | 9077863 | 3/1997 |
| JP | 9095605 | 4/1997 |
| JP | 9095847 | 4/1997 |
| JP | 9095852 | 4/1997 |
| WO | WO 90/01521 | 2/1990 |
| WO | WO 92/04412 | 3/1992 |
| WO | WO 92/04413 | 3/1992 |
| WO | WO 94/06856 | 3/1994 |
| WO | WO 94/08078 | 4/1994 |
| WO | WO 96/30576 | 10/1996 |

OTHER PUBLICATIONS

S. D. Long et al., Shrinkage Force Studies of Oriented Polyethylene Terephthalate, Journal of Applied Polymer Science, v. 42, 1921–1929 (1991).

P. B. Rim et al., Properties of PET Fibers with High Modulus and Low Shrinkage (HMLS). I. Yarn Properties and Morphology, Journal of Applied Polymer Science, v. 42, pp. 1807–1813 (1991).

S. R. Malkan et al., A Review on Melt Blowing Technology, INB Nonwovens, pp. 46–52 (Feb. 1991).

S. R. Malkan et al., A Review of Melt Blowing Technology (Part II), INB Nonwovens, pp. 22–28 (Mar. 1991).

S. R. Malkan et al., A Review on SpunbondTechnology Part I, INB Nonwovens, pp. 4–14 (Mar. 1992).

Seung Jin Kim et al., Effects of Textile Processing and Fabric Structural Parameters to the Physical Properties of New Synthetic Fabrics, Journal of the Korean Fiber Society, v. 32, No. 8, pp. 760–765 (1995).

S. R. Malkan, An Overview of Spunbonding and Meltblowing Technologies, Tappi Journal, v. 78, No. 6, pp. 185–190 (Jun. 1995).

Dr. Ronald Smorada, Spunbonded and Melt Blown Nonwovens: The Basics, Nonwovens Industry, pp. 48–56 (Oct. 1996).

H. R. Borkar, Effect of Spinning Speed on Physical Properties and Dyability of Polyester Filaments, pp. 31–37.

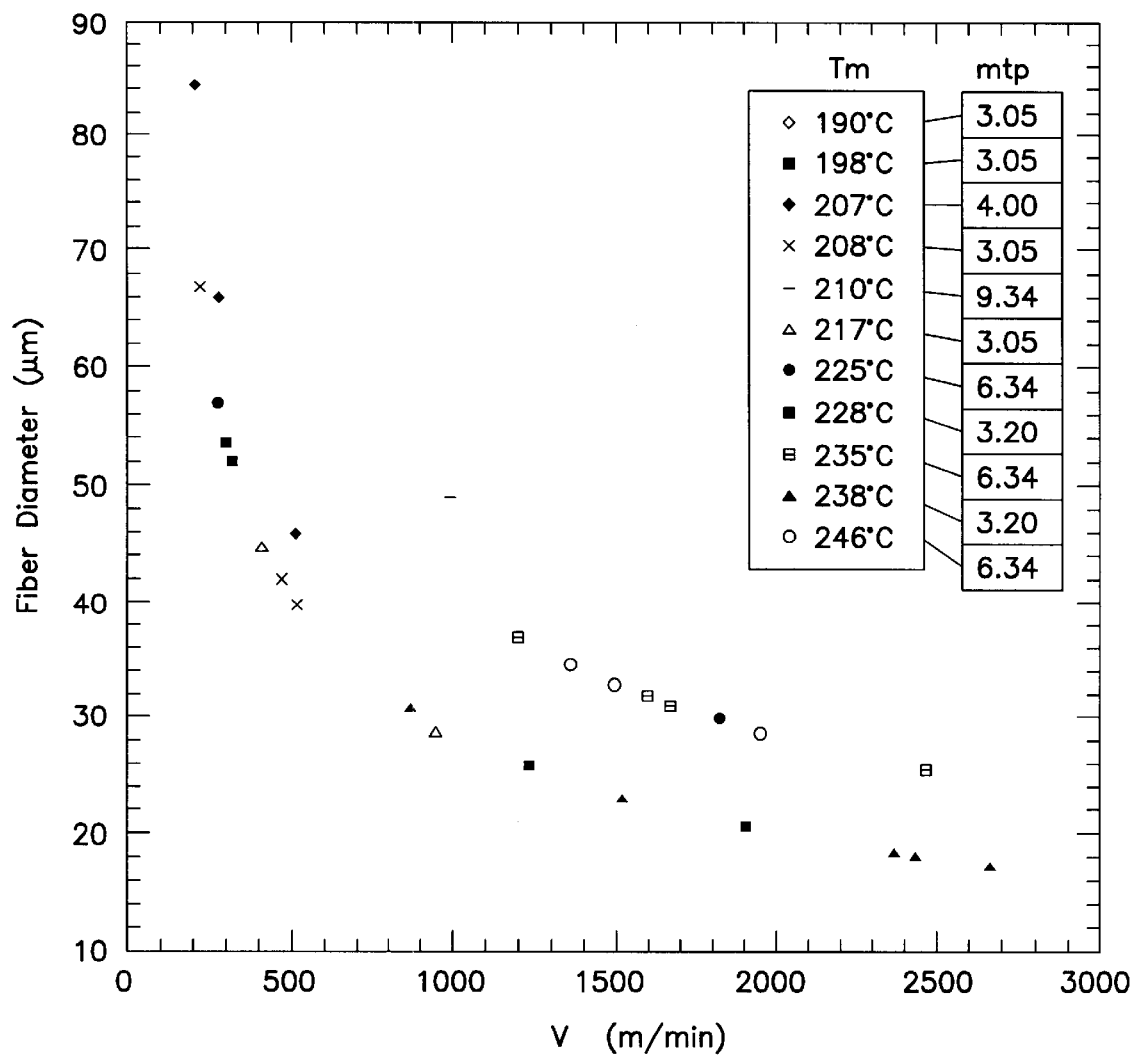
FIG. 7 Fiber diameter as a function of take-up velocity (V) for different melt temperature (Tm) and melt throuhput (mtp).

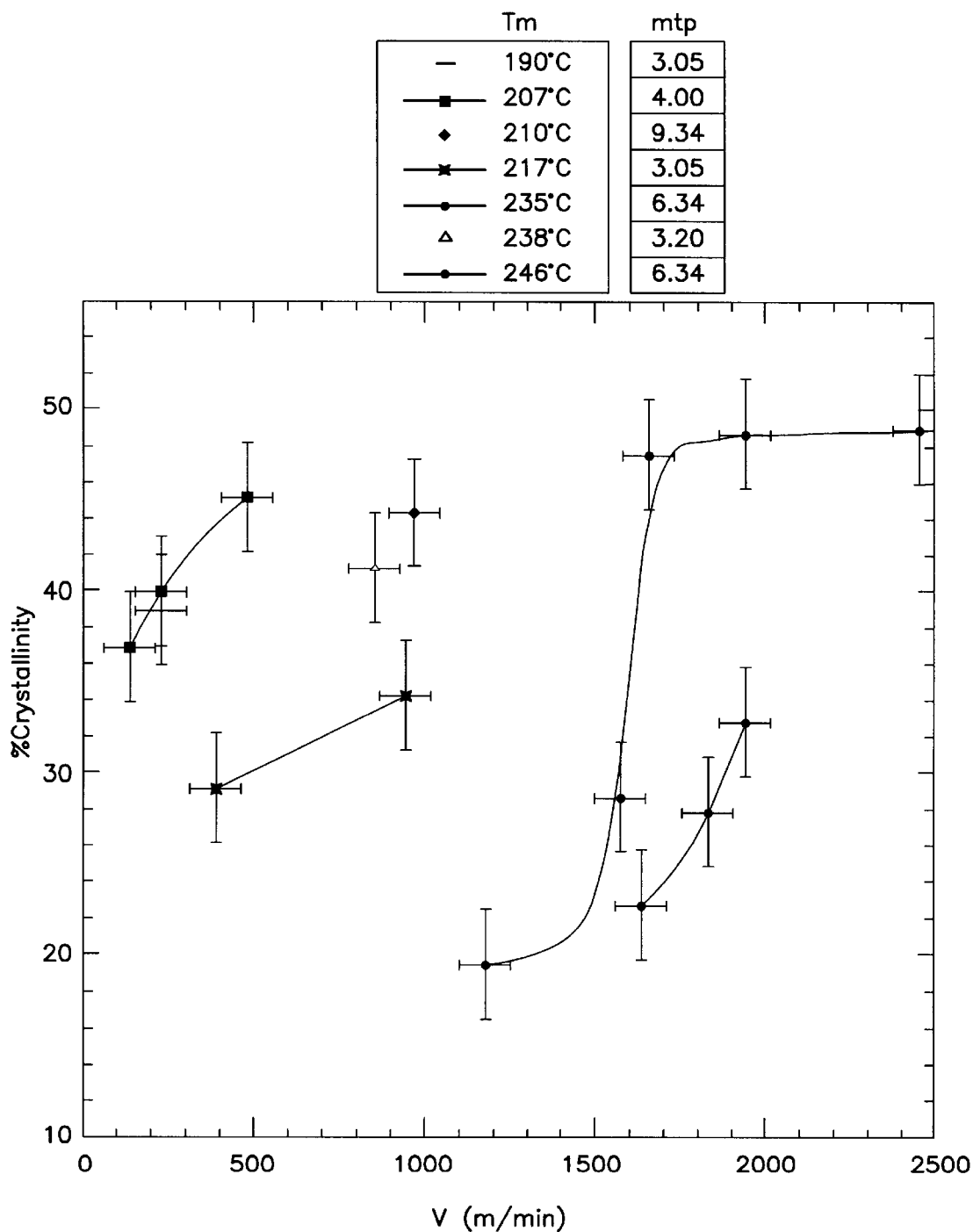
FIG. 8 Amount of crystallinity as a function of take-up velocity (V) for different melt temperature (Tm) and melt throughput (mtp).

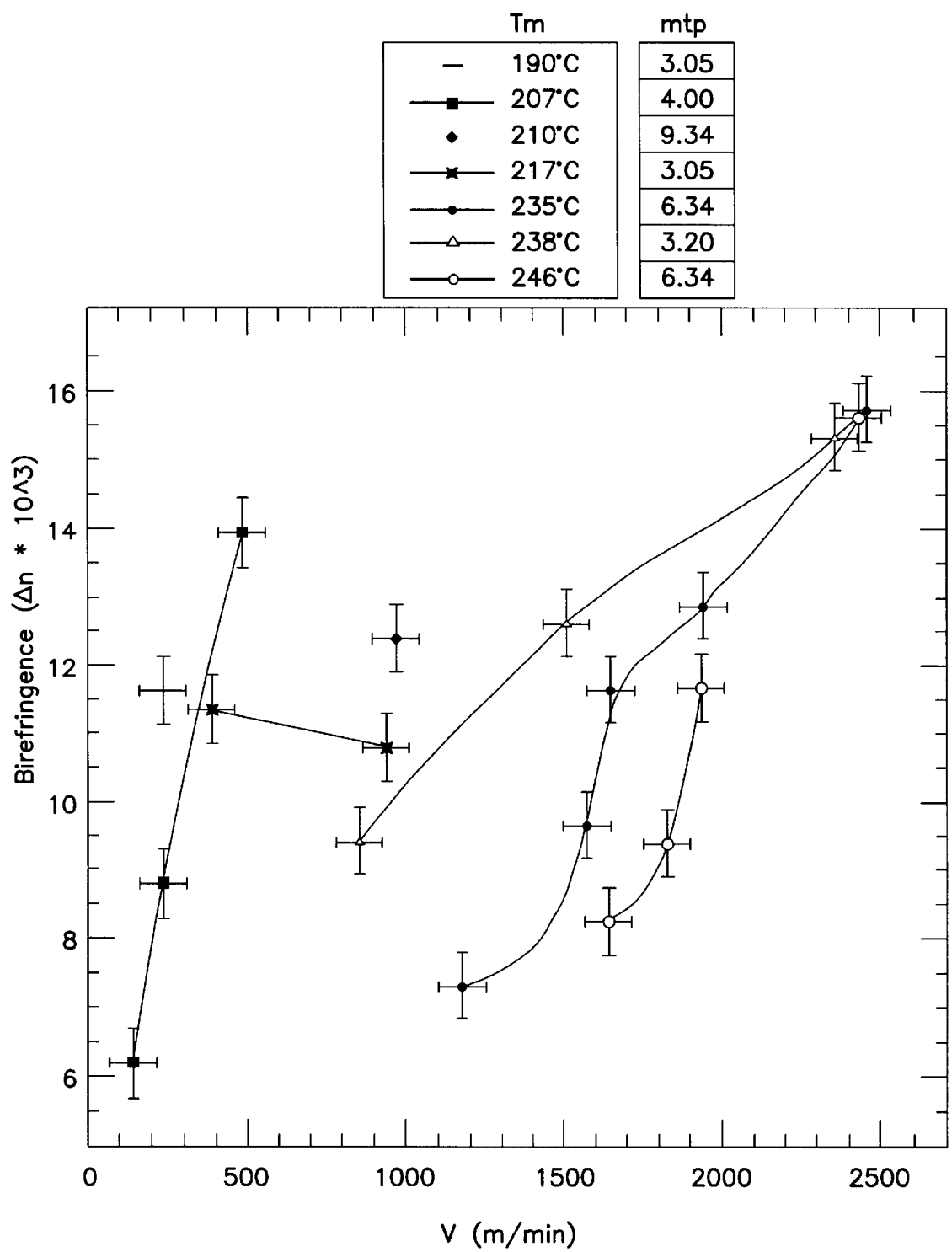
FIG. 9 Fiber birefringence as a function of take-up velocity (V) for different melt temperature (Tm) and melt throughput (mtp).

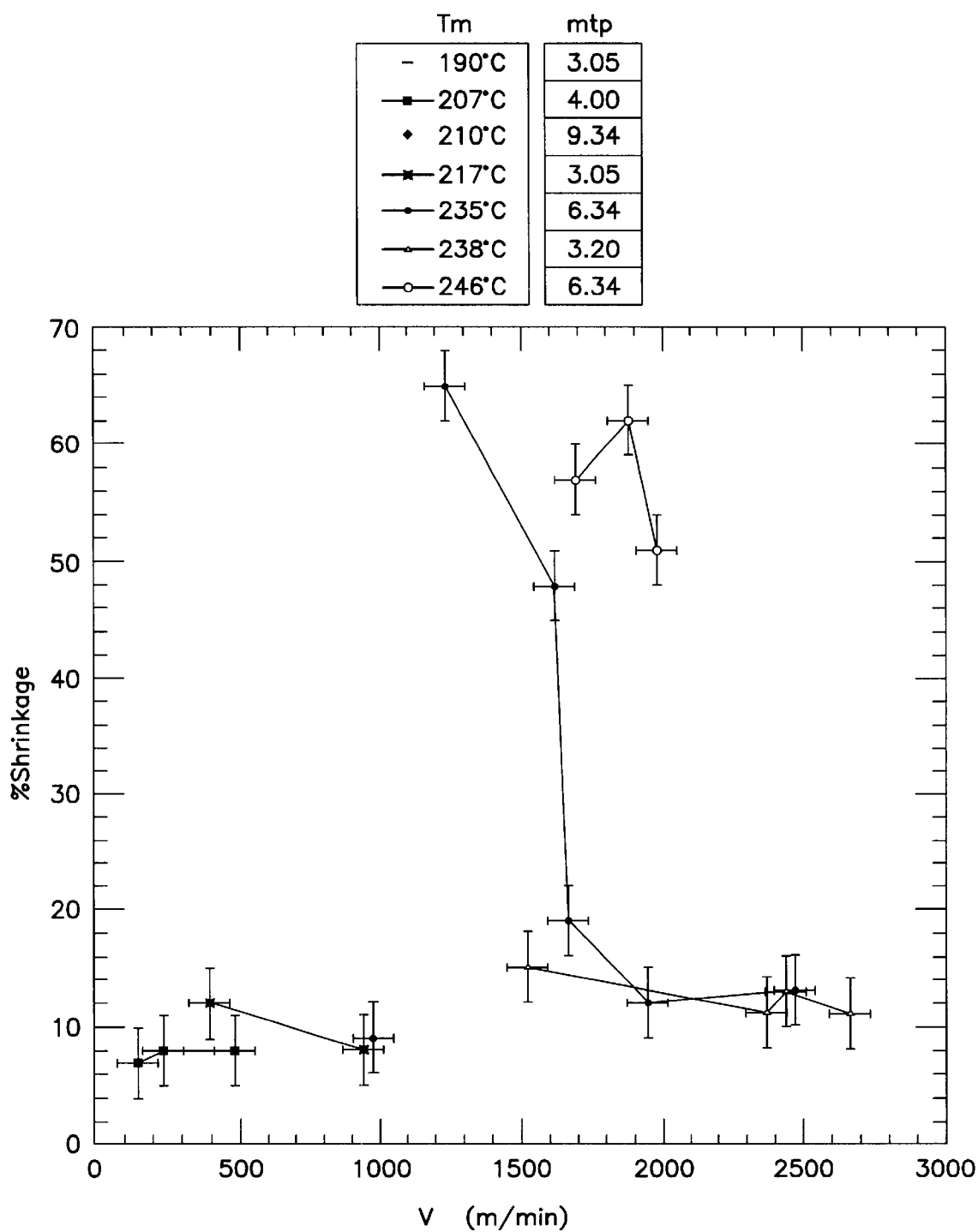
FIG. 10 Amount of shrinkage as a function of take-up velocity (V) for different melt temperature (Tm) and melt throughput (mtp).

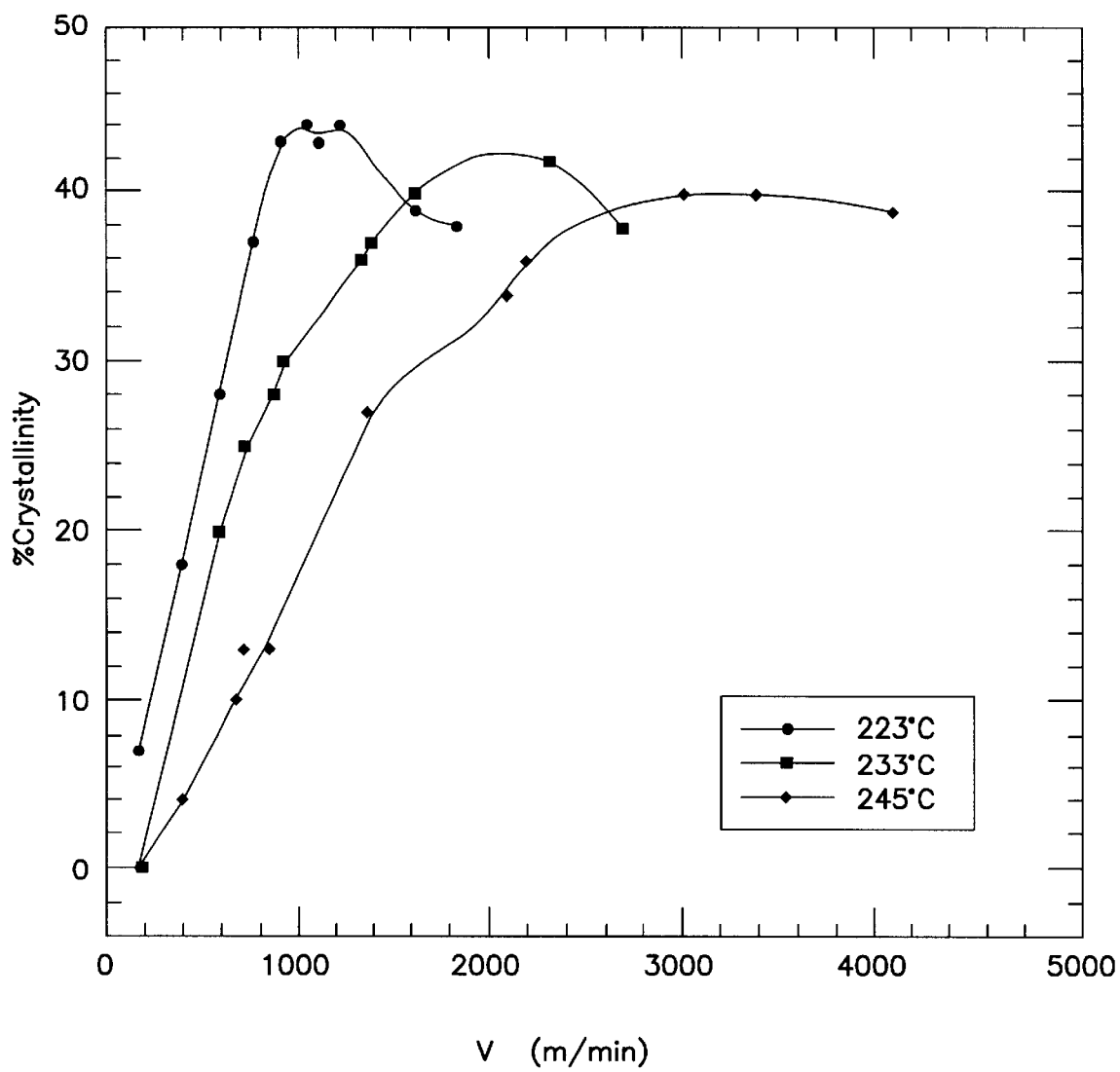
FIG. 11 Amount of crystallinity as a function of take-up velocity (V) for different melt temperatures (223, 233, and 245°C) and constant melt throughput of 2.95 g/min or 0.74 g/min/hole.

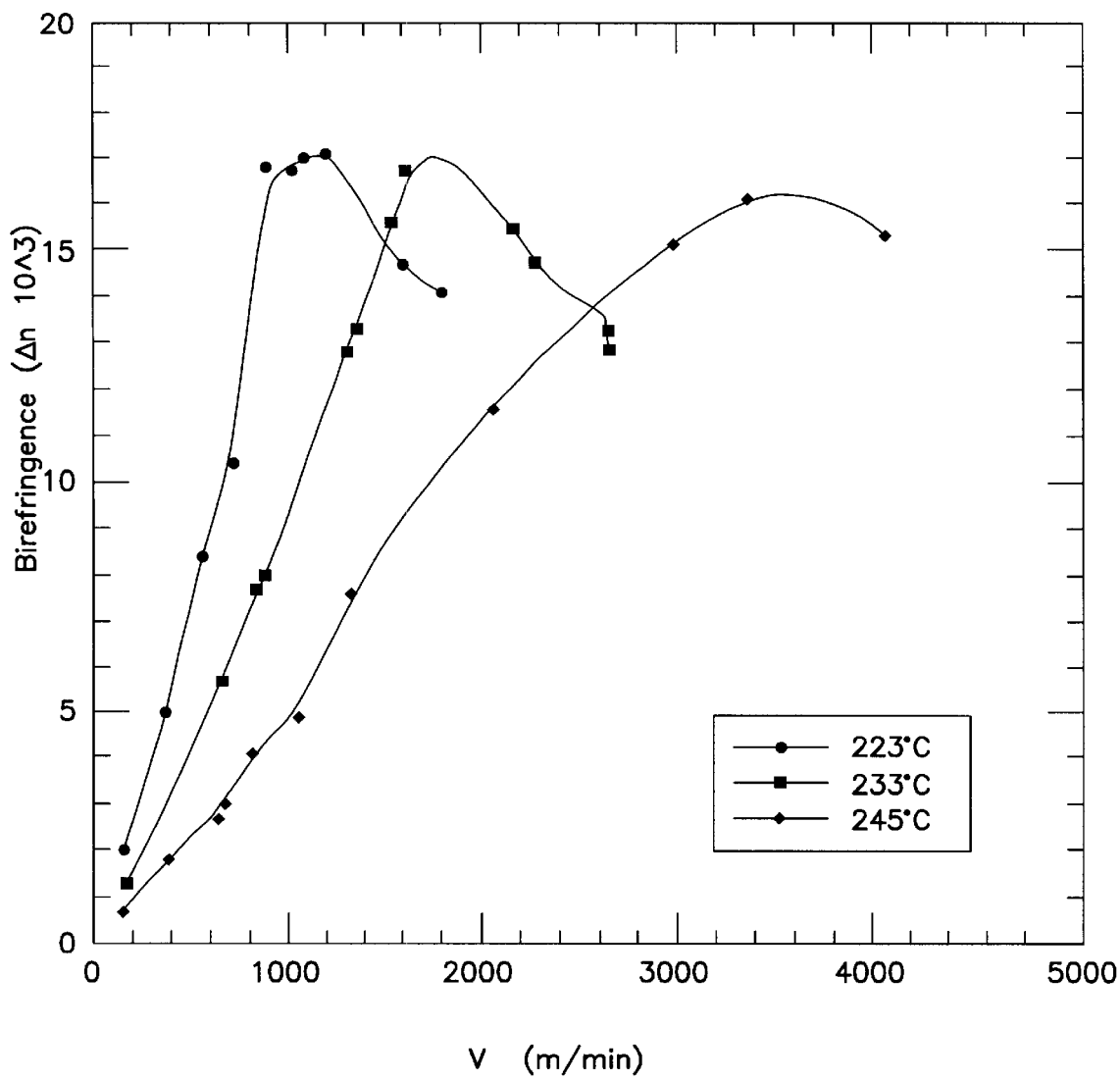
FIG. 12 Fiber birefringence as a function of take-up velocity (V) for different melt temperatures (223, 233, and 245°C) and constant melt throughput of 2.95 g/min or 0.74 g/min/hole.

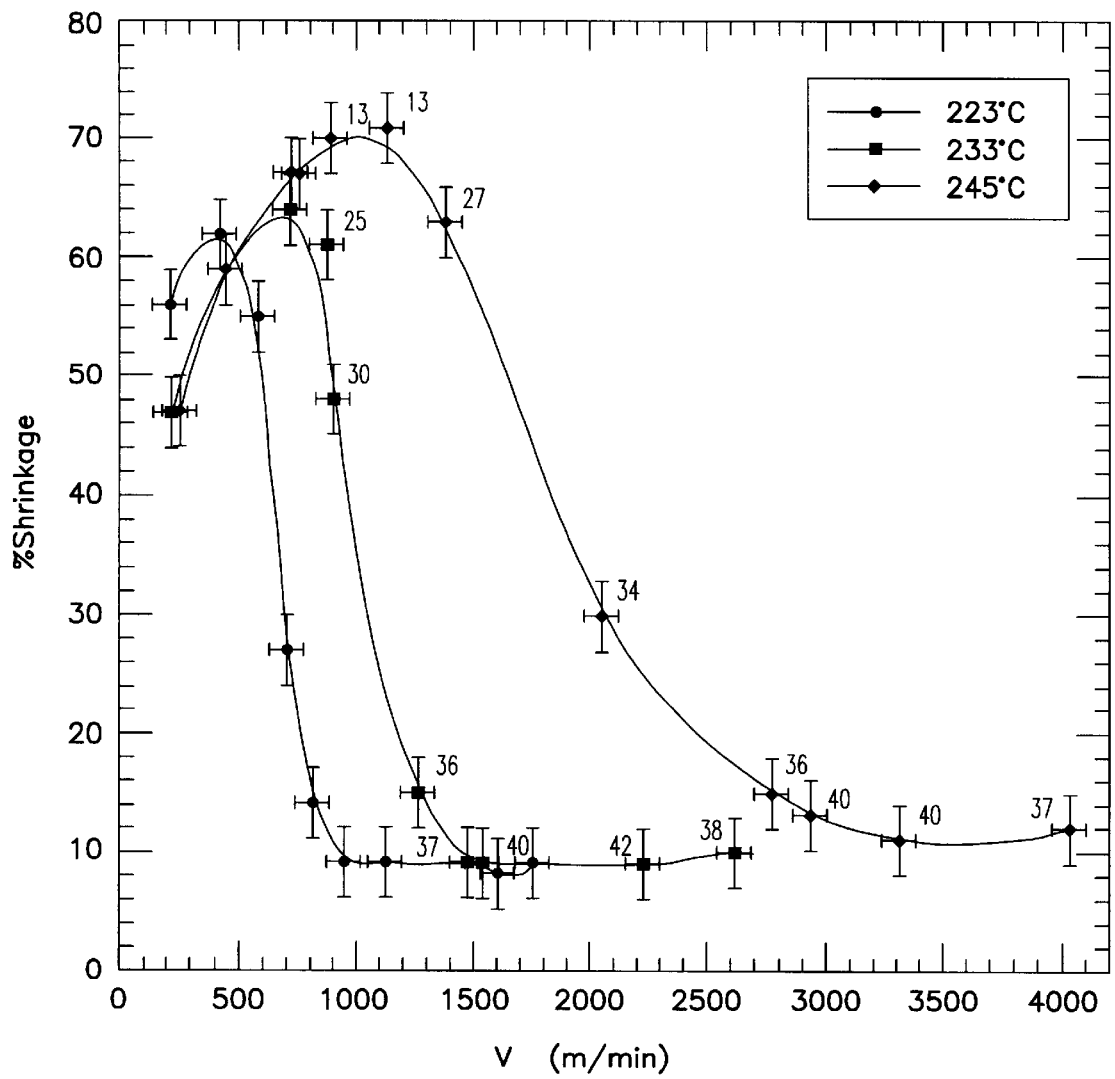
FIG. 13 Amount of shrinkage as a function of take-up velocity (V) for different melt temperatures (223, 233 and 245°C) and constant melt throughput of 2.95 g/min or 0.74 g/min/hole.

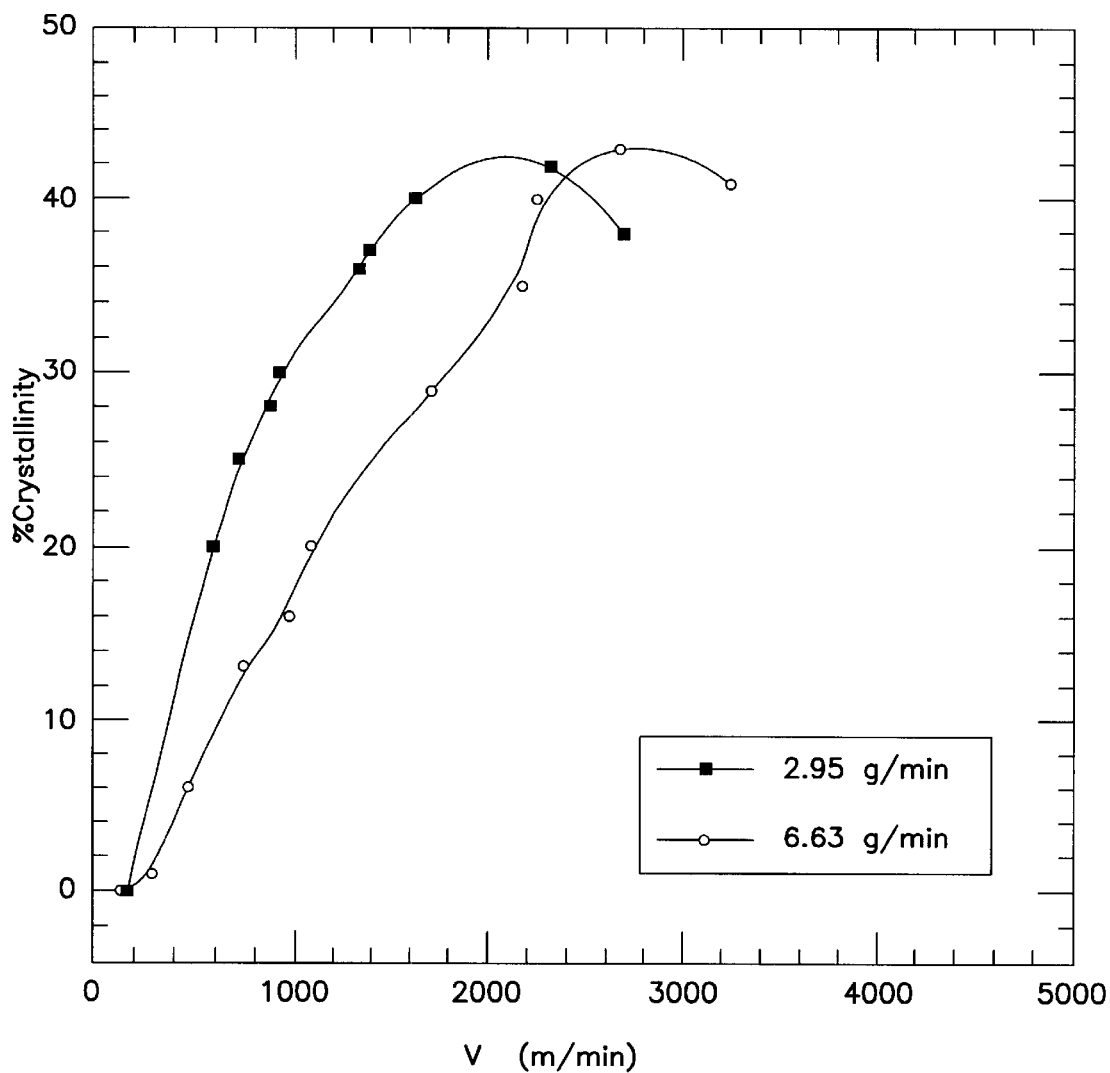
FIG. 14 Amount of crystallinity as a function of take-up velocity (V) for different melt throughput (2.95 and 6.63 g/min or 0.74, and 1.66 g/min/hole) and constant melt temperatures of 233°C.

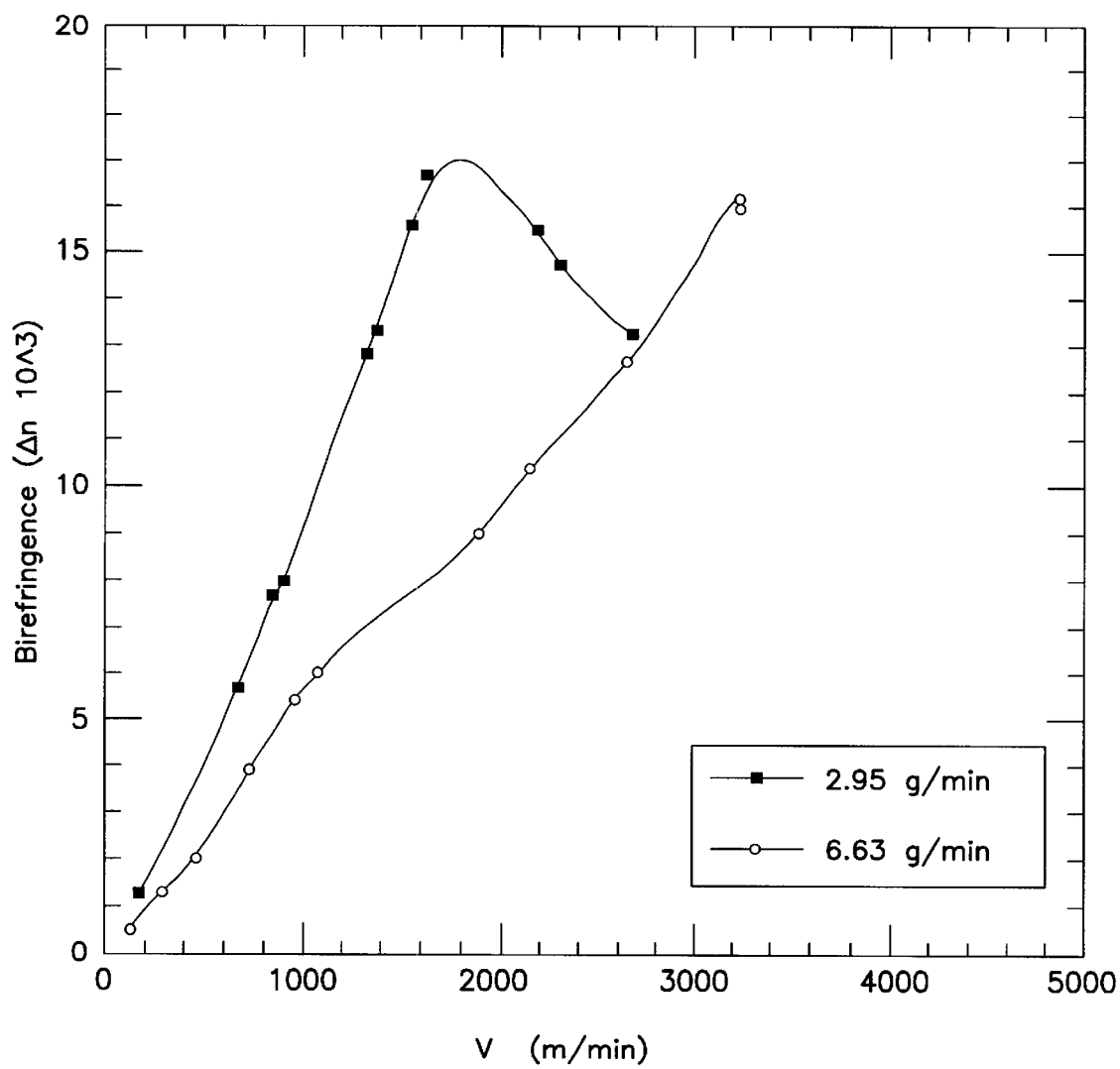
FIG. 15 Fiber birefringence as a function of take-up velocity (V) for different melt throughput (2.95 and 6.63 g/min or 0.74, and 1.66 g/min/hole) and constant melt temperatures of 233°C.

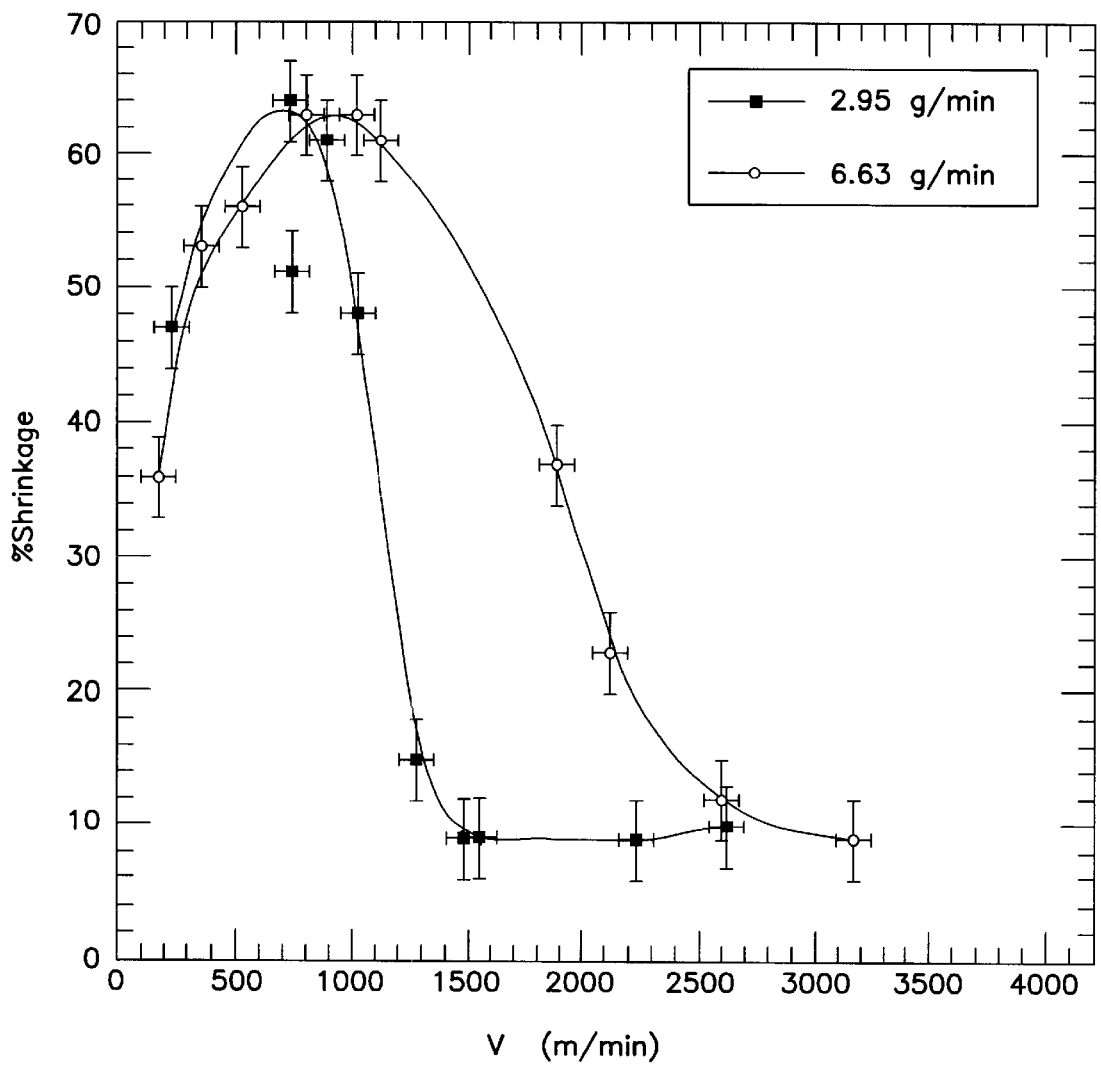
FIG. 16 Amount of shrinkage as a function of take-up velocity (V) for different melt throughput (2.95 and 6.63 g/min or 0.74, and 1.66 g/min/hole) and constant melt temperatures of 233°C.

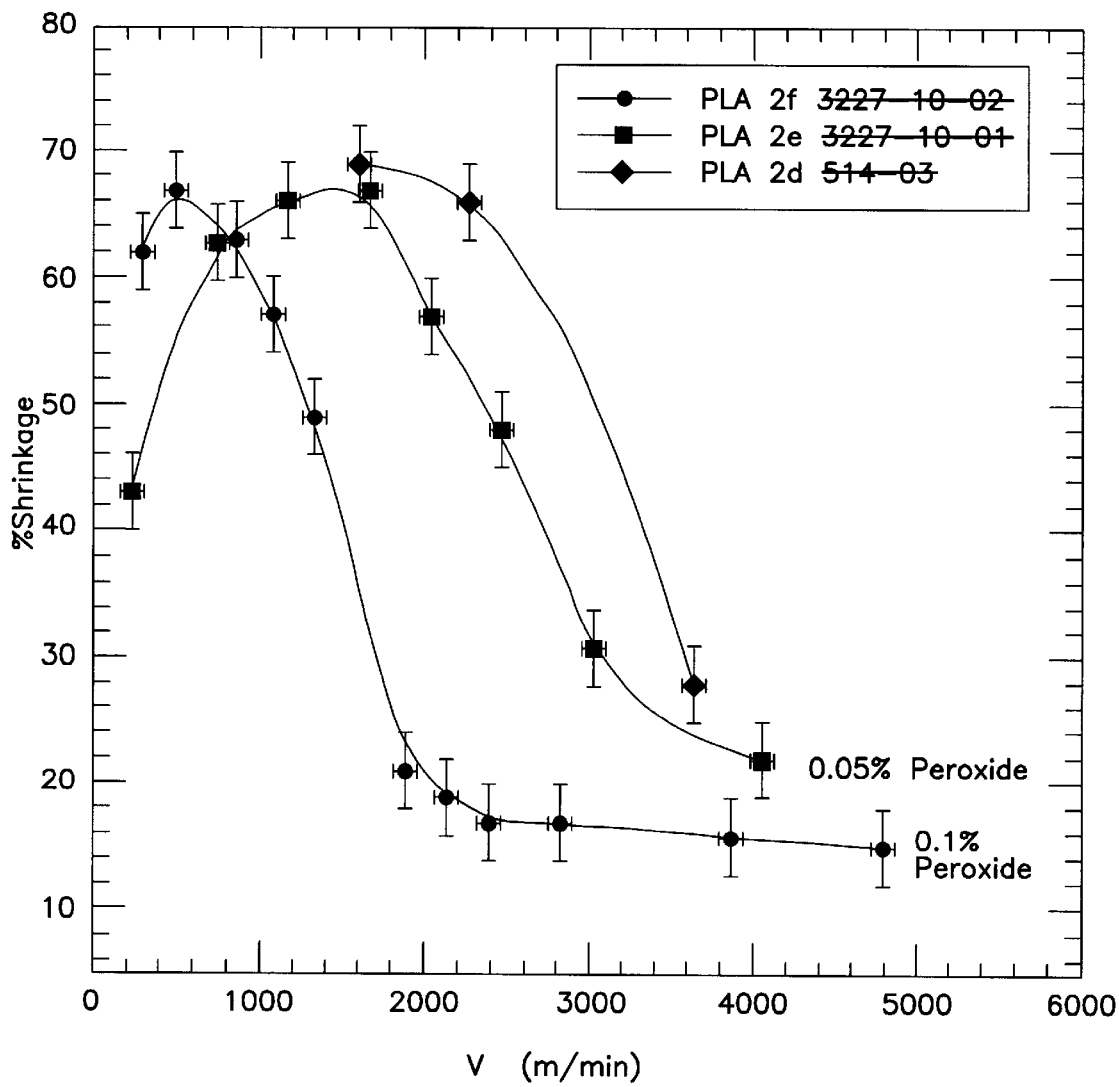
FIG. 17 Effect of crosslinking on %shrinkage. Melt temperature is 233°C, and mass throughput is 2.85 g/min (0.71 g/min/hole).

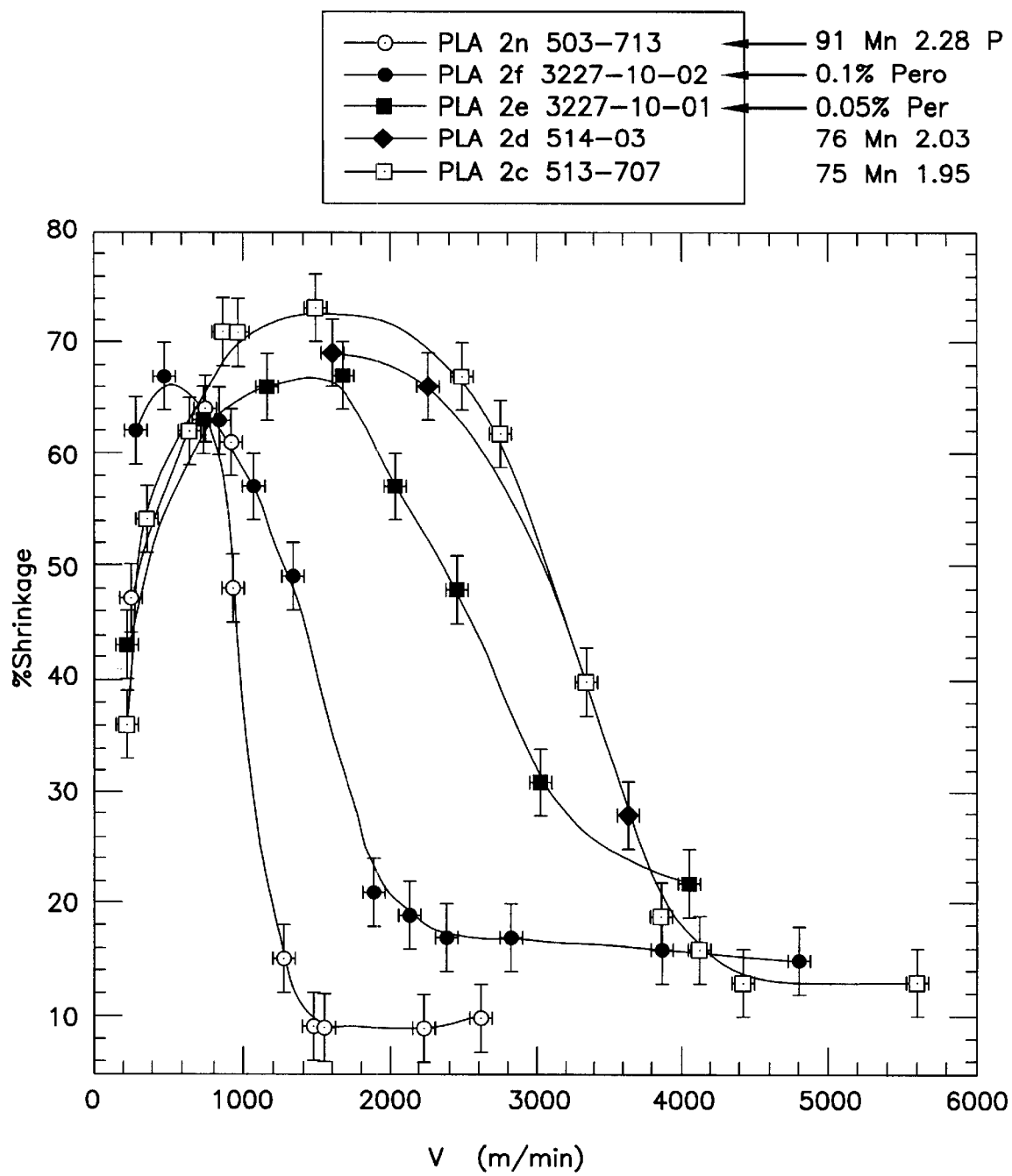
FIG. 18 Shrinkage as a function of take-up velocity (V) for different polymers. Melt temperature is 233°C, and mass throughput is 2.85 g/min (0.71 g/min/hole).

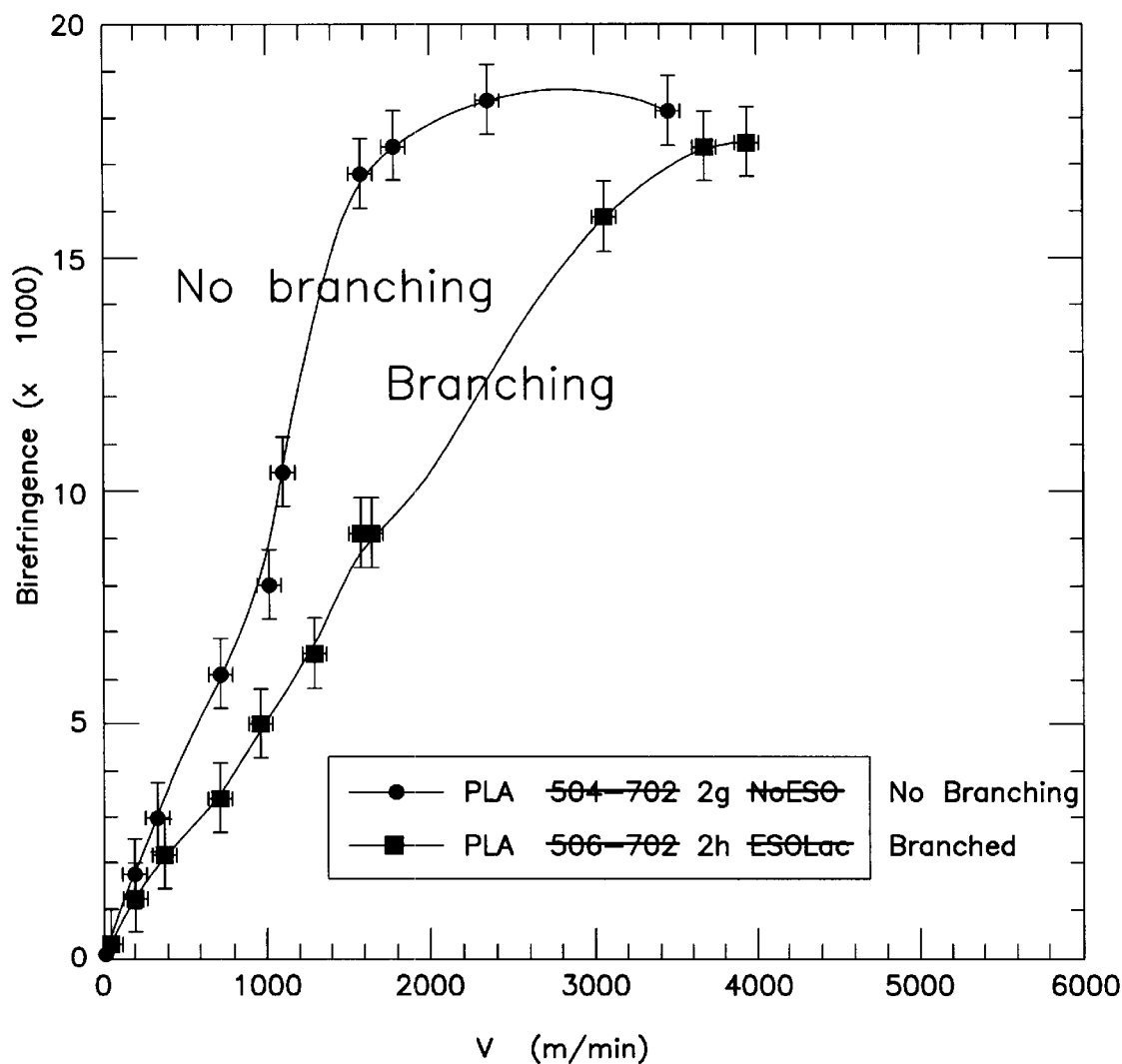
FIG. 19 Effect of branching on fiber birefringence. Melt temperature is 233°C, and mass throughput is 2.85 g/min (0.71 g/min/hole).

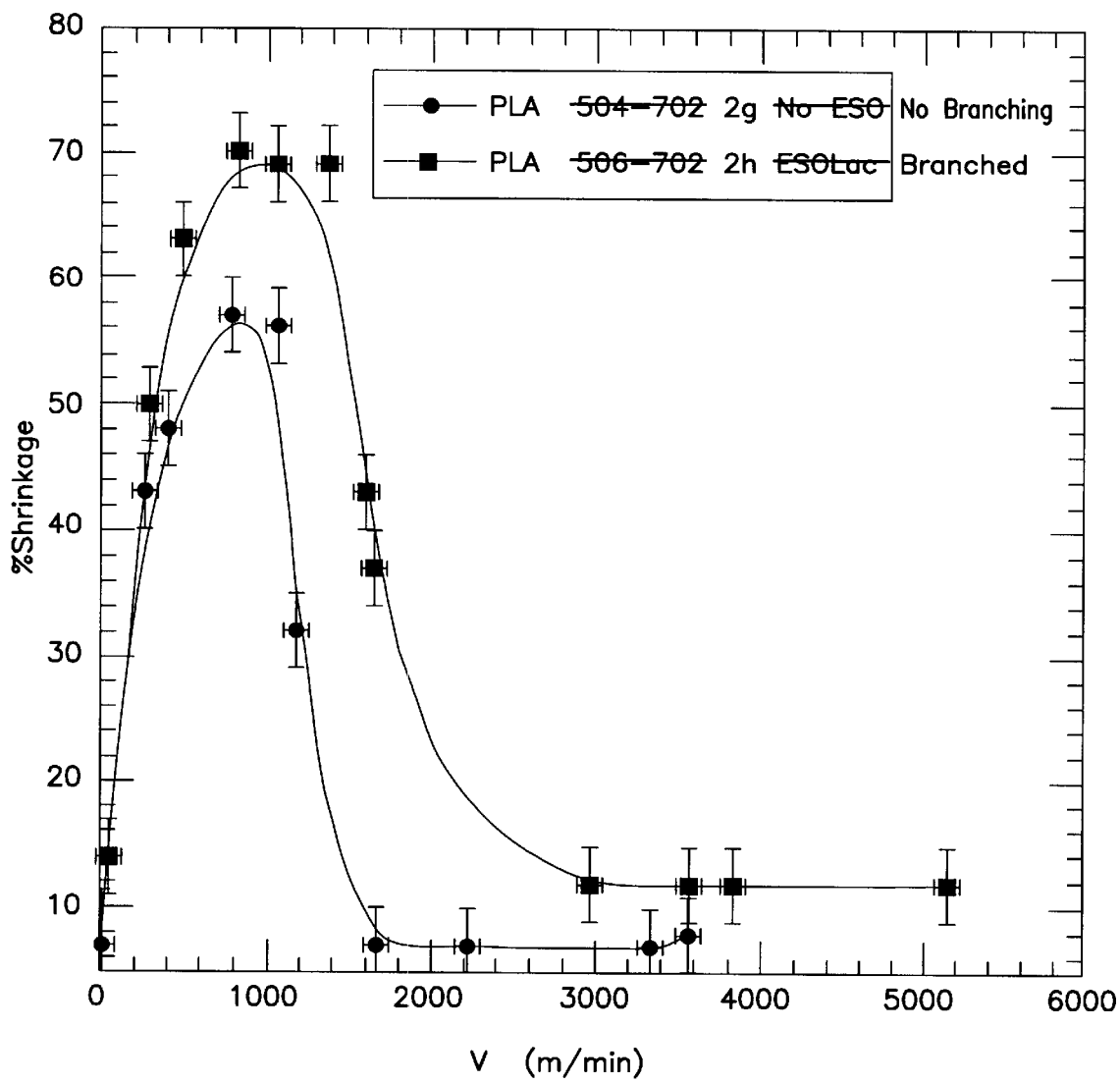
FIG. 20 Effect of branching on %shrinkage. Melt temperature is 233°C, and mass throughput is 2.85 g/min (0.71 g/min/hole).

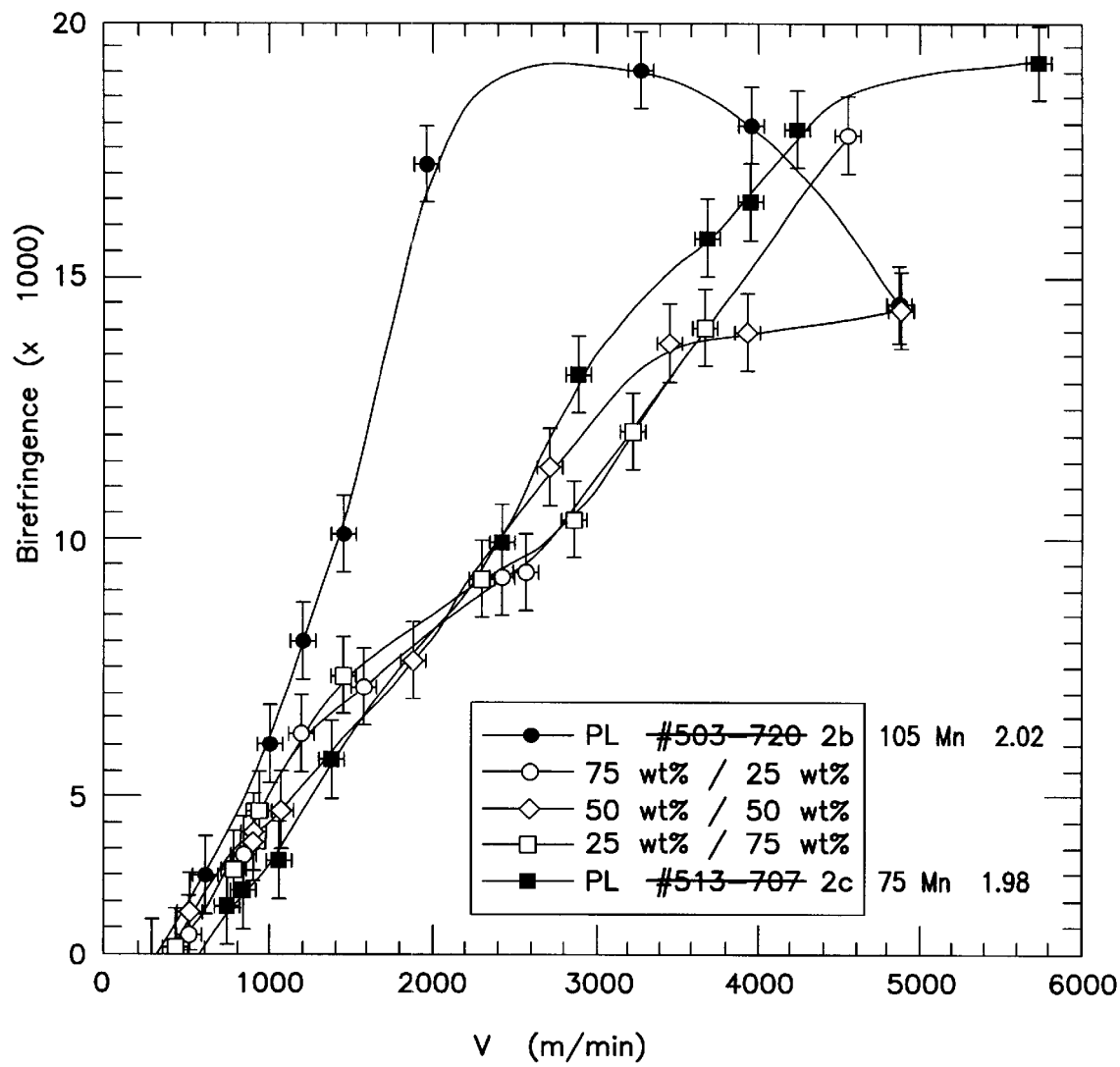
FIG. 21 Fiber birefringence as a function of take-up velocity (V) for two polymers and their blends. Melt temperature is 233°C, and mass throughput is 2.85 g/min (0.71 g/min/hole).

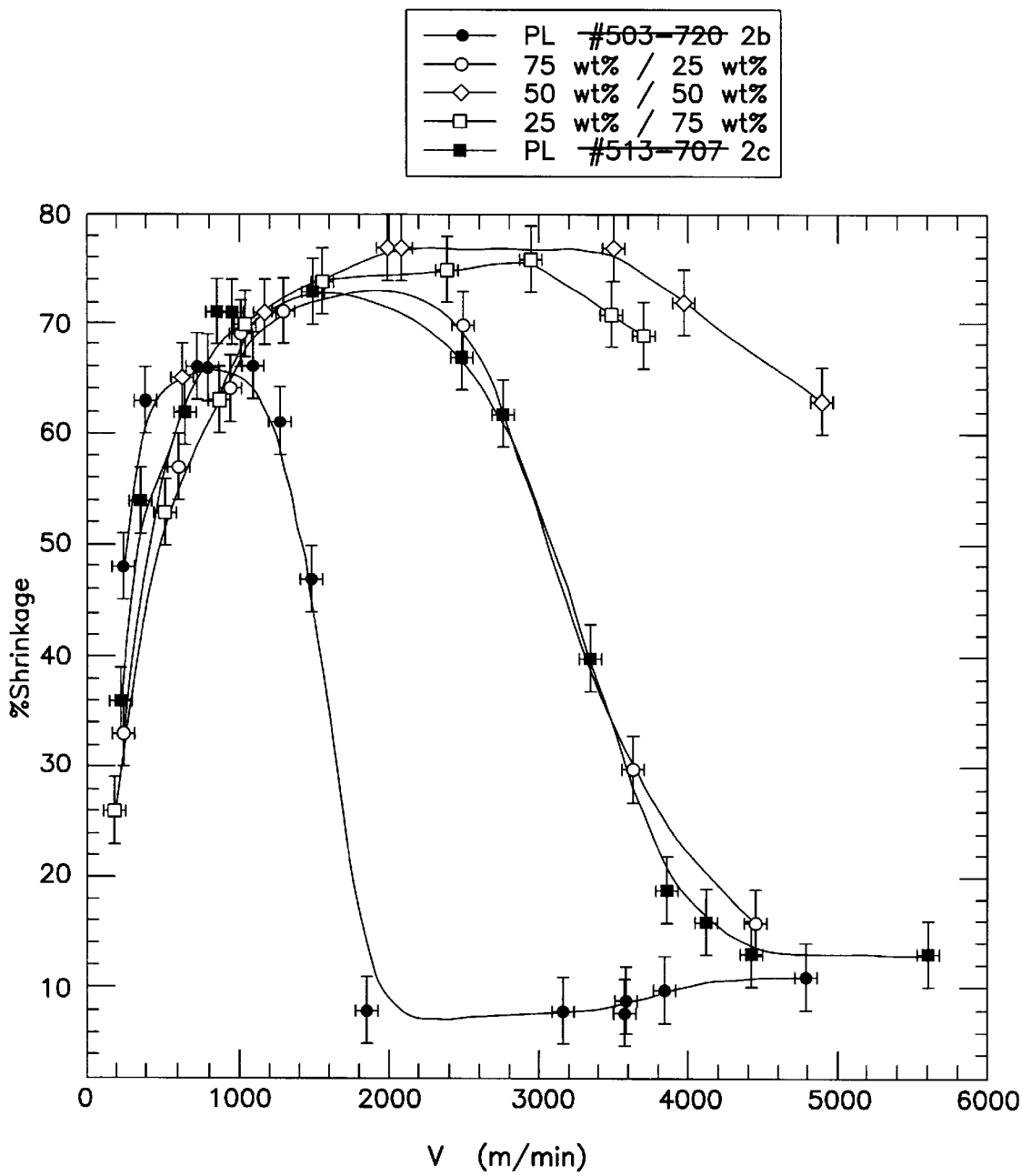
FIG. 22 Fiber shrinkage as a function of take-up velocity (V) for two polymers and their blends. Melt temperature is 233°C, and mass throughput is 2.85 g/min (0.71 g/min/hole).

DEGRADABLE POLYMER FIBERS; PREPARATION PRODUCT; AND, METHODS OF USE

CROSS REFERENCE TO RELATED APPLICATIONS

This application is a continuing application of U.S. patent application Ser. No. 08/850,319 now abandoned, which was filed with the United States Patent and Trademark office on May 2, 1997. The entire disclosure of the U.S. patent application Ser. No. 08/850,319 is incorporated herein by reference.

FIELD OF THE INVENTION

The present invention concerns fiber technology. It is, for example, readily applicable to woven and nonwoven fibrous materials. It concerns general techniques, methods and materials relating to degradable polymer fibers, especially those readily incorporated into woven and nonwoven products and substrates.

BACKGROUND OF THE INVENTION

In recent years, attention has focused on preferred degradable polymers, which can be converted to desirable substrates or articles. Much of this attention is focused on polymers which include, as a monomeric unit therein, the result of lactic acid or lactide polymerization. Attention is directed, for example, to U.S. Pat. No. 5,525,701, the complete disclosures of which are incorporated herein by reference. It is noted that U.S. Pat. No. 5,525,706 is owned by Cargill Incorporated, of Minneapolis, Minn. Cargill Incorporated is the assignee of the present application as well.

Other published patents which concern polymers of lactic acid or lactide include: U.S. Pat. Nos. 5,444,113; 5,424,346; 5,216,050; European Publication No. 747065 A1; European Publication No. 723043 A2; French publication 2725731; and; European Publication No. 637641 A1.

Incorporation of such technology into preferred fibrous materials, especially in the generation of nonwoven fiber substrates, is a focus of concern herein.

SUMMARY OF THE INVENTION

The present invention relates to a fibrous material which includes a plurality of polylactide containing fibers. The plurality of polylactide containing fibers can be considered low shrinkage or high shrinkage. The plurality of polylactide containing fibers are considered low shrinkage fibers if they provide a boiling water shrinkage propensity of less than about 20%. The plurality of polylactide containing fibers are considered high shrink fibers if they provide an average fiber boiling water shrinkage propensity of greater than about 10% and a heat of fusion of less than about 25 J/g. The invention additionally relates to the use of extrusion processes to provide low shrinkage fibers and high shrinkage fibers. The invention further relates to the use of these fibers in desirable products.

Figure 1:
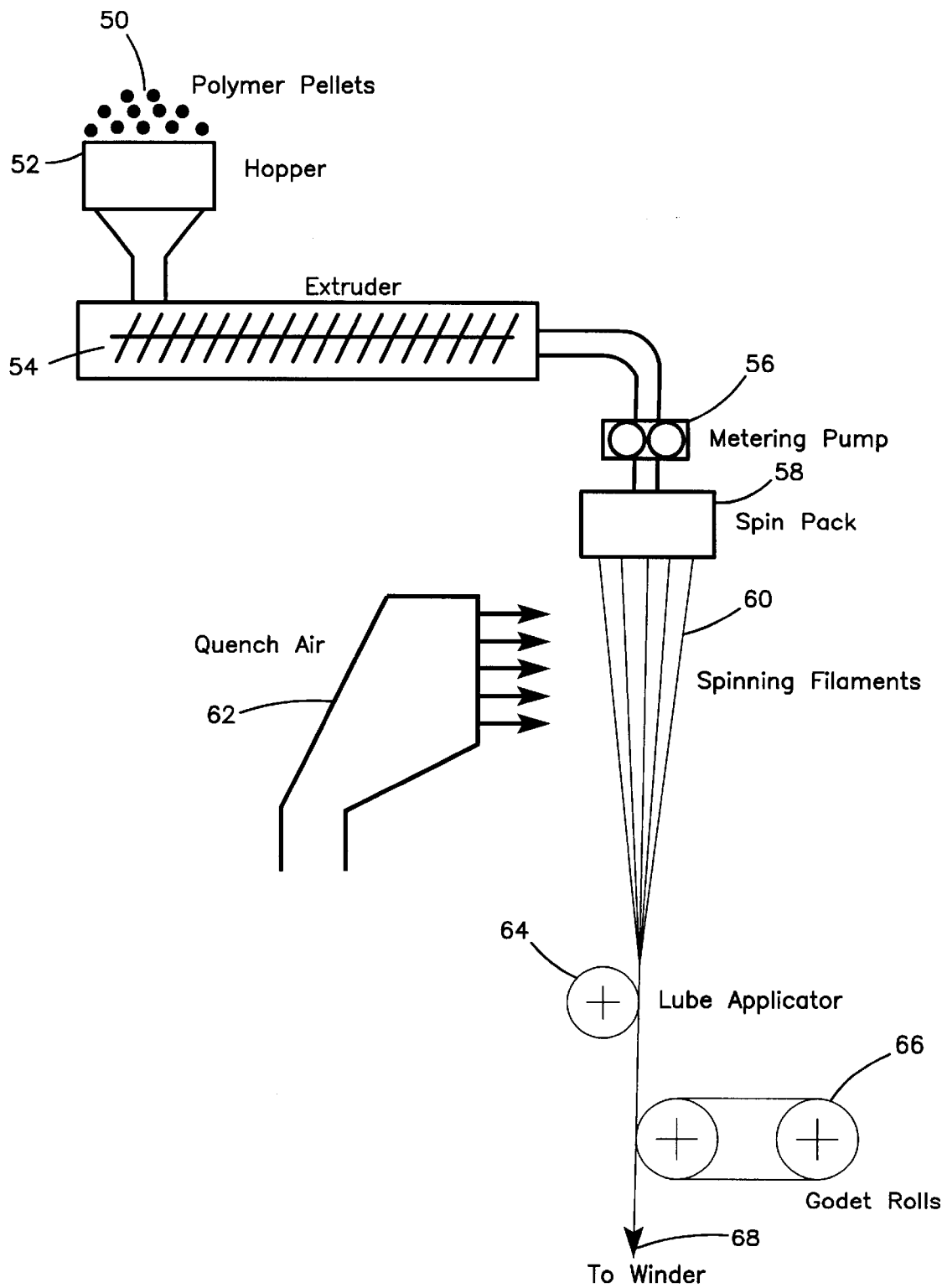
FIG. 1 describes a melt spinning process.

FIGS. A–D 6 are photographs of side by side bicomponent fibers;

FIG. 7 shows fiber diameter as a function of take-up velocity;

FIG. 8 shows amount of crystallinity as a function of take-up velocity;

FIG. 9 shows birefringence as a function of take-up velocity;

FIG. 10 shows amount of shrinkage as a function of take-up velocity;

FIG. 11 shows amount of crystallinity as a function of take-up velocity;

FIG. 12 shows birefringence as a function of take-up velocity;

FIG. 13 shows amount of shrinkage as a function of take-up velocity;

FIG. 14 shows amount of crystallinity as a function of take-up velocity;

FIG. 15 shows birefringence as a function of take-up velocity;

FIG. 16 shows amount of shrinkage as a function of take-up velocity;

FIG. 17 shows effects of crosslinking;

FIG. 18 shows % shrinkage as a function of take-up velocity;

FIG. 19 shows branching effects on birefringence;

FIG. 20 shows branching effects on % shrinkage;

FIG. 21 shows birefringence as a function of take-up velocity; and

FIG. 22 shows shrinkage as a function of take-up velocity.

DETAILED DESCRIPTION

The present invention relates to fiber technology and how it can be used to develop desirable products. In particular, the present invention relates to the preparation and use of fibers containing polylactide polymer to provide desirable characteristics in woven and nonwoven fabrics. It will be appreciated that this application is particularly concerned with how fibers containing polylactide polymer can be modified to provide desirable properties in nonwoven end products.

The numerous references in this application to "modification" of fibers may refer both chemical modification, physical modification, both, or some combination of both, which should be apparent from the context of the discussion. By chemical modification, we mean that the chemistry of the fiber or polymer composition can be adjusted by the incorporation or removal of an ingredient or component. The ingredient or component can be a reactant, nucleating agent, additive, compatibilizing agent and the like, which can alter a particular property. By physical modification, we mean that the fiber or polymer composition can be physically treated in a way that increases or decreases a particular property. Examples of physical modification include, for example, stretching, drawing, annealing, and quenching. As discussed in more detail below, the level of crystallinity in a polylactide composition can be altered by both chemical modification and physical modification. For example, the level of crystallinity provided by a polylactide polymer can be increased by lowering the component of R-lactic acid residue in the polymer, and can be increased by stress during spinning or drawing. The attainment of these characteristics, in addition to others, for useful applications are described below.

The fibers of the invention can be used to provide woven and nonwoven fabrics. For simplicity, nonwoven fabrics can be referred to as nonwovens. It should be understood that in the context of the present invention, "nonwoven fabrics" refers to fabrics prepared from fibers by a method other than weaving or knitting. The nonwoven fabrics of the invention includes fabrics prepared by deposition of fibers or filaments of long, intermediate, or short length. Long fibers are generally considered to be continuous fibers characterized by a length greater than the distance between the spin pack and the web or godet rolls provided during spin processing. In effect, the length of the fiber is at least greater than two meters. Fibers of theoretically discontinuous length are generally produced in melt blown operations. Short length fibers may have a length from about 0.5 cm to about 10 cm, and often have a length of less than about 5 cm. Intermediate fibers can range in length from 5 cm to about 10 m. Alternatively, intermediate length fibers can be characterized as having a length of between about 5 m and 1 m. Moreover, the fibers or filaments can be entangled, bonded, and the like. In addition, the nonwoven fabrics can be incorporated as part of a laminate or other structure which advantageously utilizes the characteristics of a nonwoven. An example of a type of laminate is a SMS fabric (that is, spunbond-meltblown-spunbond).

The nonwoven of the invention can have utility in agricultural, medical, hygiene, filtration, barrier, industrial, disposable, and durable nonwoven applications. Of particular importance are applications where biodegradability can advantageously be combined with a fabric or laminate function to provide desired softness, drape, barrier properties, elongation, fit, comfort, and the like. Exemplary preferred nonwoven fabrics include, absorbent and fluid transfer (such as acquisition/distribution layer) which can be used, for example, in media hygiene products such as diapers, training pants, feminine absorbent articles, and the like; filtration and barrier fabrics; textiles which can be used, for example, in medical or industrial garment applications; insulation applications; bulking and filler applications including packaging materials; as a replacement for cellulose; and as wound dressings. The fibers may also be advantageously used as binder fibers by binding other fibers, such as in nonwovens, paper, yarns, and the like. The fibers can be modified to provide desirable properties which can include spinnability, webforming, thermal bond range, good bond strength, thermal-dimensional stability, softness, drape, stability to ionizing radiation, strength, toughness, differential shrinkage and fibrillation. The attainment of desired properties for any given product application are taught by this application. In other words, this application describes how properties of polylactide containing fibers can be modified to provide desired end products.

I. Materials

In general, preferred fibers which can be provided according to the present invention include as at least one component, polylactide or polylactic acid (polylactide and polylactic acid being referred to, collectively, herein as polylactide or PLA). Accordingly, the invention concerns the use of polylactide in fibers or filaments.

The invention contemplates the use of fibers or filaments containing polylactide in nonwoven materials. The fibers or filaments can be classified as monocomponent fibers or multicomponent fibers.

The monocomponent fibers will include at least a portion of polylactide. The multicomponent fibers will include at least one component based upon polylactide and at least one additional component which may be based upon polylactide or upon a material other than polylactide. In general, if multicomponent fibers include at least one component based upon PLA and another component based upon polylactide, it is expected that the two polylactide components will have different properties which will allow the final product to have properties that would not otherwise be attainable using a monocomponent fiber based upon polylactide.

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid-based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer comprises at least 50%, by weight, lactic acid residue repeating units or lactide residue repeating units. In this context, the term "lactic acid residue repeating unit" is meant to refer to the following unit:

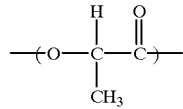

In view of the above definition, it should be clear that polylactide can be referred to both as a lactic acid residue containing polymer and as a lactide residue containing polymer. Herein the term "lactide residue repeating unit" is meant to refer to the following repeating unit:

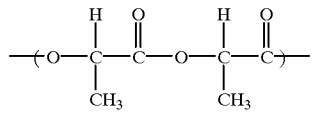

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

Furthermore, it should be understood that the term "PLA" is not intended to limit a composition to one containing only polylactide or polylactic acid as the polymer component. As used herein, the term "PLA" covers compositions which contain a polymer containing the above-described lactic acid residue repeating unit in an amount of at least 50%, by weight, based on the total repeating units in the polymer. A PLA composition can include other components blended in with the polymer containing at least 50%, by weight, lactic acid repeating units. In most applications, it is believed that the component of the fiber containing polylactide will be the dominant material. Generally, it is expected that at least about 20% of the component will be comprised of a polylactide material. Preferably, the component will include at least about 70% by weight polylactide, and more preferably at least about 90% by weight polylactide. It should be appreciated that the amount of polylactide present in a particular component depends on the desired property to be imparted to that component.

A. PLA (Polylactic Acid or Polylactide).

Useable PLA-based polymers for conversion to fibrous materials according to the preferred techniques described herein, are prepared from polymerization of lactide or lactic acid. In some applications, the polymerization may be a copolymerization, with the lactide or lactic acid monomer copolymerized with another material. In some instances, the lactic acid or lactate may first be polymerized, with the resulting polymer mixture then being reacted, for example copolymerized, with another material in order to provide for some desired modification, for example relating to molecular weight or polydispersity.

In the context of the present invention, reference to degradable fibers includes compostable fibers. Compostable fibers are fibers having at least a portion which will break down and become part of a compost upon being subjected to physical, chemical, thermal, and/or biological degradation in a solid waste composting or biogasification facility. As used in this application, a composting or biogasification facility has a specific environment which induces rapid or accelerated degradation. Generally, conditions which provide rapid or accelerated degradation, compared with storage or use conditions, are referred to herein as composting conditions.

It should be appreciated that the fibers of the invention can be either wholly or partially compostable, depending on the amount of compostable material incorporated into the fibers. The compostable component of the fibers should be compostable and biodegradable during composting/biogasification, or in compost amended soil, at a rate and/or extent comparable to that of known reference materials such as cellulose or paper. Basically, this means that the components should be degradable within a time frame in which products made therefrom, after use, can be recycled by composting and used as compost. It should be understood that certain materials such as hydrocarbons and other polymeric resins including polyethylenes, polypropylenes, polyvinyls, polystyrenes, polyvinyl chloride resins, urea formaldehyde resins, polyethylene terephthalate resins, polybutylene terephthalate resins, and the like are not considered compostable or biodegradable for purposes of this invention because they take too long to degrade when left alone in a composting environment. The rate and extent of biodegradation of compostable materials is described in detail in U.S. patent application Ser. No. 08/642,329, which was filed with the United States Patent and Trademark Office on May 3, 1996, the entire disclosure of which is incorporated herein by reference.

Lactic acid residue containing polymers are particularly preferred for use in the present invention due to their hydrolyzable and biodegradable nature. One theory of the degradation of lactic acid residue containing polymers is that they can be degraded by hydrolysis at hydrolyzable groups to lactic acid molecules which are subject to enzymatic decomposition by a wide variety of microorganisms. It should be appreciated, however, that the precise mechanism of degradation is not a critical feature of the present invention. Rather, it is sufficient that one recognizes that polymers which provide similarly rapid degradation to naturally occurring end products can be useful in the present invention. U.S. Pat. No. 5,142,023 issued to Gruber et al. on Aug. 25, 1992, the disclosure of which is hereby incorporated by reference, discloses, generally, a continuous process for the manufacture of lactide polymers from lactic acid. Related processes for generating purified lactide and creating polymers therefrom are disclosed in U.S. Pat. Nos. 5,247,058; 5,247,059; and 5,274,073 issued to Gruber et al., the disclosures of which are hereby incorporated by reference. It should be appreciated that selected polymers from these patents having the physical properties suitable for use in the present invention can be utilized. Generally, polymers according to U.S. Pat. No. 5,338,822 issued to Gruber et al. on Aug. 16, 1994 and U.S. Pat. No. 5,594,095 issued to Gruber et al. on Jan. 14, 1997, which are incorporated by reference, can be used in the present invention. Exemplary lactic acid residue containing polymers which can be used are described in U.S. Pat. Nos. 5,142,023; 5,274,059; 5,274,073; 5,258,488; 5,357,035; 5,338,822; 5,359,026; 5,484,881; 5,536,807; and 5,594,095, to Gruber et al., the disclosures of which are incorporated herein by reference. Polylactide polymers which can be used in the invention are available under the tradename EcoPLA™.

B. Advantageous Properties of Polylactide

In the context of fiber formation, it is desirable to provide the polylactide polymer with desired molecular weight ranges, PDI, optical composition, and melt stability. It should be appreciated that each of these properties can be adjusted for a given application.

In the case of melt blown fibers, it is preferable that the polylactide polymer is provided with a number average molecular weight of between about 25,000 and 110,000. Or preferably, the number average molecular weight is provided between about 30,000 and about 75,000, and even more preferably between about 32,000 and about 60,000. In most preferred applications, it is anticipated that the polylactide polymer will have a number average molecular weight within a range of about 35,000 and about 45,000. It should be understood that the lower limit on the number average molecular weight is determined by physical properties such as tensile strength. The upper limit on number average molecular weight is generally determined by consideration such as viscosity in the melt blown process. The measurement of molecular weight is preferably in accomplished by GPC using polystyrene standards as described, for example, in U.S. Pat. No. 5,338,822.

In the case of spun-bond or melt spinning, it is desirable to provide a number average molecular weight within the range of about 25,000 to about 150,000. Preferably, the number average molecular weight is provided within a range of from about 45,000 to about 105,000, more preferably between a range of about 50,000 to about 90,000. It is believed that the number average molecular weight will be most preferably in a range of from about 55,000 to about 75,000 for spunbond processes and from about 75,000 to about 90,000 for melt spun processes. In the spun-bond or melt spinning processes it should be appreciated that the lower limit on the molecular weight is generally a function of melt strength and tensile strength. The upper limit on the molecular weight is generally determined by rheological considerations such as drawdown rate, as well as pressure drop through the die, and the desire not to process the polymer at excessively high temperatures.

The polydispersity index (PDI) of the polylactide polymer is generally a function of branching or crosslinking and is a measure of the breadth of the molecular weight distribution. In most applications where crystalline polylactide is desired, the PDI of the polylactide polymer should be between about 1.5 and about 3.5, and preferably between about 2.0 and about 3.0. Of course, increased bridging or crosslinking may increase the PDI. Furthermore, the melt flow index of the polylactide polymer should be in preferred ranges, using standard ASTM melt flow testing procedures, measured at 210° C. with a 2.16 Kg weight. For melt blown fibers the melt flow index should be between about 50 and 5000, and preferably between about 100 and 2000. For spunbond fiber the melt flow index should be between about 10 and 100, and more preferably between about 25 and about 75. For melt spinning fiber the preferred polymer should have a melt flow index between about 10 and about 100, more preferably between about 10 and about 50, and most preferably between about 10 and about 30.

The preferred polylactide polymers for use in fiber formation are preferably melt-stable. By this, we mean that the polylactide polymer will be relatively stable to lactide reformation and depolymerization at temperatures encountered during melt processing. With respect to this, the disclosures concerning melt stability provided in U.S. Pat. Nos. 5,338,822 and 5,525,706 and U.S. application Ser. No. 09/053,836 filed Apr. 1, 1998 are incorporated herein by reference.

Furthermore, it should be understood that preferred melt-stable polylactide compositions preferably include a lactide concentration of less than about 2% by weight, more preferably a lactide concentration of less than about 1% by weight, and even more preferably a lactide concentration of less than 0.5% by weight. Most preferably, to ensure melt stability properties, it is preferred that the lactide concentration is less than about 0.3% by weight. In addition, it is preferred that the extent of lactide generation during melt processing, such as through an extruder, provides generation of less than about 2% by weight lactide. Of course, the more melt-stable the polylactide polymer is as a result of the lower levels of residual lactide, the less it is expected additional lactide will be generated during melt processing. Thus, it is expected that for melt-stable polylactide polymers, melt processing will only generate less than about 1% lactide, and even more preferably less than about 0.5% by weight lactide. While low residual lactide can be important for maintaining melt stability, it should be appreciated that additional additives can additionally be relied upon for providing melt stability. Exemplary additives are described in U.S. Pat. Nos. 5,338,822 and 5,525,706 and U.S. application Ser. No. 09/053,836, which are incorporated herein by reference. It will be appreciated that several of the examples reflect the use of tartaric acid as a stabilizer for polylactide polymers. It is expected that additional carboxylic acids will function to enhance polylactide polymer stability during melt-processing.

Applicants discovered the conditions of fiber formation are very extreme, which promotes lactide reformation and molecular weight degradation. Conditions in the extruder often exceed 200° C., and the surface area generated during fiber formation provides an increase in the contact area between equipment and/or air and melted polylactide compared with film formation or molding formation. As a result, conditions during fiber formation favor degradation of the polymer. Applicants have discovered that it is advantageous to enhance melt stability beyond melt stability requirements often encountered during film formation or molding formation.

The sensitivity of polylactide to hydrolysis actually provides a potential advantage for fibers and articles made therefrom. If conditions can be made favorable for surface hydrolysis of the fiber as it is formed, or subsequent to its formation, a fiber or filament results that has a lower molecular weight sheath. The formation of that sheath has numerous potential advantages, such as improved bonding. For example, it is expected that a monocomponent fiber can be introduced into a humid atmosphere under conditions which will result in a desired level of hydrolysis in the outer layer of the fiber. It is expected that the hydrolysis will provide a decrease in the polylactide molecular weight at the fiber surface, which is expected to effect the melting temperature of the surface of the fiber. The resulting monocomponent fiber can be referred to as a pseudo-bicomponent fiber.

C. Copolymers

Lactic acid residue containing polymers include copolymers and are generally prepared from monomers which include lactic acid, lactide, or combination thereof. Polymers which are considered lactic acid residue containing polymers include poly(lactide) polymers, poly(lactic acid) polymers, and copolymers such as random and/or block copolymers of lactide and/or lactic acid. Lactic acid components which can be used to form the lactic acid residue containing polymers include L-lactic acid and D-lactic acid. Lactide components which can be used to form the lactic acid residue containing polymers include L-lactide, D-lactide, and meso-lactide. A particularly preferred copolymer includes residues of both L-lactide residue and D-lactide residue as comonomers.

While polylactide is preferred for providing low shrinkage fibers, viscosity modified polylactide can be used. Such polymers are described in detail in U.S. Pat. Nos. 5,359,026 and 5,594,095, the patents being incorporated in its entirety by reference herein. Viscosity modified polylactide polymers are important because they provide desirable processing characteristics such as reduced viscosity and increased melt strength.

Particularly preferred viscosity modified polylactide polymers include copolymers of lactide and epoxidized multifunctional oil such as epoxidized linseed oil and epoxidized soybean oil. In many situations, it is preferred that the polymer is prepared from 0.1 to 0.5 weight percent epoxidized multifunctional oil and molten lactide monomer. Catalyst can be added, and the mixture can be polymerized between about 160° C. and 200° C. The resulting polymer preferably has a number average molecular weight of about 50,000 to about 105,000.

It should be understood that while many different types of components or reactants can be introduced into the polylactide polymer, the presence thereof does not necessarily make them repeating units. Clearly, the presence of a component or residue thereof at a concentration which corresponds to the presence of a few components or residues in a polymer chain is not repeating, and the residue would not be considered a repeating unit.

Other preferred copolymers include copolymers of PLA with other biodegradable polymers, especially aliphatic polyesters. One preferred method to form the copolymers would be through interesterification or coupling in a post polymerization process, such as reactive extrusion. Alternatively, copolymers of lactide and other cyclic esters, cyclic ester-ethers, and cyclic ester-amides are possible. Comonomers in this case would include a lactide with morpholine-2-5-dione, dioxepane-2-one, dioxanones (such as p-dioxanone), lactones (such as epsilon-caprolactone or 4-valerolactone), dioxan (dione)s (such as glycolide or tetramethyl- 1,4-dioxane-2,5-dione), or ester-amides (such as morpholine-2-5-dione). With respect to copolymers, reference can be made to the discussion in U.S. Pat. No. 5,359,026, the disclosure of which is incorporated herein in its entirety. Also, copolymers of lactic acid and other hydroxy acids or hydroxy and/or acid terminated low molecular weight polyesters are possible. Aliphatic polyesters or polyester-amides are preferred.

D. Other Components

The polylactide polymer composition can include additional components or additives including, plasticizers, rheology modifiers, crystallinity modifiers, antioxidants, stabilizers, pigments, nucleating agents, compatibilizers, and the like.

Plasticizer

For most lactic acid residue containing polymers, it is believed that the glass transition temperature can be lowered to desirable levels by adding a plasticizer component to provide a concentration of about 0.5 to 20 percent by weight plasticizer, based on the weight of the polymer composition. Generally, a sufficient amount of plasticizer should be incorporated to provide a desired reduction in Tg. It is believed that the plasticizer level should be above at least 1 percent by weight, and more preferably above at least 2 percent by weight, to provide sufficient flexibility and softness. Accordingly, the plasticizer should be included to provide a concentration level of about 1 to 10 percent by weight.

It is preferred to use a plasticizer which is biodegradable, non-toxic, compatible with the resin, and relatively nonvolatile. In particular, because of the large surface area of polymer exposed during fiber formation, it is desired to provide a plasticizer which does not volatilize to a significant extent. Most preferred plasticizers have a vapor pressure of less than 1 mm Hg at 200° C.

Internal plasticizers, which are bonded to the lactic acid residue containing polymer, may also be useful in the present invention. Exemplary plasticizer which can be bonded to the polymer include epoxides. Plasticizers which are normally solid at room temperature can additionally be used.

Nucleating Agents

In a preferred composition, nucleating agents may be incorporate. Nucleating agents may include selected plasticizers, finely divided minerals, organic compounds, salts of organic acids and imides and finely divided crystalline polymers with a melting point above the processing temperature of poly(lactide). Examples of useful nucleating agents include talc, sodium salt of saccharin, calcium silicate, sodium benzoate, calcium titanate, boron nitride, copper phthalocyanine, isotactic polypropylene, low molecular weight poly(lactide) and polybutylene terephthalate.

Surface Treatments

Surface treatments may also be used to reduce blocking or modify bonding, dyeability, or chemical reactivity. Such treatments include exposing molten fiber to hydrolytic atmosphere corona and flame treatments which modify adhesive, chemical, or fractional properties of the fiber.

For certain applications, it is desirable for the fabric to be modified to alter the water transport properties. Surfactants may be incorporated into the web of the present invention to increase the water transport properties.

Surfactants which are useful can be subdivided into cationic, anionic, and nonionic agents. With regard to cationic compounds, the active molecule part generally consists of a voluminous cation which often contains a long alkyl residue (e.g. a quaternary ammonium, phosphonium or sulfonium salt) whereby the quaternary group can also occur in a ring system (e.g. imidazoline). In most cases, the anion is the chloride, methosulfate or nitrate originating from the quaternization process. In the anionic compounds, the active molecule part in this class of compounds is the anion, mostly an alkyl sulfonate, sulfate or phosphate, a dithiocarbamate or carboxylate. Alkali metals often serve as cations. Nonionic antistatic agents are uncharged surface-active molecules of a significantly lower polarity than the above mentioned ionic compounds and include polyethylene glycol esters or ethers, fatty acid esters or ethanolamides, mono- or diglycerides or ethyoxylated fatty amines. The above surfactants may also act as antistatic agents, which may be desirable.

Pigments

Pigments, dyes, or color agents may also be added as necessary. Examples include titanium dioxide, clays, calcium carbonate, talc, mica, silica, silicates, iron oxides and hydroxides, carbon black and magnesium oxide. Titanium dioxide is useful as a whitener and improves the opacity or "cover" of a web, giving the appearance of improved filament distribution.

Catalysts

In the manufacture of polylactide compositions of the present invention, the reaction to polymerize lactide is catalyzed. Many catalysts have been cited in literature for use in the ring-opening polymerization of lactones. These include but are not limited to:$SnCl_2$, $SnBr_2$, $SnCl_4$, $SnBr_4$, aluminum alkoxides, tin alkoxides, zinc alkoxides, SnO, PbO, Sn (2-ethyl hexanoates), Sb (2-ethyl hexanoates) (sometimes called octoates) Ca stearates, Mg stearates, Zn stearates, and tetraphenyltin. Applicants have also tested several catalysts for polymerization of lactide at 180° C., which include: tin(II) bis(2-ethyl hexanoate) (commercially available from Atochem, as Fascat 2003, and Air Products as DABCO T-9), dibutylin diacetate (Fascat 4200®, Atochem), butylin tris(2-ethyl hexanoate) (Fascat 91020®, Atochem), hydrated monobutylin oxide (Fascat 9100®, Atochem), antimony triacetate (S-21, Atochem), and antimony tris (ethylene glycoxide) (S-24, Atochem). Of these catalysts, tin(II) bis(2-ethyl hexanoate), butylin tris(2-ethyl hexanoate) and dibutylin diacetate appear to be most effective.

Finishing Oils

For some applications, it may be useful to apply surface treatments to provide fiber lubricity, change hydrophilicity, alter static characteristics, modify fiber appearance and ultimately affect fiber cohesion. An example of such surface treatments are finishing oils. Finishing oils may affect the above fiber properties, but also affect down stream fiber processes. Such processes include manufacturing of yarns and carding. Examples of some of the finishing oils that could be used for PLA include stearates or other commercially available proprietary oils.

E. Other Polymers

As discussed above, many different types of polymers can be blended with polylactide and used in the present invention. Alternatively, polymers can be used as other components in multicomponent fiber which are discussed in more detail below. Exemplary types of polymers which can be blended with polylactide or used as separate components in a multicomponent fiber include polyolefins, polyamides, aromatic/aliphatic polyesters, including polybutylene terephthalate and polyethylene terephthalate, and combinations thereof. Additional types of polymers which can be used include destructurized starch compositions, polyhydric alcohols and derivatives, hydroxypropyl cellulose derivatives, cellulose esters, biodegradable aliphatic polyesters, ethers, urethanes, and biodegradable aliphatic-aromatic polyesters. Examples of destructurized starch compositions include starch in combination with ethylenevinyl alcohol (EVOH) available as Mater-Bi from Novamont. Exemplary polyhydric alcohols and derivatives include polyvinyl alcohol modified with appropriate plasticizers, such as, glycerol, ethylene glycol, polyvinyl alcohol in combination with poly(alkeneoxy) acrylate which is available as VINEX from Air Products and Chemicals. An exemplary hydroxypropyl cellulose derivative includes hydroxypropyl cellulose non-ionic cellulose ether, such as that available as KLUCEL from Hercules. Exemplary cellulose esters include cellulose acetates (Tenites available from Eastman and including proprionates and butyrates), cellulose acetate proprionates, and cellulose acetate butyrates. Exemplary biodegradable aliphatic polyesters include polyhydroxy butyrate (PHP), polyhydroxy butyrate-co-valerate (PHBV) available as BIOPOL, polycaprolactane available as TONE from Union Carbide, polybutylene succinate available as Bionolle™ 1000 series by Showa, polybutylene succinate-co-adipate available as Bionolle™ 3000 by Showa, polyglycolic acid (PGA), various grades of polylactide (PLA), polybutylene oxalate, polyethylene adipate, polyparadioxanone, polymorpholineviones, and polydioxipane-2-one. Exemplary ethers include polypropylene oxide and copolymers of polypropylene oxide and polyethylene oxide and copolymers of polyethylene oxide. Exemplary polycarbonates include polyethylene carbonate, polybutylene carbonate, and polytrimethylene carbonate and its derivatives. Exemplary urethanes include urethanes made with polyester or ethers or mixtures thereof, or made from polyesters and urethanes to provide aliphatic polyester urethanes. Biodegradable aliphatic-aromatic polyesters include polybutylene succinate-co-terephthalate available from Eastman, and BIOMAX from Dupont.

Additional components which can be either blended with the PLA or utilized as another component of a multicomponent fiber include thermoplastic resins, such as, hydrocarbons, polyesters, polyvinyl alcohols, poly(acrylonitrile) polymers, and select highly substituted cellulose esters. Exemplary hydrocarbons include polyethylene, polypropylene. Exemplary polyesters include aromatic polyesters, such as, polyethylene terephthalate (PET) and polybutylene terephthalate (PBT).

PLA blends may also be useful in improving the adhesion of the PLA component to a non-polylactide component, such as a polyolefin. Materials which are useful as a "tie-layer" may be useful in this manner.

Polymers which can be used in the present invention include PLA and PLA-based polymers, other biodegradable or water-soluble polymers, such as PVA, other lactic acid-containing polymers (e.g., lactic acid-based polyurethanes, polycaprolactone (PCL), polypropiolactone, cellulose acetates, glycolide-containing polymers (PGAs), degradable polyesters (aliphatic), polyhydroxy propionate (or butylate, capreolate, heptanoate, valerate or octanoate), polyester amides, aliphatic diol polymers, aliphatic and aromatic dicarboxylic acids, and, where applicable, copolymers and blends thereof.

An exemplary preferred polymer is a polybutylene succinate homopolymer sold under tradename Bionolle™ 1000 and is available from Showa Highpolymer Co., Ltd.

The use of compatibilizers, partial copolymerization or transesterification, reactive extrusion coupling, and other techniques may be used to provide more compatible blends.

II. Fiber Formation

A. Fiber Formation Processes

Fibers according to the present invention can be prepared by a number of different techniques commonly used in the art. Several of the more common methods of fiber formation include melt spinning, melt blowing, and spunbonding. Additional less common methods, which can still be practiced according to the present invention, include flash spun, wetspinning, and dryspinning. In a general sense, melt spinning is used to provide longer fibers for wovens and nonwovens. Typical applications for fibers prepared by melt spinning include applications where long fibers and relatively large diameters are advantageous. Exemplary types of articles include textiles, absorbent materials, and transfer or wicking materials. Fibers prepared by melt blowing, in contrast, are generally finer in diameter but less oriented. The fibers prepared by melt blowing generally result in breathable fabrics with improved barrier properties but fabrics having a weaker construction because of the low orientation. Exemplary types of articles which can be prepared from melt blown fibers include filter media, bulking materials, agricultural mulch materials, surgical drapes, wound dressings, and replacement for conventional non-woven fabrics including fabric. Spunbonding processes are often considered a type of melt spinning. A significant difference is that spunbonding involves air entrainment to draw the fibers rather than godet rolls typically seen in melt spinning processes with the exception of the Reemay™ and Typar™ processes which use godets to draw the filaments, and air to distribute the filaments into a web.

Now with reference to FIG. 1, a diagram showing a conventional melt spinning process is provided. As shown, polymer pellet 50 can be introduced into a sealed or moisture controlled hopper 52 where they are fed into extruder 54 for melting and extrusion. The extruder 54 extrudes melted polymer through the metering pump 56 to a spin pack 58 which includes a die for spinning or extrusion of polymer fibers 60. The polymer fibers or spinning filaments are then quenched by a quench system 62 which is shown to be an air quenching system. Of course, alternative quenching systems can be used. The air quench causes the spinning filaments to solidify, so that the fibers that do not stick together. The spinning filaments 60 are optionally passed over a lubricating roll 64 and over godet rolls 66 and finally to a winder 68. The godet rolls function to draw the fibers, thereby inducing stress and controlling speed of fiber pickup. The process of inducing stress enhances crystallinity formation which is important when desiring to control, or reduce, shrinkage of the fibers.

Figure 2:
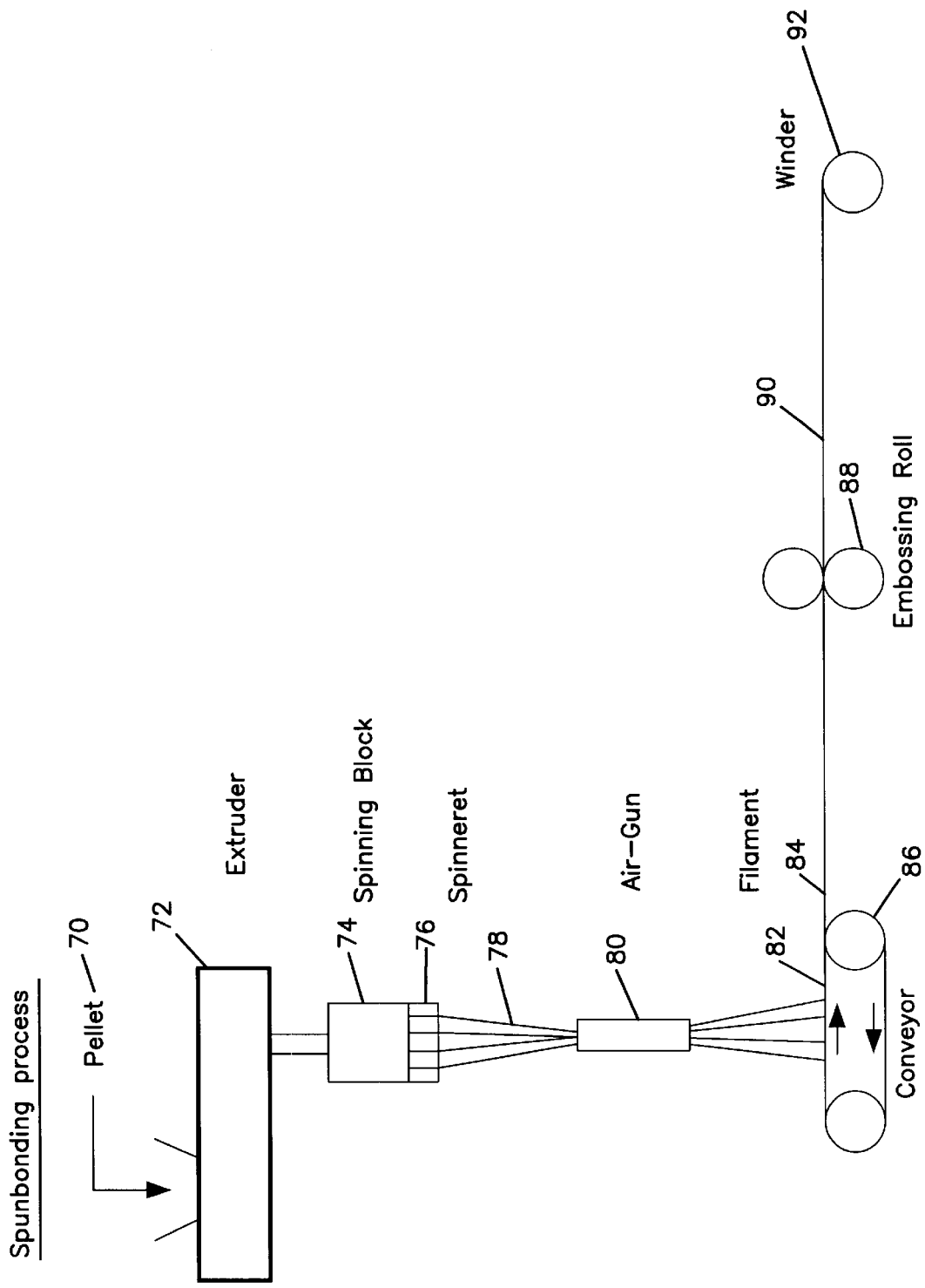
FIG. 2 describes a spunbonding process.

A typical spunbonding process which can be practiced according to the present invention is illustrated in FIG. 2. It should be appreciated that the spunbonding process can be fairly similar to the melt spinning process depicted in FIG. 1. The spunbonding process generally involves an introduction of pellets 70 into an extruder 72 where they are melted and processed to a spinning block 74. The spinning block 74 generally includes a die or spinnerette 76. The force generated by the extruder 72 supplies head pressure to feed a metering pump, which causes the melted polymer to flow through the spinnerette 76 into multiple fibers 78. The fibers 78 pass through air attenuator 80 (which may be an air gun) which causes attenuation or entrainment of the fibers 78. The attenuation of fibers 78 creates stress which, in turn, induces crystallization in the fibers. It should be appreciated that the melted polymer from the extruder may pass through a melt pump in order to control the capilliary throughput and die pressure in the spinning block 74.

Once the fibers 78 pass through the air gun 80, they are laid on a belt 82 to form a web 84. The speed of the belt 82 is determined by the operation speed of the conveyer 86. As the web 84 separates from the belt 82, it generally passes through a bonding operation, such as embossing rolls, to effect a coherent web. The bonding operation can include a calender, oven, heated can or any number of thermal, mechanical, hydraulic or chemical bonding techniques. The bonded web 90 can then be fed to a winder 92 for pickup and storage.

It should be appreciated that in the spunbonding process, it is desirable to provide fibers which are low shrink during the calendering operation. Various ways of bonding and/or interlocking the fibers include generally, chemical, mechanical, hydraulic and thermal means. Examples of chemical means include using adhesives or other chemicals to create a bond between the fibers. Examples of mechanical operations include needle punching, stitch bonding, and hydro entanglement. Examples of thermal bonding include surface melting of the fiber through radiant convective conduction or sonic energy sources. Traditional roll bonding/calendering would be considered a combination of mechanical (pressure) and thermal bonding.

It will be appreciated that while FIGS. 1 and 2 generally show a single extruder, multiple extruders can be used particularly in situations where multicomponent fibers are desired. These types of fibers are described in more detail later in this application. In most anticipated applications, it is believed that two extruders will be used to provide separate components in a bicomponent fiber. Furthermore, it should be appreciated that when we are talking about blends of polymers, the blending can occur within the extruder. Additionally, blending can occur prior to introduction of the pellets into the hopper or extruder by further upstream processing.

The fibers of the present invention can be prepared on numerous types of apparatus. The apparatus can be generally classified into three categories. These categories include slow filament velocity, medium filament velocity, and high filament velocity. Slow filament velocity generally includes apparatus running at 500–1,500 meters per minute. Medium velocity generally includes apparatus run at 1,500 to 2,500 meters per minute. High velocity equipment usually run at greater than 2,500 meters per minute, and preferably at greater than 4,000 meters per minute.

It should be appreciated that capillary diameter describes the size of the orifice size in the spinnerette. The preferred diameter is about 0.2 mm to 1 mm, and a more preferred diameter is about 0.3 mm to 0.8 mm for round holes depending on capillary throughput. Non-round holes, or profiled holes, may also be used. Profiled holes include trilobal, multilobal, crossed, sunflower, hollow, and additional examples shown in FIG. 4.

Figure 3:
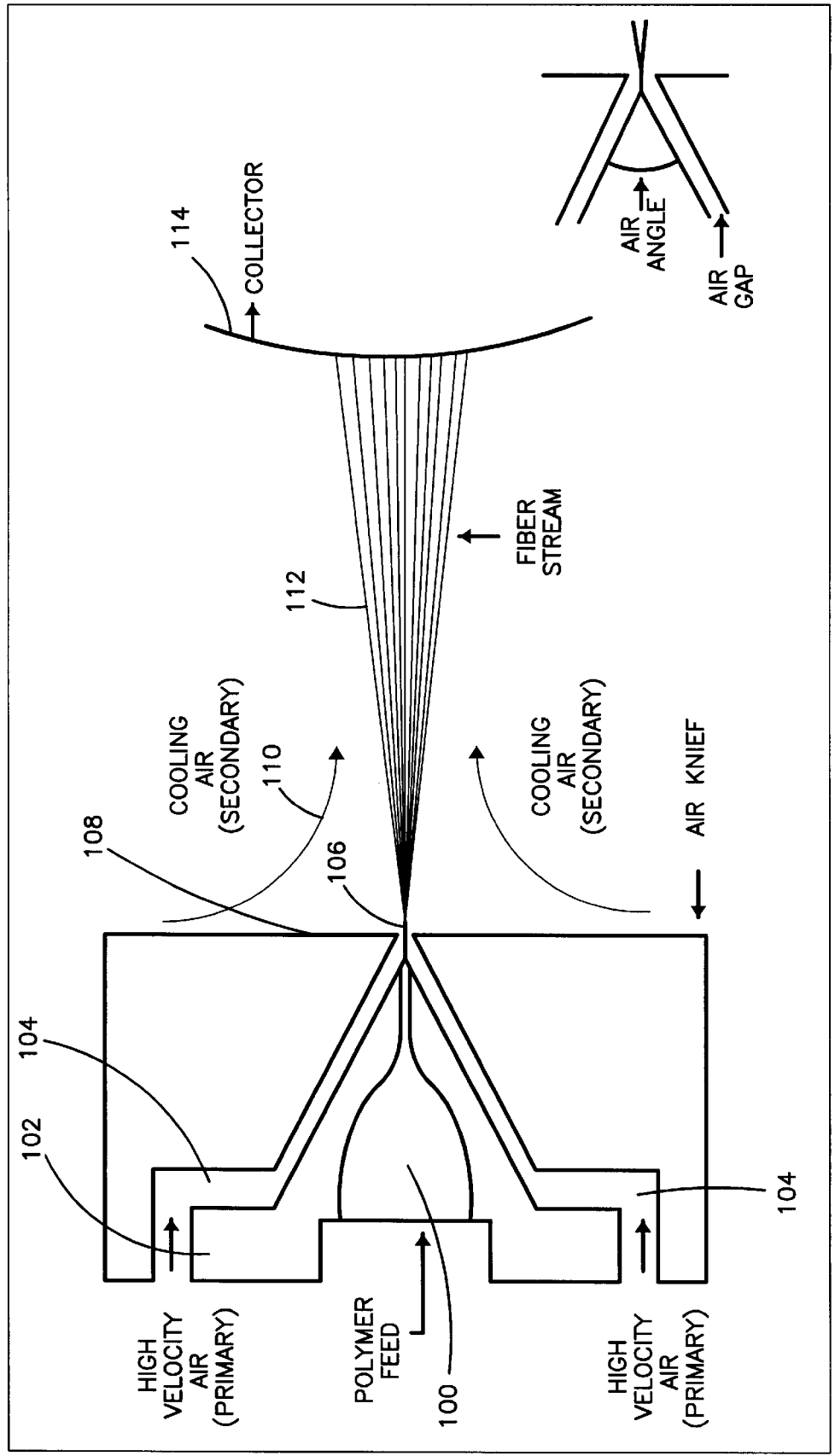
FIG. 3 shows a melt blowing process.

Now with reference to FIG. 3, an exemplary meltblown process is shown. A polymer feed from an extruder is shown at 100. The polymer feed, in melt form, passes through die 102 and is entrained by high velocity air 104. The high velocity air generally functions as a nozzle surrounding melted polymer flowing through the die 102 causing the melted polymer to attenuate. Attenuated fibers 106 are then blown away from the surface of the die 108. Secondary cooling medium 110 (which can be air, water, or other gas) causes the attenuated fibers to solidify. The attenuated fibers 112 are then collected on a rotating drum 114.

The melt blowing process generally does not induce much stress on the fibers as they are generated. As a result, less control is exercised over the extent of crystallization in the fibers.

B. Monocomponent and Multicomponent Fibers

In general, two types of fibers are of primary concern in this application. The first type of fiber includes monocomponent fibers which are basically fibers manufactured by extruding a single composition. The composition may be based upon a single polymer or a mixture or blend of two or more polymers, which may be miscible, semimiscible, or immiscible. In general, the cross section of a monocomponent fiber is relatively consistent along the length of the fiber. There may be irregularities resulting from, among other things, the compatibility/incompatibility of the components of the composition. However, the fiber cross section does not provide the demarcation or discontinuity found, for example, in multicomponent fibers. The second type of fiber includes multicomponent fibers which are generally prepared by co-extruding two or more polymer compositions to form a single fiber having at least two components. Thus, the cross section of a multicomponent fiber will generally show at least two components along the length of the fiber. Furthermore, the relative proportions of the components will be generally constant.

Figure 4:
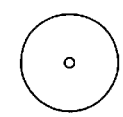
FIG. 4 shows constructions of bicomponent fibers (adapted from Hills, Inc.)

Now referring to FIG. 4, from Hills, Inc. of West Melbourne, Fla., exemplary constructions of bicomponent fibers are provided. As shown, there are basically five common types of bicomponent fibers. These include core and sheath, side by side, tipped, micro-denier, and mixed fibers. Core and sheath are important because the core component can provide desirable structural properties while the sheath component can provide desirable processing characteristics and/or coloring (dyeing) or bonding characteristics. The sheath and core construction can be provided in any of those arrangements shown in FIG. 4, when the particular arrangement is desired. In many applications, it is desirable to decrease the amount of material provided in the sheath when it is not needed for structural reasons. Exemplary constructions of the side by side construction are additionally shown. The side by side construction is particularly advantageous for providing crimping or self-curling properties. In this situation, one of the components is more crimpable or shrinkable than the other component at a given crimping temperature. It is believed that differences in crystallinity, glass transition temperature, and amorphous orientation between the different components lead to differential shrinkage or crimping of the fiber. It should be appreciated that the side by side construction is advantageous when it is desired to provide a fabric having a significant degree of loft. Exemplary types of fabrics could include hygiene and barrier fabrics, filtration, packaging materials, and insulation.

Other less common fiber constructions are additionally shown in FIG. 4 (from Hills, Inc.). It is expected that the tipped constructions may provide desired bonding, loft, wicking, texture or comfort features. Furthermore, it is believed that the micro-denier construction can provide for self-fibrillation. These can provide very thin fibers. It should be understood that other fibrillatable fibers can be fibrillated using chemical, thermal, mechanical and hydraulic methods. In addition, as shown, the fibers can be mixed and combined in desired proportions to provide advantageous properties.

C. Shrinkage Generally

Generally, a property of particular concern in the context of this invention is shrinkage. There are generally two types of shrinkage which are of primary interest in this application. The first type of shrinkage can be referred to as fiber shrinkage and is defined as the initial length of fiber minus the length of fiber after heat treatment, divided by the initial length of fiber, times 100. The heat treatment can be either a boiling water test or a hot air test.

The boiling water tests for testing shrinkage of fibers is described by ASTM D2102-90. When this test is conducted according to the present invention, it has been modified to provide a boiling time of between five and six minutes. We have found that for polylactide fibers there is generally no appreciable difference between shrinkage after five minutes and shrinkage after 15 minutes. The boiling water test practiced in accordance with this invention utilized initial fiber lengths of about 12 inches. The description of ASTM D2102-90 is incorporated herein by reference in its entirety.

The second type of shrinkage can be referred to as fabric shrinkage. The shrinkage in the fabric is recorded in the two principle directions, that is, the machine direction and the transverse direction. The fabric shrinkage is determined and reported as the shrinkage in the machine direction and the shrinkage in the transverse direction. The values are reported separately for each direction. The shrinkage in the machine direction is determined as a percentage by measuring the initial machine direction length, subtracting the final machine direction length and dividing by the initial machine direction length, then multiplying by 100. The shrinkage in the transverse direction is determined similarly. The shrinkage can be done by either a boiling water test or a hot air test. The boiling water test is conducted as described above with respect to the fiber shrinkage tests. That is, ASTM test D2102-90 is practiced with the modification of boiling for five to six minutes.

A hot air test can be practiced for determining shrinkage where the material is placed in an oven at a temperature of 60° C. or 100° C. for one hour. It is expected that the shrinkage values provided by the hot air test at 100° C. should roughly correspond with the shrinkage values provided by the boiling water test. We further expect that the hot air test conducted at 60° C. would provide less shrinkage than the boiling water test or the hot air test conducted at 100° C.

Two types of fibers or components of fibers will be discussed in detail in this application. The first type includes stable, or low shrinkage, fibers. These fibers usually have a shrinkage of less than about 20% and generally have shrinkage of less than about 15%, and preferably less than about 10%, and more preferably less than about 8% when measured according to the boiling water test described above. Most preferably, it is desired to provide fibers having a shrinkage of less than 5%. The reason for this is that more thermally stable fibers provide a more dimensionally stable product or component of a product. It should generally be understood that high shrinkage materials can be disadvantageous when incorporated into other components such as, diapers, because the shrinkage would tend to cause the diaper to distort under high temperature storage conditions.

It should be understood that a primary focus of this invention is the use of low shrinkage fibers. A key finding of this invention is the discovery of conditions which allow or provide for the production of low shrink fibers, particularly, polylactide fibers. The application additionally details the relationship between the shrinkage properties of the fiber and other parameters including polymer composition, molecular weight, degree of branching or crosslinking, presence of additives including nucleating agents, and stress inducing techniques. We have found that low shrinkage fibers provide superior processing advantages during calendering operations because it allows for the provision of low cost thermal bonding while retaining web dimensions.

The desired degree of fiber shrinkage relates to the intended application of the fiber. For example, the calendering operation can result in an end product with less shrinkage than the original fiber. Therefore, higher shrinkage fibers may be tolerated in a fabric which satisfies the shrinkage requirement for a particular end use application. In other words, higher shrinkage fibers can be used to provide low shrinkage fabrics, although difficulties in calendering may be encountered.

The second type includes high shrinkage fibers. High shrinkage fibers will generally exhibit a degree of shrinkage of greater than 10%, and preferably greater than 15%. Useful values can be provided as high as 20–80%. High shrinkage values can be provided by running at filament velocities which are below the critical velocity for establishing crystallization. This results in elongation and orientation of the fiber, but does not provide the physical crosslinks of crystallization to heat stabilize the fiber. Thus, fiber of high shrinkage can be obtained.

The extent to which fibers of PLA or PLA-based polymers shrink, when exposed to heat, relates to the extent to which the method by which the fibers were formed generated a completely relaxed fiber. A preferred process for generating a low shrink fiber is to make highly crystallized and stress-relaxed fiber. In addition, shrinkage is affected by the composition of the fiber. Other factors which affect the presence of stress are molecular weight, molecular weight distribution, melt temperature for the polymer, draw rate, mass throughput, quench rate, orientation and crystallinity.

An important aspect of the present invention is the ability to control shrinkage in order to alter final properties in a given application. Each type of shrinkage may be useful, depending on the particular application involved. Herein techniques usable to selectively obtain each, as desired, are provided. The ability to control shrinkage at desired intermediate levels is also disclosed. Use of temperature, velocity, and polymer composition variables such as molecular weight, residual lactide, PDI, optical composition, and degree of branching all provide means of obtaining a desired level of shrinkage, as shown in the various figures and examples of this application.

We have found that, generally, polylactide polymers provided with low D-lactide level (and corresponding high L-lactide level) will crystallize at lower levels of spin-line stress. Lower levels of D-lactide correspond to levels of less than about 5% R-lactic acid residues provided either through D-lactide or meso-lactide. More preferably, the level of R-lactic acid residues is less than 3%, and more preferably less than 1% in otherwise S-lactic acid based polymer. The reduction in R-lactic acid residue corresponds with decrease in spin-line stress required to induce a similar degree of crystallization. In addition, low R-lactic acid polymers can obtain a higher level of crystallinity. The essence of this is to provide polylactide polymer having high enantiomeric purity. This can be provided by either providing low R-lactic acid residues or low S-lactic acid residues. Although in the case of low S-lactic acid residues, the principle component of the polymer may be difficult to obtain economically. It is anticipated that higher crystallinity fiber will provide lower fiber shrinkage and fabric shrinkage.

It has also been found that a linear polylactide results in lower ultimate shrinkage. Ultimate shrinkage is generally characterized as the minimum value of shrinkage for any attainable filament velocity. This is described in more detail with reference to experimental data below. Branching and crosslinking of polylactide polymer have been found to affect shrinkage. Generally, it is linear polylactide which provides fibers having the lowest ultimate shrinkage. That is, branching and crosslinking tend to result in a higher ultimate shrinkage. However, branching and crosslinking appear to increase spin-line stress at a given filament velocity and therefore have a lower velocity for the onset of shrinkage reduction.

D. Crystallization Generally

Polymers can be generally classified into categories of amorphous polymers, and semi-crystalline polymers. In the present invention, a polymer composition is considered to be semicrystalline it if exhibits a net melting endothherm of greater than 10 J/g of polymer when analyzed by differential scanning calorimetry (DSC). To determine whether a polymer composition layer is semi-crystalline, it can be tested in a differential scanning calorimeter, such as by Mettler. The details of performing a test of crystallinity are known to those skilled in the art and are identified in U.S. Pat. No. 5,536,807 to Gruber et al., the complete disclosure being incorporated herein by reference. Under conditions specific to the polymeric material being processed, an amorphous polymer can be transformed into a semi-crystalline polymer. Crystallization includes the process of spontaneously organizing polymer chains into an ordered configuration.

There are generally two types of mechanisms for inducing crystallization. These include quiescent and strain-induced. Quiescent crystallization is initiated by a source of nucleation. Nucleation is the process that provides sites or seeds to promote crystal formation and growth. There are two types of nucleation that are often referred to, either homogenous nucleation or heterogeneous nucleation. The former results spontaneously from supercooling while the latter is initiated by a second phase in the polymer system. These heterogeneous nuclei making up this second phase can be impurities, residues of incomplete melting or nucleating agents. Factors that are known to influence quiescent crystallization kinetics are temperature, degree of nucleation and polymer backbone structure.

For polylactide polymers in general, we have found that crystallization is most rapid at temperatures in the range of 85° C. and 115° C. In general, polylactide is a rather slow crystallizing polymer. As a result, it is particularly desirable to induce crystallization by application of spin-line stress paramount or subsequent drawing and annealing. For melt spinning operations, draw ratios of greater than two are preferable. The upper limit on draw ratio is provided so as not to break the filament. In general, however, greater draw ratios are desired for providing low shrinkage fibers. For fibers produced at high spin velocities, which are already highly oriented, a draw ratio of less than 2 may be the limit.

The other mechanism of crystallization is strain-induced crystallization which is the result of mechanically aligning the polymer chains in one or more directions. Molecular orientation of polymers is an important phenomenon that strongly affects polymer structure. Degree of crystallinity is strongly influenced by the rate, ratio, and temperature of stretching. For example, the amount of crystallinity induced in a PLA fiber during spinning will largely depend on melt temperature, filament velocity, R/S ratio of the polymer, throughput, degree and kind of branching or crosslinking, presence of additives, and quench temperature.

At low filament speeds, the spherulitic structure is expected to prevail. In other words, strain induced crystallization is not expected to provide significant amounts of crystallization until higher filament speeds are provided. Higher filament speeds would gradually replace this structure with an extended chain crystal structure, resulting from strain-induced orientation and crystallization. In some cases, a shish-kebob structure is formed due to lamellar crystal growth originating on an extended chain crystal structure.

In a preferred embodiment of this invention, low shrinkage fibers are produced by generating high levels of strain induced crystallinity. We have found that this crystallinity can be developed by using a combination of lower melt temperatures, higher filament velocities, high enantiomeric purity polymer and high molecular weight. By controlling any number of these factors, one can provide a low shrink fiber. Post filament forming techniques for controlling shrinkage are also available, including drawing/stretching and annealing.

E. Birefringence Generally

Birefringence is a measure of the difference in refractive index parallel and perpendicular to the fiber axis and is an indicator of total orientation in the fiber. All of the following can contribute to the total measured birefringence in a fiber: stress induced crystallinity, oriented amorphous polymer, and stress on amorphous polymer. In general, birefringence can be measured by a compensator method using a cross polar microscope in combination with a compensator to measure retardation and the diameter of the fiber allowing for the calculation of birefringence. Basically, birefringence (dimensionless) is calculated as compensator retardation (nm) divided by 1000 and further divided by fiber diameter (micron).

Birefringence is an important measurement for the present invention because it helps determine the total orientation of the sample. Furthermore, by accounting for the percentage of crystallinity, a measurement of birefringence allows for the determination of orientation of the amorphous region of a polymer.

Because birefringence is a non-invasive technique for measuring an important property of a fiber, it is expected that it can be used during fiber formation to allow technicians to further control the fiber spinning process to provide the desirable fiber product. As certain examples demonstrate, as the fiber velocity increases while other parameters remain relatively constant, the birefringence first increases then passes through a maximum and begins to decrease. Applicants have found that in this region of decreasing birefringence, with increasing velocity, low shrinkage fibers can be produced. Fibers produced in this region of decreasing birefringence will generally have a shrinkage corresponding to the "ultimate" shrinkage. Birefringence values, maintained within a range of about 0.017 to about 0.012 will provide fibers having a shrinkage of less than about 15%, for the portion of the curve for decreasing birefringence at increasing velocity.

For some operating conditions it is possible to make low shrinkage fibers without having the birefringence decreasing at increasing velocity. Birefringence values of greater than 0.010 generally produce fibers with shrinkage of less than about 20%. Birefringence values of greater than about 0.012 generally produce fibers with shrinkage of less than about 15%. Birefringence values of greater than about 0.015 generally produce fibers with the lowest shrinkage with values of less than 12% being obtainable.

Birefringence values of 0.003–0.007 are useful for making high shrinkage fibers. Fibers with shrinkage of greater than about 40% are readily produced under those conditions.

F. Tenacity Generally

In fiber technology, tenacity is considered a measure of tensile strength of a fiber. The measurement of tenacity is particularly important in situations where fiber strength is important. Such applications include twines, multifilament threads, partially and fully oriented yarns, structural textiles, and nowovens. Tenacity is typically measured on a tensile testing machines such as a Instron tensile tester. Tenacity will generally depend on extent of orientation and crystallinity in the fiber. In applications where high tenacity fibers are desired, it is believed that tenacity values of greater than about 1.5 gms/denier should be provided. More preferable are tenacity values of greater than about 3 gms/denier and most preferable greater than about 5 gms/denier. In general, because tenacity increases with increasing orientation, it also increases with increased crystallinity. Therefore, low shrink fibers will tend to have a higher tenacity.

While it is generally true that tenacity will increase and shrinkage decrease as spin-line stress increases, applicants have found that control of the optical composition provides a separation of these two effects. In other words, to obtain high tenacity, a lower optical purity may be desired. For example, this may correlate to a optical purity of between 2% and 4% of R-lactic acid units in order to achieve high tenacity. To obtain low shrinkage, optical purities of less than 2% R-lactic acid residues are desirable, although low shrinkage can be achieved with more polymer containing more than 2% R-lactic acid residues with the appropriate application of drawing, annealing, and relaxing of the fiber.

We expect that polymers with higher levels of R-lactic acid residues can be drawn further without excessive crystallization. This higher draw ratio results in greater tenacity.

G. Monocomponent Fibers

As discussed above, monocomponent fibers are fibers manufactured by extruding a single composition. The composition may include a single polymer or a mixture or blend of two or more polymers as well as other additives. Monocomponent fibers are often formed via single composition feed. In contrast, multicomponent fibers are formed from at least two compositional feeds. The two compositions then join and form a single fiber. In most applications where monocomponent fibers are desired, it is generally advantageous to provide low shrinkage fibers.

1. Providing Low Shrinkage Fibers

As discussed above, low shrinkage fibers are generally desirable from the standpoint of providing fabrics which exhibit dimensional stability over a range of handling and storage conditions. It has been found that shrinkage can be controlled by balancing between the enhancing effect of molecular orientation and the stabilizing effect of crystallinity. In order to provide low shrinkage fibers, it is important to provide a significant amount of crystallinity. Generally, this will correspond with an amount of crystallinity of greater than 20 J/g, and more preferably greater than 25 J/g. It should be appreciated that this heat of fusion value is provided on a polylactide basis.

It can be seen from examples 1 and 2 of this application that for polylactide fibers, filament crystallinity and orientation have been found to generally increase with (a) increase in take-up velocity; (b) decrease in melt temperature; (c) decrease in melt mass throughput; and (d) increase in molecular weight and polydispersity. In addition, it has been found that blending of resins with different molecular weight has been found to not generally produce reduced shrinkage within the range of conditions outlined in Example 1. However, careful selection of blend components combined with intimate mixing of the components may produce different results. Furthermore, crosslinking has been found to reduce the spinning speed needed to obtain crystallinity and a major drop in shrinkage, but may result in higher ultimate shrinkage at higher spinning speeds.

Linear polylactide has been found to provide the lowest ultimate shrinkage at high spinning speeds. Tensile strength, Young's modulus and yield strength have been found to increase with increase in spinning speed up to a maximum value and then decrease somewhat at higher spinning speeds. Furthermore, it has been found that elongation-to-break first increases with spinning speed and orientation, reaches a maximum value and then decreases as the crystallinity and orientation further increase.

It has additionally been found that melt temperature and the melt throughput affect the crystallinity and orientation of PLA fibers which, in turn, affect the shrinkage of the fibers. Generally, fibers with shrinkage of less than about 20% will have crystallinity in excess of 20 J/g. To produce fibers with a shrinkage of less than about 15% will generally require crystallinity in excess of 25 J/g.

At constant melt throughput, the lower the melt temperature the lower the velocity at which shrinkage reaches its minimum. When the melt temperature is held constant the shrinkage reaches its minimum earlier for lower melt throughput. Of course, variations in composition will also affect the results. It is believed that molecular weight and molecular microstructure will have significant effects on the development of crystallinity, orientation and shrinkage in the melt spun filaments.

Example 1 was conducted to (a) determine the range of conditions under which a typical polylactide resin can be spun; and to (b) characterize the filaments produced. The example evaluates the shrinkage behavior of the spun filaments and evaluating the influence of process variables on the amount of shrinkage.

The purpose of Example 2 is to demonstrate the effect of crosslinking, branching and blend ratio on the amount of shrinkage. Generally, crosslinking, branching, and mixing of different molecular weight PLA affect the orientation and crystallinity which in turn affect the shrinkage. At constant mass throughput and melt temperature, higher crosslinking contents result in higher spinline stress for a given take-up velocity which clearly tends to accelerate the crystallization process in the spinline. In addition, crosslinking lowers the velocity at which shrinkage reaches its minimum, although the lowest achievable shrinkage (ultimate shrinkage) is still relatively high.

Lower branching content (more linear) lowers the ultimate shrinkage. In FIG. 20, polymer 2 g shows the lowest branching content, reached the lowest shrinkage value of 7%. Thus, higher molecular weight and lower branching content is expected to have better shrinkage properties.

Additional factors which are likely to effect fiber properties include the use of nucleating agent and tacticity. It is expected that nucleating agents will create crystallization sooner in the spin line. Exemplary types of nucleating agents are described earlier and are also described in U.S. Pat. No. 5,525,706, the entire disclosure of which is incorporated herein by reference. It is generally believed that nucleation facilitates crystallization. In the case of spinning, it is believed that crystallization would occur at a higher polymer temperature. In other words, crystallization would occur closer to the spinnerette. Furthermore, the crystalline domain size is expected to be smaller in that here would be many more crystalline domains.

An expected advantage of facilitating crystallization at a higher polymer temperature is the ability to reduce the quench load. The reason for this is that the polymer becomes a solid at a higher temperature. Furthermore, it is expected that a more uniform draw can be provided by the use of nucleating agents, and that the maximum draw ratio would be higher. Generally, it is expected that a nucleating agent will provide smaller and more numerous crystals. This is expected to result in a broadening of the bonding window, and more uniform die uptake.

It is expected that nucleating agents can be used to effect shrinkage and thermal stability. It is anticipated that enhanced thermal stability can be provided at lower fiber velocity. As the level of D-lactide is increased in a PLA composition, it is generally necessary to spin the polymer faster and provide a colder quench.

Although polymer properties, such as molecular weight, optical composition, and extent of branching or cross linking affect fiber formation processes, applicants have found the following ranges to be generally useful for producing low shrinkage fibers via melt spinning. These ranges include, alone or in combination, throughput of 0.3–3 g/min/capillary; number average molecular weight within the range about 50,000 to about 100,000; a temperature within the range of about 200° C. to 250° C.; and a fiber velocity within the range of about 1,000 to about 10,000 m/min. The throughput can be 0.5–1.2 g/min/capillary, the number average molecular weight can be within the range of about 70,000 to about 95,000, the temperature can be within the range of about 220° C. and about 245° C., and the fiber velocity can be within the range of about 1,000 to about 3,000 m/min. It should be appreciated that the maximum fiber velocity will be determined by fiber breakage, and that the range reported here represents the peak in the birefringence vs. velocity curve.

2. Providing High Shrink Fibers

Figure 5:
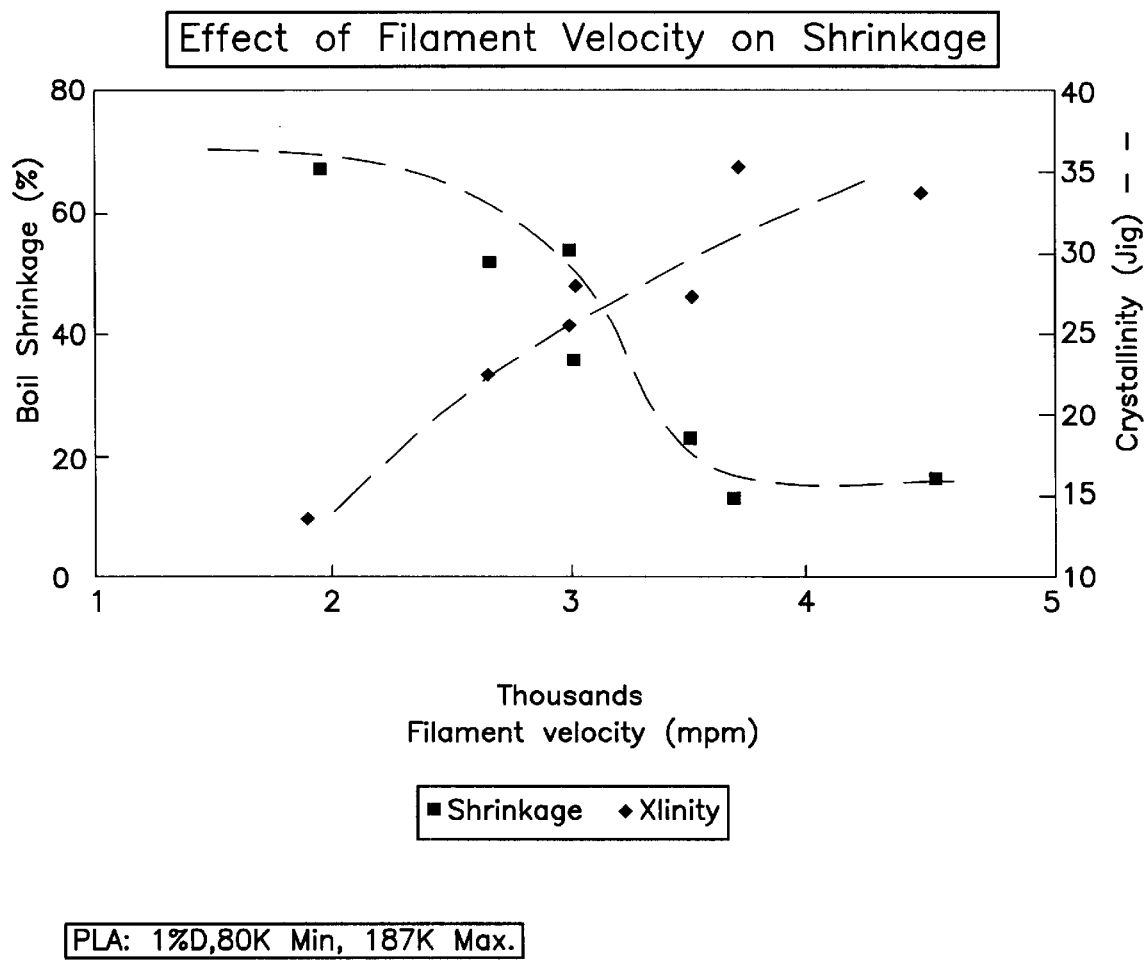
FIG. 5 is a graph showing the effect of filament velocity on shrinkage for a polylactide fiber.
Figure 6A:
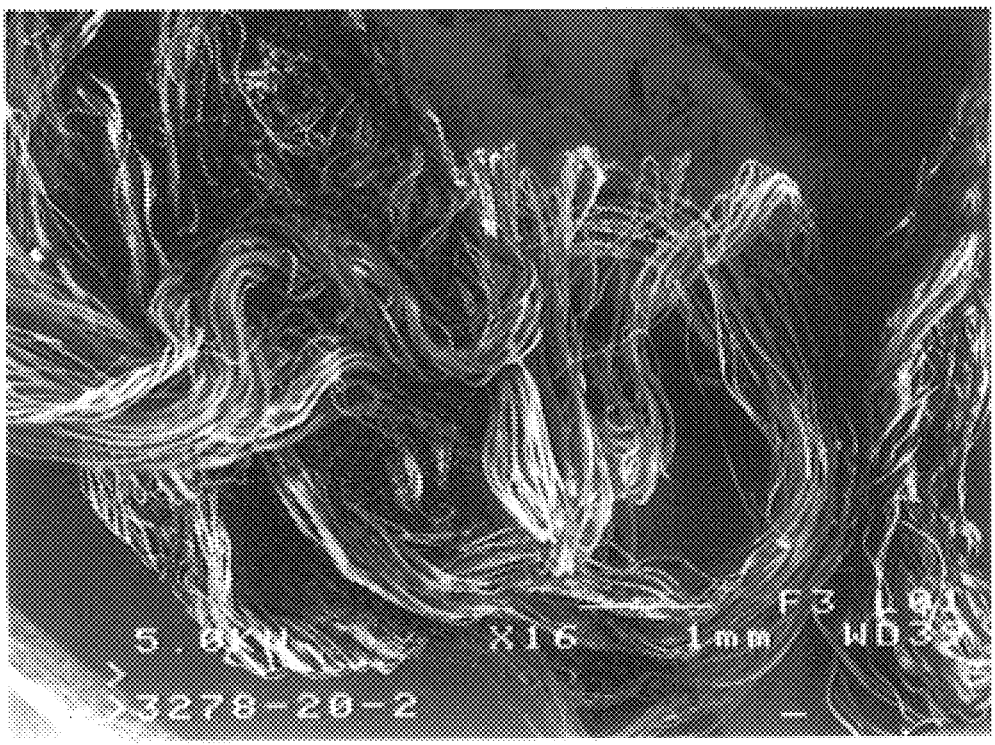
Figure 6B:
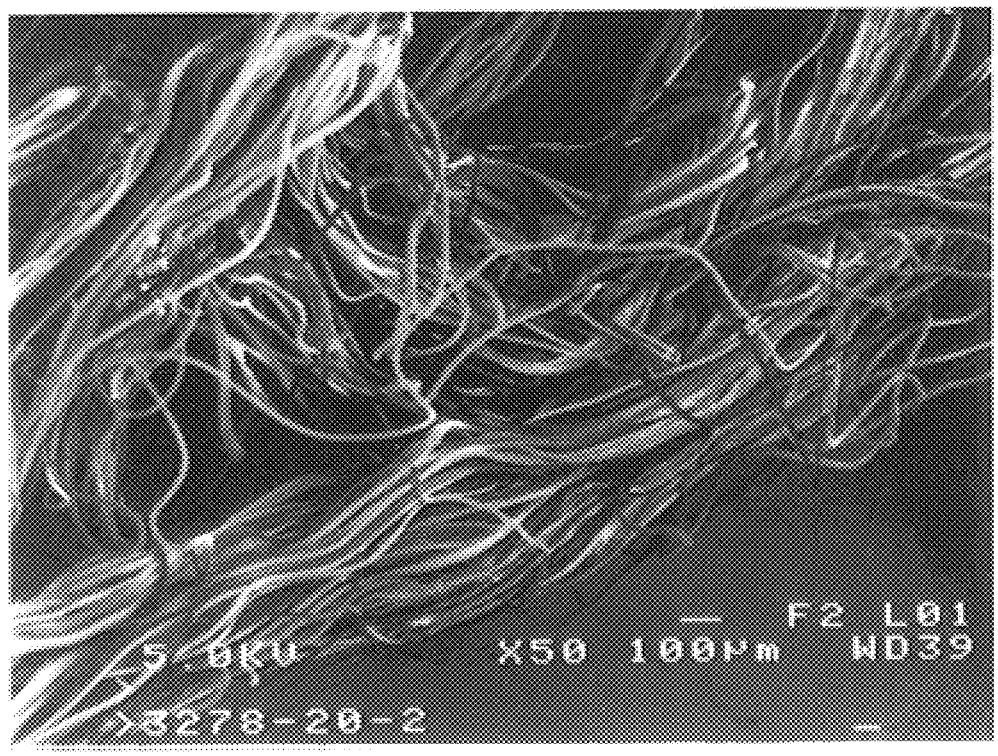
Figure 6C:
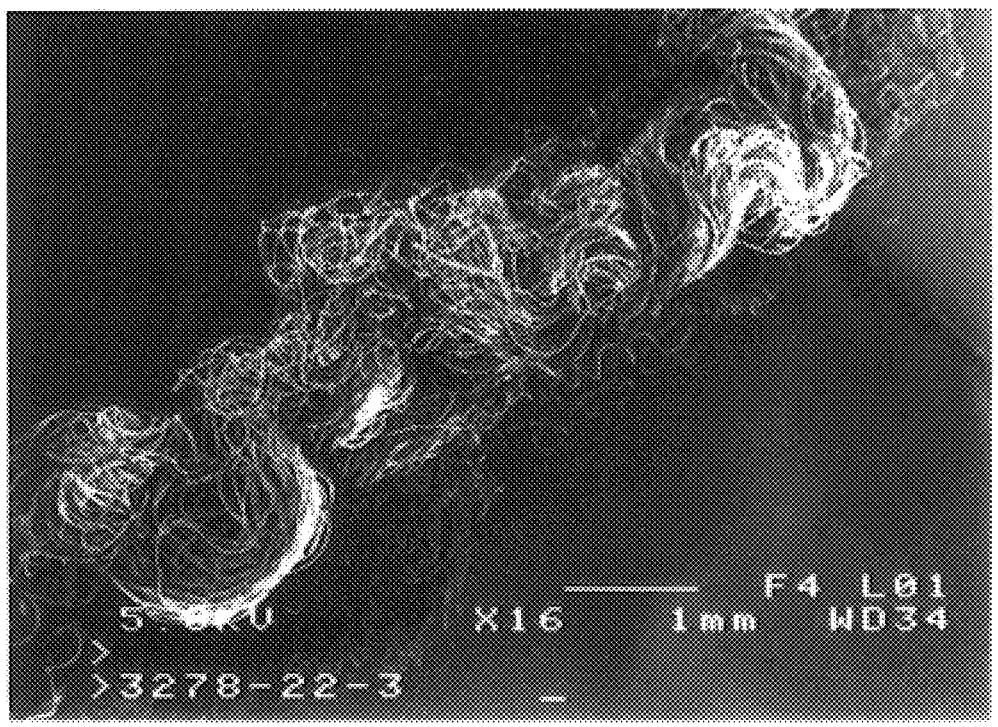
Figure 6D:
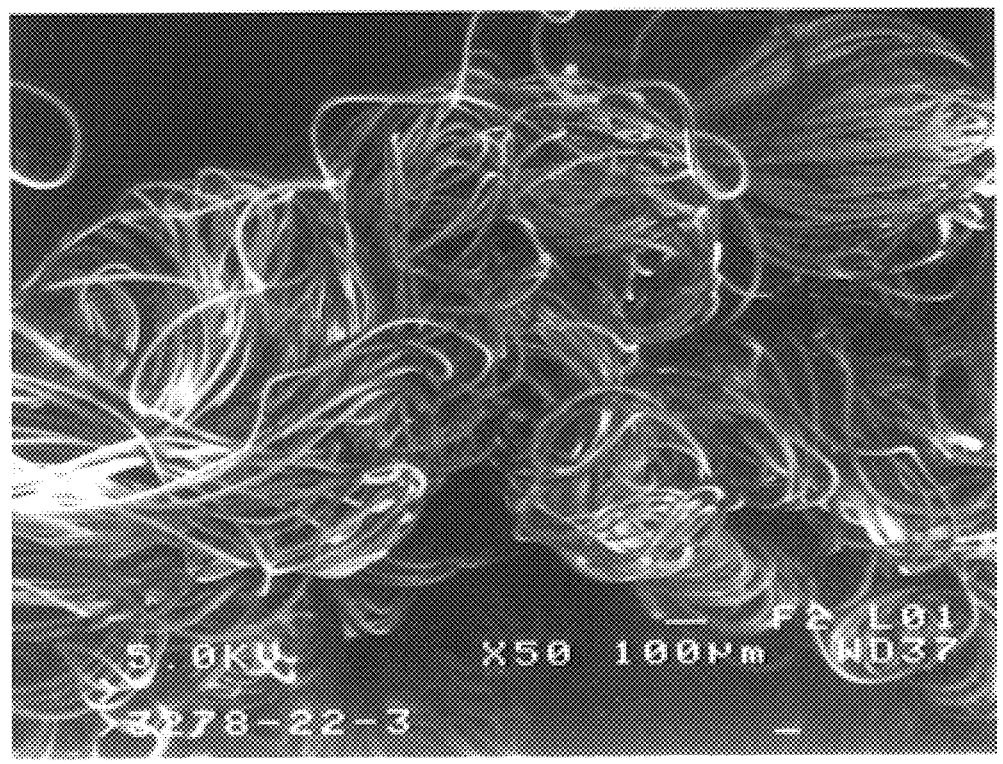

The present invention is additionally related to the production of high shrink fibers from polylactide. It is believed that high shrinkage fibers may provide beneficial properties in certain applications. Generally, high shrink polylactide fibers will provide a heat of fusion value of less than about 25 J/g, and more preferably, less than about 20 J/g. With respect to this, FIG. 5 shows a typical relationship we have observed between boil shrinkage and filament or fiber velocity. Crystallization of polyactide fibers can be prevented by using a polymer with lower enantiomeric purity.

The characterization of whether a fiber is high shrink or low shrink, of course, depends upon the application for which it is intended to be used. In certain applications, a fiber may be considered low shrink while in other applications, it may be considered high shrink.

As generally seen in FIGS. 7–20, high shrinkage corresponds to low crystallinity, and occurs at a point prior to the maximum (if any) in the birefringence vs. velocity curve.

While this section deals primarily with monocomponent fibers, it will be appreciated that high shrinkage fibers are of particular concern in relation to multicomponent fibers, and in particular in relation to side by side bicomponent fibers. The reason for this is that by controlling the relative shrinkage of components in a bicomponent fiber, it is possible to control crimping and loft.

H. Multicomponent Fibers

The multicomponent fibers of the invention are intended to provide advantages for a given application which are not available from monocomponent fibers. These advantages may relate product characteristics such as loft, softness, and bulking properties; processing characteristics such as similar melt temperatures, higher filament velocities, and reduction in quench. Secondary benefits may be realized by improvements in one or more of these characteristics, for example, improved crimp may improve web cohesion thereby resulting in improved carding and yarn processing. Thus, the use of multicomponent fibers provide the ability to impart multiple desirable properties to compostable or at least partially compostable fibers, filaments and fibrous articles. Properties which are either impossible, difficult, or uneconomical to produce in monocomponent fibers can be achieved by combining polymers in a structured geometry relative to the filament cross-section. The components of the fiber can be selected based upon their individual and complimentary properties, as described herein.

Multicomponent fibers are generally characterized as having a structured cross section. In other words, the overall structure or configuration of the cross section is relatively consistent along the length of the fiber. In the case of a sheath/core fiber, a cross section of the fiber reveals a sheath phase and a core phase. In the case of as side-by-side multicomponent fiber, the relative proportions of each contributing side material is relatively consistent. It should be appreciated that each of the components of a multicomponent fiber can include a single polymer composition or a blend of polymer compositions. In the case of blended polymer compositions, the blend can be miscible (single phase), semi-miscible, or immiscible with discontinuous or co-continuous phases. This is similar to the situation discussed above with respect to monocomponent fibers where the monocomponent fiber can include a blend of polymers exhibiting a discontinuous or cocontinuous phases.

The most common constructions of multicomponent fibers include the sheath/core construction and the side-by-side construction. Various hybrids and modifications of those two types of constructions can additionally be provided. Such constructions can include the names segmented pie, islands-in-sea, and the like, and may be described, for example, by FIG. 4.

The multicomponent fiber of the present invention includes at least one component which is PLA or PLA-based. The applicants have discovered numerous advantages to the incorporation of a PLA or PLA-based component in the multicomponent fiber. Several of these advantages are discussed below in detail.

The crimp of multicomponent fibers can be controlled through differential shrinkage of two PLAs or a lactide polymer having a different crystallization rate, and/or onset temperature and/or extent and/or crystalline morphology: side-by-side or asymmetric configuration. For example, using a high "D" and low "D" PLA.

The strength and bonding of multicomponent fibers can be controlled. For example, sheath-core configuration using a lower melting or superior bonding degradable polymer sheath component in combination with a core of a polymer with superior tensile properties and/or higher relaxation temperature and/or slower relaxation rate.

The low shrinkage feature can be advantageous. For example, sheath-core configuration using a sheath component suited for bonding, in spite of possibly having poor thermal-dimensional stability, in combination with a thermally stable core. For example, a polylactide of high enantiomeric purity can be used for a thermally stable, low shrinkage core and polylactide of lower enantiomeric purity (amorphous) could be used to provide a thermally bondable sheath. Conversely, a low modulus PLA, such as one having lower enantiometric purity, or another polymer having a low modulus can be placed in the core to provide a fiber with lower stiffness, improved hand, drape, or softness, while the sheath provides acceptable bonding and low tackiness. Other polymers, such as polycaprolactone or Bionolle™ can also be used as a sheath.

The fibrillatable properties can be adjusted by selection of biodegradable or soluble polymers whose domains dissociate during or after spinning, or after treatment, and producing a mixed denier or microfibrous-containing structure.

The degradability of multi-component fibers can be controlled through control of crystallinity extent and/or crystalline morphology or through compositional control.

The following is a partial list of documents which discloses biodegradable fibers which could be used in the present invention: U.S. Pat. No. 5,525,706; European Publication 637 641 A1; U.S. Pat. Nos. 5,437,918 ; and 5,010,145. The disclosures of these documents are incorporated herein in their entirety.

The following is a list of patent documents which generally describe bicomponent fiber formation processes: U.S. Pat. No. 3,595,731 to Davies et al.; U.S. Pat. No. 3,382,305 to Breen; U.S. Pat. No. 4,211,816 to Booker et al.; U.S. Pat. No. 4,361,609 to Gerlach et al.; U.S. Pat. No. 4,381,335 to Okamoto et al.; U.S. Pat. No. 4,420,534 to Matsui et al.; U.S. Pat. No. 4,473,617 to van Leeuwen et al.; U.S. Pat. No. 4,477,516 to Sugihara et al.; U.S. Pat. No. 4,830,904 to Gessner; U.S. Pat. No. 5,308,697 to Muramoto et al.; U.S. Pat. No. 5,336,552 to Strack et al.; and EPO486 934 A2 to Yousuke. The disclosures of these documents are incorporated by reference herein in their entirety.

Superiority over prior art will depend upon the specific polymer combinations and configurations. It is believed that the general benefit lies in the combination of biodegradability and processing properties such as excellent spinning, webforming and bonding in combination with filament and fabric properties, such as thermal-dimensional stability softness, drape, stability to ionizing radiation, strength, elongation, toughness, differential shrinkage, fibrillation, and combinations thereof.

In the case of polyolefin/PET or polyolefin/polyolefin bicomponent fibers, or other nonbiodegradable bicomponent filaments and fabrics, the obvious advantage is biodegradability in combination with a wide range of commercially viable properties.

In the case of mono-component fiber configurations made from biodegradable polymers, the advantages are numerous yet dependent upon the specific combination of polymers and their configuration.

Bicomponent biodegradables offer a route to reduced overall use of additives, in particular those that affect surface properties, such as, surfactants or hydrophobic agents, and pigments (pigment in the sheath, no pigment core). By adding the agent to the sheath or outer component, lower levels can be used to achieve equivalent performance.

1. Improved Performance Characteristics for Sheath/Core Constructions

PLA and PLA-based compositions can be advantageously used as the sheath component in a sheath/core construction. As indicated by examples 5 and 6, the use of PLA in the sheath component can result in increased spinning speeds compared with the use of polyethylene terephthalate or polypropylene as the sheath component. In addition, diminished quench requirements can be provided. As a result, this reduces the amount of cold air needed to quench the fiber.

It should be understood that in quench limited processes, it is possible to increase throughput by using PLA in the sheath component. In comparison with a monocomponent of polypropylene, the stick point can be reduced by the use of PLA in the sheath layer. As described by example 3, the stick point can be reduced from 12 inches, in the case of polypropylene, the stick point can be reduced to 8 inches by the use of a PLA sheath.

As shown by example 3, the substitution of PLA for PET as the sheath component with a core composed of polypropylene results in the ability to spin at lower capillary throughputs, thus, lower denier filaments can be spun. At throughputs below about 0.6 g/min-cap, the PET-sheath filaments broke at diameters between about 15 to 19 microns, whereas the PLA-sheath filaments did not break at capillary throughputs as low as 0.1 g/min-cap and filament diameters as low as about 8 microns. Typically, fine denier includes fibers under 10, and more preferably under 3 grams per 9000 meters.

2. The Use of PLA in the Core

The use of PLA as the core component in a sheath/core construction provides several advantages. Generally, when running two more components in a multicomponent fiber, it is desirable to be under a 10° C. optimum temperature difference between the two polymer compositions. The polymers can be maintained at separate temperatures when they are each in their own extruder, but once they are contacted in a die, the temperature that must be maintained in the die is the temperature required by the higher temperature processing polymer. As a result, the lower temperature processing polymer must be heated at the higher temperature which can have adverse effects such as degradation, oxidation, crosslinking, carbonization, etc. Polyolefins are ideally processed at a temperature in the range of 210–240° C. Terephthalate-based polyester, in contrast, are optimally processed at temperatures of at least 280° C. Accordingly, when polyolefin and polyester are provided as separate components in a multicomponent fiber, there is at least a 40° C. temperature difference between the ideal processing temperatures. PLA is advantageous as a substitute for polyester(PET) because it provides an optimum processing temperature of between about 220–230° C., depending upon the molecular weight of the PLA. This optimum temperature is much closer to the processing temperature of polyolefins.

A further advantage to processing a polymer composition in the core layer at a cooler temperature is that it will likely put less demand on the quench system. Thus, for quench limited processes, the use of PLA in the core may increase throughput. Furthermore, the lower processing temperature in the die is expected to increase the longevity of the die. A further apparent advantage to running at a lower temperature is reduced energy expense.

It is expected that the use of oriented and crystalline PLA in the core layer may enhance the thermal stability of the fiber.

The core is generally the structural part of the fiber. The sheath is generally provided for bonding purposes with other fibers. As a result, it may be desirable to provide the sheath component to be as small as possible. Also, the sheath component may be advantageous for providing dye properties, abrasion resistance, flame retardancy, moisture transport, hydrophilicity, hydrophobicity, UV stability, etc.

It should be clear that a sheath/core construction can be provided with PLA as the core component and a different PLA as the sheath component. An advantage here is that the entire fiber can be biodegradable.

3. Side by Side Multicomponent Construction

The use of the side by side construction can be advantageous when it is desired to provide in each of the components with different shrink or crimp rates.

In the case of a 100% PLA side by side multicomponent construction, one component can include a low percentage of D-lactide or meso-lactide and the other component can include PLA polymer having a high percentage of D-lactide or meso-lactide. It is expected that the high percent D-lactide or meso-lactide polymer would provide more shrinkage when exposed to heat. Another advantage to the use of a 100% PLA side by side construction is that the fiber can be considered self crimping.

An exemplary side by side construction can include polypropylene as one component and PLA as another component. It is expected that this side by side construction would be self crimping. PLA, in such a construction, offers an advantage over the use of PET because it can be activated at a lower temperature than PET. As a result, it may be possible to provide a fabric having equal loft or better by the use of PLA at a lower energy cost and at a faster rate. The photos provided in FIGS. 6(a)–(d) show the crimps in thermally treated fibers.

I. PLA As A Binder Fiber
I. PLA: CoPET Substitute:
Lactide polymers may be used as low cost replacement for copolyesters.
Copolyesters such as DuPont's
Merge 3991 (40% DMI, 0.653IV) and Merge 3946 (17% DMI, 0.653 IV) or EMS's Grilene D 1352G (40% IPA), are used as "cospun" filaments with PET or as one component of bi- or multicomponent fiber system. In both cases the function of the coPET is to bind the other filaments together.

A. Cospun filaments filaments usually spun from the same spinneret as filaments composed of different polymers. While the two of more types of filaments are extruded from the same spinneret, each capillary extrudes only one polymer composition. In contrast, a bicomponent filament has two of more polymer compositions extruded from the same capillary orifice.

Spunbond:
Copolyester is currently cospun with PET by BBA's Reemay® spunbond process. Copolyester filaments are spun together with PET filaments. The filaments are sufficiently intermingled so that when the cospun web is introduced to a bonding unit the lower melting coPET becomes tacky or melts resulting in the adhesion of the PET filaments into a coherent web. Loft, strength, elongation, drape and numerous other fabric properties are controlled via the selection of the appropriate material and processing conditions.

Yarn/Textiles:
In the case of continuous or staple filament yarn manufacture, the lower melting coPET filaments when combined with other filaments could be used to heat set yarn twist, or yarn bulk or texture after airjet texturization. Upholstory and carpet yarns could conceivably possess unique properties such as resilience, wear resistance, and hand by selecting tho appropriate PLA (melt or bond temperature determined by % D, MW, MWD, and branching), processing conditions and quantity.

Staple:
In the case of staple fiber, coPET can be spun with other polymers or by itself, then drawn, crimped, and cut to form staple. The staple can then be blended with other fibers or directly carried into webs to be thermally bonded (calendar, through-air, steam can, hot air-knife, sonic, IR) to produce nonwoven rollstock. Alternately, the fiber can be carded or airlaid, then entangled using any number of processes including noodle punch or spunlacing. The entangled web can then be thermally treated to form bonds. One example is that of a trunk-liner used in automobiles. Typically needlepunched felts or nonwovens are thermoformed into tho shape of an article such as a car trunk. When the substrate is cooled to below that of the softening point of the adhesive polymer, the article then retains the shape of the mold.

Wetlaid:
In the case of chopped or cut fiber, coPET can be spun with other polymers or by itself, then drawn and cut so that the fiber is suitable for wetlaid (paper making) processes. The synthetic fiber acts not only as a reinforcement for the cellulosic substrate, but also acts as a binder - adding stiffness, reducing lint and the like.

Meltblown:
Copolyester could be "co-blown" with PET, PBT or other polyesters or polymers. The idea would be to provide a lower melting bonding agent in with the matrix polymer. By controlling the ratio of the copolyester with the matrix polymer a range of desirable properties might be achieved. Sufficient coPET would enable lamination of the meltblown web with additional webs to form laminates and composite structures. Most spunbond-meltblown-spunbond structures utilize calendering to effect bonding. With sufficient coPET in the meltblown and/or spunbond, the entire structure could be consolidated using through-air or steam-can bonding, providing a barrier structure with greater loft, filter capacity, comfort, breathability, strength, elongation and drape, to name a few.

B. Bicomponent:
In contrast to cospun filaments, coPET can be used as one of the components in bi- or multicomponent fibers and articles made from them. Having the adhesive polymer present continuously along the surface of the filament and supported by other components in that filament can be an advantage over the traditional binder fiber or cospun approach. While the approach is different, the end-uses are very similar. Freudenberg, Hoechst and others produce nonwovens from bicomponent fibers composed of PET and coPET. Bicomponent fibers can also be used in Yarn and textile products, airlaid, carded or wetlaid nonwoven products, or spunbond and meltblown products. The fibers or webs described above can also be used in combination with any number of other substrates to form novel laminates and composite structures.

C. Binder Fiber:
Alternately to cospun or bi- or multicomponent fibers, binder fibers can be produced alone from coPET, and subsequently blended or combined with fibers or substrates to serve as a binder. Binder fibers can also be used in Yarn and textile products, airlaid, carded or wetlaid nonwoven products. The fibers or webs described above can also be used in combination with any number of other substrates to form novel laminates and composite structures.

One use of coPET binder fibers is to adhere airlaid pulp fibers into coherent mat that is used for insulation.

III. Uses of Materials

The materials and techniques described herein can be used to manufacture a very wide variety of nonwoven fabrics, for use in an even wider variety of products. It is an advantage that materials described herein can be converted into fabrics by a variety of fabric manufacturing techniques. As a result, the preferred materials can be incorporated, to advantage, in many fabrics and many final products.

In general, nonwoven fabrics using materials described herein can be prepared using any of the three following general techniques for preparing nonwovens: textile manufacturing techniques; paper manufacturing techniques; and extrusion manufacturing methods. In addition, hybrid or combination methods can be used.

In general, textile technology or systems include garneting, carding, and aerodynamic forming of fiber into preferentially oriented webs. Fabrics produced by these systems generally comprise drylaid nonwovens. The fabrics or fiber structures are made with machinery used in the staple fiber industry, which manipulate preformed fibers in the dry state. Textile technology also includes structures formed from a tow of fibers and fabrics composed of staple fibers bonded by stitching filaments or yarns.

In general, paper type processes include drylaid techniques and modified wetlaid techniques designed to accommodate fibers longer than wood pulps and different from cellulose. These fabrics (drylaid or wetlaid nonwovens) are manufactured with the machinery from the pulp fiberizing industry (hammer mills) and the paper forming industry (slurry pumping onto screens). Such equipment is generally designed to manipulate relatively short fibers that are suspended in fluids.

The extrusion technology methods or systems include spun bond techniques, melt blown and porous film systems. Such fabrics include spun bonded, melt blown, textured and apertured films. These are sometimes referred to generically as "polymer laid" fabrics or nonwovens. The fabrics are produced with machinery associated with polymer extrusion (fiber spinning, film casting or extrusion coating).

In general, regardless of the technology used to prepare the fabric, the principal variables in manufacturing concern: fiber selection and preparation; web formation; web consolidation (bonding); and finishing.

Web formation techniques were generally discussed above. Fiber selection is discussed elsewhere herein, when preferred compositions are described. Web consolidation or bonding is the process by which the fibers or fibrous materials are interlocked to provide the integrity or strength of the fabric structure. Various types of bonding for example include: mechanically bonded systems, stitch bonded, needle felted, needle punched, spun laced, jet laced, hydroentangled, apertured, chemically bonded, resin bonded, latex bonded, powder bonded, print bonded, saturated, spray bonded, foam bonded, frothed, thermal bonded, point bonded and ultrasonically welded or bonded arrangements. These various techniques can be used with systems according to the present disclosure, to advantage.

The process of finishing includes slitting the fabric to the width desired, winding the fabric in roll form or otherwise putting it in form for manipulation, and treating the fabric surface, if desired, either chemically or mechanically to achieve desired properties.

The following table, incorporated from "Nonwoven Fabric Primer and Reference Sampler", Inda, Association of the Nonwoven Fabrics Industry, 1992, outlines the three basic manufacturing systems, types of fiber selection and preparation used in each, web formation techniques used in each, web consolidation techniques used in each, and finishing techniques used in each, in typical applications. Materials according to the present invention, as described herein, can be incorporated into these various systems to advantage.

In general, in textile type processes, the fiber is premade, and then incorporated into the textile process for generation of the desirable nonwoven material, using the various techniques of that industry as described above. Products that can be formed from nonwovens made by textile type processing: various filtration media; adsorbent media such as wipes and medical dressings; various types of cushions or paddings such as used in the home furnishings industries (bedding, blankets, carpet backing, drapery, upholstery, etc.), shoes or other padded structures, or apparel. In these types of products, often durability, dimensional stability, resilience, loft and similar physical properties of the textile are important.

In some industries, a key performance characteristic desired in the nonwoven textile is operation as a fluid barrier, for example, in medical apparel. In such industries in addition to properties as a fluid barrier, properties allowing for sterilization of the substrate may be important.

Wicking capabilities and tendencies may be important when the media is used as part of an adsorbent (or absorbent) construction, for example, to surround an adsorbent (or absorbent).

When the textile is used as a cover stock, properties such as strength, heat shrink tendencies, porosity and permeability are of greatest importance.

Paper type processing can also be used to make a wide variety of products of fibers according to the present disclosure. As with textile type processing, in paper type processing, preformed fibers are generally applied by the paper making equipment to form the product. Typically wetlaid products are made, but drylaid processing is possible. Variations to achieve desirable wet strength, dimensional stability, absorbency (or absorbency) and loft can be accommodated with the techniques described herein. Products that can be made using such processing include, for example, substitutes for cellulose fiber or paper materials in products such as: tea bags; surgical drapes; air filtration media; absorbent towels and wipes; and as components in apparel.

TABLE A

Basic Nonwoven Fabric Manufacturing Systems

| | Textile | | | Paper | | Extrusion | | |
|---|---|---|---|---|---|---|---|---|
| | Garnetting | Carding | Air Laid Fiber | Air Laid Pulp | Wet Laid | Spunbound | Meltblown | Film |
| Fiber Selection and Preparation | Natural and Manufactured Textile Fibers | | | Natural and Manufactured Fiber/Pulp | | Fiberforming Polymer Chips | | |
| | Mechanical Opening and Volumetric Blending | | | Mechanical Opening Gravimetric Feeding | Wet Slurry | Mechanical, Electrostatic, Aerodynamic Filament Orientation | Aerodynamic Fiber Orientation and Shattering | Perforate, Cas Cast and Aperture |
| Web Formation | Mechanical Parallel Fiber Layers Randomized Batts | | Isotropic Fiber Layers | Fluid Random Fiber Matts Controlled | | Pattern Layering on Conveyor Screen | Collection on Conveyor Screen | Heat, Heat Stretch, Perforate, Heat, Stretch |
| Web Consolidation (Bonding) | Crosslapped Layers Stitchbonding, Needlepunching, Hydroentangling | | | Mechanical Hydroentangling | Fiber Layers Mechanical Needlepunching | Cooling | or Shape | |
| | Chemical | | | | | | | |
| | Sprayed Latex or Powder, Saturated, Printed, or Frothed Latex; Solvent | | | | | | | |
| | Thermal | | | | | | | |
| | Thermal Calender, Radiant or Convection Oven, Vacuum Drum or Mold, Laminating, Sonic Welding | | | | | | | |
| Finishing | Slitting, Winding | | | | | | | |
| | Other Application-Dependent Physical or Chemical Surface Treatments | | | | | | | |

In general, the extrusion processing can be made to form continuous fibers from the materials described herein. These techniques will be particularly important in forming a variety of flash spun, spun bond or melt blown products. End use products incorporating such materials would include: protective clothing; geotextiles; cover stocks; filtration media; roofing components; carpet backings; and fluid adsorbent (or absorbent). For example, a cover stock might be surrounding adsorbents in such materials as diapers, adult incontinent products, and oil adsorbent pads and feminine hygiene products. The cover stock may be used in dryer sheets to enclose the active ingredients.

The various performance characteristics to be obtained for such materials of course turn on the end use. Generally such properties as strength, porosity, and dimensional stability will be the principal characteristic of interest.

Hybrid or combination systems allow for the combination of two or more manufacturing systems to produce specialized structures. For example, material such as powders or granules may be incorporated into the fiber matrix. A fabric can be made by fabric/sheet combining to achieve desirable properties of both, in a laminate. For example, a laminated system of melt blown fibers and spun bound fibers may be constructed in order to take advantage of: the relatively high strength of the spun bond fabric and the barrier or absorption properties of the melt blown fabric.

Hybrid processes, or combination processes, will be applied in a variety of ways. For example, film-nonwoven fiber laminates may be useable as surgical drape, due to adsorbent barrier properties of the nonwoven material, or as diaper backsheet where the film provides a liquid barrier and the nonwoven provides textile like aesthetics. A double-sided laminate, comprising one media for absorbency characteristics and another for containment characteristics might be used as a wound dressing.

An SMS combination (spun bond-melt blown-spun bond) could be used in medical apparel as a fluid barrier or a bacterial barrier. This application would be used with the spun bond layers providing strength and integrity and the melt blown layer providing for some desired level of protection or barrier properties.

The materials can also be incorporated into elastic laminates, in order to provide improved fit and comfort to such articles as diapers, face masks, or clean room garments.

In many of the applications described above, dimensional stability over a range of temperatures will be a desired characteristic of the nonwoven material. Techniques described herein in order to obtain low heat shrinkage can be applied to form fibers used in the various material forming techniques described above.

Loft characteristics are important in many of the products described above. Loft can be improved by techniques described herein relating, for example, to: use of heat shrink characteristics to generate crimp, especially in multicomponent systems; or, propensity for mechanically induced crimping. For example, formulations of polylactide which will self-crimp upon application to heat, can be employed in fabrics in which high loft is desired, to advantage.

When strength characteristics are important, control of crystallinity or optical composition will typically be desired. In this manner, tenacity for the final product or individual fibers, can be provided at desirable levels. When absorbency (or adsorbency) is important, generally such factors as fiber surface area in the nonwoven and surface finish are important. The general techniques described herein can be applied with respect to this variable.

Filtration properties of a nonwoven typically relate to fiber size, surface area and media porosity, among other factors. The techniques described can be used in a variety of applications to facilitate filtration applications.

EXAMPLES

Example 1

A polylactide composition was provided having a number average molecular weight of 93,000, weight average molecular weight of 212,000, a polydispersity index of 2.28, 0.9% D-lactide, Mz of 369,000, Mz+1 of 562,000, Mz/Mw of 1.74, 0.7% residual lactide, and 2.3% oligomers. The polylactide composition was melt spun.

Spinning was carried out using a Forne extruder. Fiber was taken up in two ways: (a) using an air drag drawdown device and (b) using a winder. The winder was used for spinning speeds less than 1500 m/min in the case of the systematic experiments described below. All experiments used a four-hole spinneret. The take-up velocities were calculated from the continuity equation and the measured values of mass throughput and final filament diameter. Density was estimated from values of the crystalline and amorphous densities reported in the literature and measured crystallinity. The crystalline and amorphous densities of polylactide have been reported as 1.290 and 1.248 g/cm$^3$, respectively. See E. W. Fischer, H. J. Sterzet and G. Wegner, Kolloid—Z.U.Z. Polymers, 251, 980(1973). A range of extrusion temperatures and mass throughputs were used. These are described in the results. It is important to note, however, that the indicated mass throughputs are the total of all four filaments spun. The filaments were spun into ambient, static air; this is a less severe quench than is likely in any commercial process. Spinline length was approximately 3 m. Samples were collected and stored in plastic bags with a desiccant to maintain dry conditions prior to further testing.

The boiling water shrinkage of the filaments was measured according to the procedure discussed above.

The crystallinity was measured by DSC technique at a heating rate of 20° C./min. Following the Tg "peak" a "cold" crystallization is observed if the sample is not highly crystalline when introduced into the DSC. This "cold" crystallization is observed as a small exothermic peak or dip in the curve. All crystals, including those that were present in the initial sample and those that formed in the DSC during the "cold" crystallization, are then melted in the vicinity of 165° C. Therefore, the crystallinity of the fiber before heating is the total crystallinity, measured by the melting endotherm, minus the crystallinity developed in the DSC during the heating process. The latter is measured by the "cold" crystallization exotherm. It is also notable that some DSC curves show two melting peaks. The origin of these peaks is not yet known.

Birefringence was used as a measure of molecular orientation. This measurement was carried out using a four order Berek compensator and an Olympus optical microscope.

Variation of Extrusion Temperature, Mass Throughput and Take-Up Velocity

The first series of spinning experiments provided a broad range of extrusion temperatures, mass throughputs and take-up velocities. This resulted in a wide range of final filament diameters as illustrated in FIG. 7.

The crystallinity, birefringence and boiling water shrinkage of these filaments are given in FIGS. 8, 9 and 10, respectively. FIG. 8 shows that the crystallinity developed in the filaments is a strong function of each of the process variables studied. For example, spinning at 235° C. with a mass throughput (mtp) of 6.34 g/min requires a take-up velocity in the neighborhood of 1500 m/min before substantial crystallinity is developed in the filaments. Spinning at lower mass throughput or lower temperature produces substantial crystallinity at much lower take-up velocities. Lower extrusion temperatures result in higher spinline stress for a given take-up velocity which clearly tends to accelerate the crystallization process in the spinline. Lower mass throughput also increases spinline stress. In the present experiments, lower spinning speeds also mean larger filament diameters and slower cooling rates. Thus, one might surmise that the filament remains in the crystallization temperature range longer, a fact which should result in higher crystallinity. The results indicate that the enhancement of the crystallization rate due to the increase in stress is much more significant, generally, than the effect of changing the cooling rate.

FIG. 9 shows that birefringence (and orientation) tends to increase with take-up velocity as expected. Further, higher birefringence tends to correlate with higher crystallinity.

The shrinkage results of FIG. 10 show that low shrinkage can be achieved at low take-up velocities and low melt temperatures. However, these values were obtained at a cost of high pressure drop, sometimes exceeding 65 psi, in the drawdown device. Under these conditions, it was not possible to prepare small diameter filaments; thus, such filaments are not likely to be commercially feasible or to be used for spunbonded products. In addition, it can be observed that at constant velocity and melt throughput, filaments spun at higher extrusion temperature ($T_m$=246) exhibit higher shrinkage.

After obtaining the preliminary results described above, the range of spinning conditions was narrowed to include conditions that might be chosen for a practical melt spinning or spunbonding process. FIGS. 11, 12 and 13 show the crystallinity, birefringence and boiling water shrinkage of filaments spun with a mass throughput of 2.95 g/min (0.74 g/min per hole) and three different spinning temperatures. In all cases the data cover a significant range of spinning speeds. At a given spinning speed, crystallinity and birefringence increases with decrease in extrusion temperature. Shrinkage exhibits a maximum in the curve at lower spinning speeds caused by the compensating effects of increased amorphous orientation (which increases shrinkage) and increased crystallinity (which stabilizes the filament against shrinkage). Beyond the maximum the shrinkage drops off to about 10% in each case.

It is important to note that the upper limit of spinning speed for each curve in FIGS. 11, 12 and 13 represents the take-up velocity above which the filaments begin to break in the spinline and below which the filaments are readily spun with insignificant filament failure. Clearly, this upper critical spinning speed increases with increase of spinning temperature at constant mass throughput.

FIGS. 14, 15 and 16 show the effect of changing the mass throughput at constant extrusion temperature of 233° C. Higher mass throughput clearly shifts the region of higher crystallinity and orientation and lower shrinkage to higher spinning speeds. Increasing the mass throughput increase the filament diameter at a given take-up velocity. This decrease stresses on the filament, which, in turn, decreases the crystallinity and orientation.

The crystallinity and birefringence curves of FIGS. 11, 12, 14, and 15 exhibit maxima as a function of take-up velocity. The reason for these maxima are not entirely clear at present, but we note that at velocities higher than the velocity corresponding to the maxima in the birefringence curve, the shrinkage is essentially at its 'ultimate' or lowest possible value.

Example 2

Eight compositions were tested.

A summary of polylactide compositions used in this example is provided in Table 1.

TABLE 1

| Material # | Description | Mn | Mw | PDI | Mz |
|---|---|---|---|---|---|
| 2a | 0.35% ESO | 93,100 | 212,000 | 2.28 | 269,000 |
| 2b | 0.35% ESO | 105,000 | 212,000 | 2.02 | 363,000 |
| 2c | 0.35% ESO | 75,000 | 148,000 | 1.97 | 251,000 |
| 2g | No ESO | 97,600 | 199,000 | 2.04 | 353,000 |
| 2h | EsoLAC | 78,400 | 234,000 | 2.99 | 468,000 |
| 2d* | w/ Tartaric acid | 68,800 | 142,000 | 2.06 | 244,000 |
| 2e | 2d + 0.05% peroxide | 76,800 | 182,000 | 2.37 | 390,000 |
| 2f | 2d + 0.1% peroxide | 76,100 | 203,000 | 2.66 | 501,000 |

| Material # | MZ + 1 | Mz/Mn | Oligomers (%) | % Residual Lactide | % R |
|---|---|---|---|---|---|
| 2a | 562,000 | 2.9 | 2.3 | | 0.9 |
| 2b | 549,000 | 3.5 | 0.9 | 0.88 | 1.2 |
| 2c | 379,000 | 3.3 | 0.8 | 0.55 | 1.0 |
| 2g | 575,000 | 3.6 | 0.9 | 0.68 | 1.3 |
| 2h | 731,000 | 6.0 | 1.9 | 0.73 | 1.0 |
| 2d* | 372,000 | 3.5 | 1.3 | 0.46 | 1.1 |
| 2e | 703,000 | 5.1 | 0.8 | 0.43 | 1.1 |
| 2f | 968,000 | 6.6 | 0.9 | 0.42 | 1.1 |

*Composition 2d with tartaric acid was the base polymer used to make peroxide blend compositions 2e and 2f.

Studies of blends of high and low molecular weight PLA were conducted with different blend ratios.

The first category of compositions (2a, 2b, and 2c) were previously studied and discussed in example 1.

The second category of compositions (2d, 2e, and 2f) include polylactide having different amounts of crosslinking. Compositions 2e and 2f were prepared from composition 2d by treatment with 0.05% and 0.1% peroxide, respectively. Evidence of crosslinking is based on the rise in $M_Z$, $M_{Z+1}$, Mz/Mn which are reported in Table 1. The third set of resins (2g, 2h) contains two polymers that differ in branching content. Polymer 2g contains no epoxidized soybean oil and should be a more linear PLA than polymers 2a, 2b, and 2c. Polymer 2h is a 'star' shaped polymer made using an initiator comprised of epoxidized soybean oil which has been reacted with lactic acid.

Spinning Procedure

Spinning and calculation was carried out using the Forne extruder described in example 1. The extrusion temperature was 233° C. and the mass throughput was about 2.85 g/min. It is important to note, however, that the indicated mass throughputs are the total for all four filaments spun. If mass throughput per spinneret hole or per filament is desired, it is necessary to divide the indicated mass throughputs by four.

Effect of Crosslinking

FIG. 17 shows the effect of crosslinking on the amount of shrinkage. It is clear that PLA (2f), which was treated with 0.1 % peroxide and had the highest amount of crosslinking, has the lowest shrinkage at constant take-up velocity (V). It can be deduced from FIGS. 17 and 18 that the higher the amount of crosslinking in the fiber the lower the velocity it takes to reach the 'ultimate' or minimum shrinkage. Note, also, that this value, about 15%, is higher than for the fibers of example 1. Also, during fiber drawing from the melt, it was noticed that (2f) exhibited higher viscosity than the other two. Apparently, crosslinking raised the viscosity of the melt.

When this set of polymers is compared to previously studied resins, (2a) and (2c) interesting results are observed, FIG. 18. Firstly, (2d) has similar shrinking results to (2c). According to Table 1 these two polymers have similar molecular weights and molecular weight distributions. Even though it is not conclusive, the results show that the shrinkage curve of (2d) is slightly to the left of that (2c). It is expected that this is due to the slightly higher values of molecular weight and polydispersity of (2d) when compared to the values of (2c). Secondly, (2f) develops a plateau of minimum shrinkage of about 15%, slightly higher than that of (2a) and (2c). We have observed during melt spinning of the fibers that crosslinking raised the viscosity of the melt which in turn increased the orientation of the molecules. The improvement in shrinkage properties due to crosslinking, to our knowledge, is due to the increase of viscosity which results in a higher molecular orientation and crystallization at a higher velocity. However, the crosslinked molecules should exhibit lower final crystallinity and hence relatively higher shrinkage than the non-crosslinked molecules.

Effect of Branching

Two samples were supplied with different amount of branching. The PLA 2h has higher degree of branching than 2g. According to FIG. 19 2g has developed higher birefringence than 2h and hence, higher fiber orientation and crystallinity. More linear chains are easier to orient and crystallize than branched ones. Thus, branching decrease molecular orientation and rate of crystallization for PLA.

The shrinkage results of 2g and 2h are presented in FIG. 20. It is clear that 2g exhibits lower shrinkage over the whole speed range. In addition it develops lower minimum shrinkage of about 7%. It is worth noting also that when comparing the two first data points which were taken from the spinneret without further drawdown, their shrinkage corresponded to the lowest attainable shrinkage at higher velocities. This fact suggests that there is a limiting shrinkage factor, that is controlled by molecular architectures, below which the amount of crystallinity has no control over it.

Effect of Blend Ratio

Two polymers with different molecular weights were mixed as pellets with different proportions varying from 25, 50, and 75%. The birefringence of the fibers of these samples are presented in FIG. 21. Accordingly, the birefringence of the mixtures all reside close to that of the low molecular weight sample (2c).

The idea behind mixing two polymers with different molecular weights is to improve the shrinkage properties. In performing this study we were hoping that better shrinkage properties would prevail for the mixture of low and high molecular weight samples. We were expecting that when small amount of high molecular weight sample is mixed with the low molecular weight sample, high molecular weight molecules will have more orientation and hence improve crystallinity which in turn would lower the shrinkage. However, the opposite of what we hoped for occurred. In fact, according to FIG. 22 all mixtures have higher shrinkage than the lowest molecular weight sample 2c.

Example 3

A polylactic acid polymer (Cargill Lot/Box 515-710, with an Mn: 69,000 and Mw: 146,000 and 1.2% R) was combined with polypropylene (Montell, MFI~35) in a sheath-core configuration at a 50/50 and 30/70 weight basis ratio. Both PLA and PP were extruded at 230° C. Two, 1¼" diameter extruders with 30:1 L/D were used to convey, melt and extrude pellets. Screw speed was controlled by maintaining the set pressure at the entrance to the meter pump. Pump speeds were adjusted to produce 0.1 g/min/capillary to 1.2 g/min/capillary for the 50/50 component ratios, and 0.1 g/min/capillary to 0.9 g/min/capillary for the 30/70 component ratios, because of meter pump limitations. A bicomponent spin pack with 288 capillaries was used with each capillary measuring 0.35 mm. Filaments were quenched and attenuated using a Lurgi-style air aspiration device. The air aspiration device was set to a constant air pressure of 80 psi. Filaments were collected at each throughput in 0.1 g/min increments, labeled and bagged. Stick point was measured at each throughput. Stick point was recorded as the distance in inches from the spinneret where filaments stick to a stainless steel rod. Sticking was an indicator of the quench limitation of the polymer(s). With PLA on the surface, sticking was prevented.

Sheath-core bicomponents were also made using PET as the surface component (Wellman, 0.64 IV) with a PP core and the 50/50 30/70 weight basis ratios. PET and PP were extruded at a final melt temperature of 295° C. The PET/PP, S/C bicomponent filaments were quenched and attenuated using the same Lurgi-style air aspiration device. The aspiration device applied a constant draw force at 80 psi. Samples were labeled and carefully bagged.

Table 2 compares the stick points for PP/PP, PLA/PP and PET/PP sheath-core bicomponents. Sticking is an indicator of the quench limitation of the polymer(s). With PLA on the surface, sticking is prevented. Table 2 demonstrates the advantage to using PLA on the surface of polypropylene, but also shows the dramatic performance advantage of using PLA instead of PET. The filament breaks recorded for the PET/PP prevent successful drawing of the spin-line at 80 psi. Sensitivity to draw down rate or air gun pressure not only limits throughput and overall production rates, but limits the ultimate filament diameter that can be achieved. Lower throughputs, with high draw down forces yield finer filament diameters.

TABLE 2

Stick Points measured in inches for 50:50 Sheath-Core Bicomponents at 80 psi

| Throughput | High Quench | | | Medium Quench | | | Low Quench | | |
| --- | --- | --- | --- | --- | --- | --- | --- | --- | --- |
| (g/min/hole) | PP/PP | PLA/PP | PET/PP | PP/PP | PLA/PP | PET/PP | PP/PP | PLA/PP | PET/PP |
| 0.1 | breaks | breaks | breaks | breaks | breaks | breaks | breaks | 2 | breaks |
| 0.2 | breaks | 3 | breaks | 7 | 4 | breaks | 21 | 4 | breaks |
| 0.3 | 5 | 3 | breaks | 11 | 5 | breaks | sticking | 5 | breaks |

TABLE 2-continued

Stick Points measured in inches for 50:50 Sheath-Core Bicomponents at 80 psi

| Throughput | High Quench | | | Medium Quench | | | Low Quench | | |
|---|---|---|---|---|---|---|---|---|---|
| (g/min/hole) | PP/PP | PLA/PP | PET/PP | PP/PP | PLA/PP | PET/PP | PP/PP | PLA/PP | PET/PP |
| 0.4 | 7 | 6 | breaks | 13 | 6 | breaks | sticking | 7 | breaks |
| 0.5 | 9 | 6 | breaks | 13 | 7 | breaks | sticking | 8 | breaks |
| 0.6 | 11 | 7 | breaks | 20 | 7 | 7 | sticking | 10 | 6 |
| 0.7 | 12 | 8 | 3 | sticking | 6 | 7 | sticking | 10 | 7 |
| 0.8 | 13 | 9 | 5 | sticking | 10 | 8 | sticking | 12 | 8 |
| 0.9 | 14 | 9 | 6 | sticking | 13 | 8 | sticking | 13 | 8 |
| 1 | 17 | 9 | 6 | sticking | 13 | 9 | sticking | 17 | 9 |
| 1.1 | 17 | 10 | 7 | sticking | 15 | 9 | sticking | 17 | 11 |
| 1.2 | 17 | 12 | 7 | sticking | 18 | 10 | sticking | 20 | 11 |

This example shows that using PLA as a renewable and/or degradable-containing component of a multicomponent system offers, in addition to its inherent degradability, improved spinning behavior relative to conventional polyester/polyolefin systems.

Tables 3 & 4 list the filament diameters for each sheath-core bicomponent system: PP/PP, PLA/PP and PET/PP in respective ratios of 50/50 and 30/70. Break speed is defined to be the throughput where filaments under a constant draw down force continually snap and break off. Continual breaks force inconsistencies in the spin-line preventing sample collection. In a production setting breaks in the spin-line will prevent acceptable web formation.

Table 3 displays the advantages to using PLA. Ultimate denier possible without breaks or sticking is better than PP/PP. And with PLA, finer denier per filament (dpf) at lower speeds than possible for PET/PP.

Filament breaks indicate spin-line sensitivity to draw down rate or air gun pressure which not only limits throughput and overall production rates, but greatly reduces filament diameter control. Lower throughputs and moderate to high draw down rates typically yield finer denier filaments required by some applications.

TABLE 3

Filament Diameters (microns) for Sheath-Core PP/PP, PLA/PP and PET/PP Bicomponents in a 50/50 Weight Basis Ratio

| Throughput | High Quench | | | Medium Quench | | | Low Quench | | |
|---|---|---|---|---|---|---|---|---|---|
| (g/min/hole) | PP/PP | PLA/PP | PET/PP | PP/PP | PLA/PP | PET/PP | PP/PP | PLA/PP | PET/PP |
| 0.1 | breaks | breaks | breaks | breaks | breaks | breaks | breaks | 7.91 | breaks |
| 0.2 | breaks | 9.38 | breaks | 9.44 | 9.63 | breaks | 10.56 | 9.28 | breaks |
| 0.3 | 11.5 | 12.13 | breaks | 12.19 | 11.10 | breaks | sticking | 11.88 | breaks |
| 0.4 | 12.06 | 12.81 | breaks | 14.06 | 12.13 | breaks | sticking | 13.81 | breaks |
| 0.5 | 14.44 | 13.94 | breaks | 14.81 | 13.75 | breaks | sticking | 14.44 | breaks |
| 0.6 | 14.81 | 15 | breaks | 14.56 | 16.63 | 14.69 | sticking | 14.69 | 15.63 |
| 0.7 | 16.75 | 15.63 | 15.38 | sticking | 15.94 | 16.31 | sticking | 16.06 | 16.19 |
| 0.8 | 16.88 | 16.81 | 16.5 | sticking | 16.56 | 17.19 | sticking | 16.63 | 17.94 |
| 0.9 | 18.31 | 17.81 | 17.25 | sticking | 17.69 | 17.81 | sticking | 18.06 | 18.44 |
| 1 | 19.39 | 18.25 | 18.56 | sticking | 19.81 | 19 | sticking | 18.75 | 20.81 |
| 1.1 | 19.25 | 20.44 | 17.88 | sticking | 20.94 | 19.38 | sticking | 19.88 | 19.25 |
| 1.2 | 19.81 | 20.19 | 20.19 | sticking | 19.63 | 20.75 | sticking | 20.56 | 20.63 |

TABLE 4

Filament Diameters (microns) for Sheath-Core PP/PP, PLA/PP and PET/PP Bicomponents in a 30/70 Weight Basis Ratio

| Throughput | High Quench | | | Medium Quench | | | Low Quench | | |
|---|---|---|---|---|---|---|---|---|---|
| (g/min/hole) | PP/PP | PLA/PP | PET/PP | PP/PP | PLA/PP | PET/PP | PP/PP | PLA/PP | PET/PP |
| 0.1 | breaks | breaks | breaks | breaks | 8.69 | breaks | breaks | breaks | breaks |
| 0.2 | breaks | 11.63 | breaks | 9.44 | 11.06 | breaks | 10.56 | breaks | breaks |
| 0.3 | 11.5 | 13 | breaks | 12.19 | 12.94 | breaks | sticking | breaks | breaks |
| 0.4 | 12.06 | 13.56 | breaks | 14.06 | 14.25 | breaks | sticking | 12.25 | breaks |
| 0.5 | 14.44 | 9.69 | breaks | 14.81 | 14.69 | breaks | sticking | 15.5 | breaks |
| 0.6 | 14.81 | 15.56 | 17.81 | 14.56 | 14.69 | 19.63 | sticking | 14.9 | breaks |
| 0.7 | 16.75 | 18.5 | 18.5 | sticking | 17.38 | 18.13 | sticking | 17.81 | 18.56 |
| 0.8 | 16.88 | 18.81 | 18.5 | sticking | 17.31 | 19.81 | sticking | 17.75 | 17.25 |
| 0.9 | 18.31 | 18.25 | 19.13 | sticking | 19 | 19.38 | sticking | 18.81 | 20.56 |

This example shows that using PLA as the surface component with a polyolefin core provides finer spun denier filaments than monocomponent PP/PP and/or PET/PP multicomponents.

Example 4

To demonstrate the self-fibrillatable nature of PLA/PP side-by-side components, a photomicrograph was taken. Photomicrographs were taken at TPC Labs (Minneapolis, Minn.). Filaments photographed were side-by-side bicomponents containing 50/50 (weight ratio) PLA and PP. Fibers were spun at Hill's, Incorporated. located in West Melbourne, Fla.

It appears that the mechanical preparation of the slide for these particular fibers was enough energy to separate the two components of these fibers being photographed. FIG. 6(*a*) shows a side by side PET/pp bicomponent fiber; FIG. 6(*b*) shows a side by side (30/70) PET/pp bicomponent fiber; FIG. 6(*d*) shows a side by side (30/70) PET/pp bicomponent fiber; FIG, 6(*c*)shows a (30/70) PLA/pp bicomponent; and FIG. 6(*d*) shows a side by side (30/70) PLA/pp bicomponent fiber.

The fibers were spun using a polylactic acid polymer (Cargill Lot/Box 515-710) configured in a side-by-side bicomponent system with polypropylene (Montell, MFI~35) in a 50:50 ratio. Each polymer was extruded separately with a final melt temperature of 230° C. Throughput was 1.0 g/min/capillary with a total throughput of 288 g/min. Filaments were quenched and attenuated using a slot die. Samples were carefully collected, labeled and bagged.

This example shows that a bicomponent system with PLA/PP, or other polymer having low mutual affinity for PLA, configured side by side, or tipped, or multilobal, but not limited to, to provide a self-fibrillating, degradable-containing microfilament.

Example 5

To demonstrate higher spinning rates of PLA/PP side-by-side bicomponents, an experiment was designed to examine a polylactic acid polymer (Cargill Lot/Box: 515-710, approximately Mn: 69,000/Mw: 146,000 and 1.2% R) combined with polypropylene (Montell, MFI: 35)in a 50:50 and 30:70 weight basis ratio into sheath-core configuration. Both PLA and PP were extrude at a final melt temperature of 230° C. Pump speeds were adjusted to deliver 0.8 g/min/capillary, for a total of 230.4 g/min. Filaments were quenched and attenuated with a Lurgi-style air aspiration device. Air draw forces between 20 and 110 psi were applied. Samples were collected at 10 psi increments and labeled. Table 5 depicts the calculated filament velocities for PP/PP, PLA/PP and PET/PP at each draw down rate. Finer filament diameters correspond to higher filament velocities.

TABLE 5

Filament Velocities for PP/PP, PLA/PP and PET/PP Side-by-Side Bicomponents at 0.8 g/min/capillar and Varying Draw Down Rates

| Air Pressure | PP/PP | | PLA/PP | | PET/PP | |
|---|---|---|---|---|---|---|
| (psi) | 50:50 | 30:70 | 50:50 | 30:70 | 50:50 | 30:70 |
| 20 | 599 | 596 | 354 | 394 | 402 | 527 |
| 30 | 1,249 | 1,507 | 590 | 656 | 734 | 345 |
| 40 | 1,330 | 1,507 | 1,240 | 961 | 1,139 | 657 |
| 50 | 1,760 | 1,748 | 1,601 | 1,279 | 1,119 | 1,012 |

TABLE 5-continued

Filament Velocities for PP/PP, PLA/PP and PET/PP Side-by-Side Bicomponents at 0.8 g/min/capillar and Varying Draw Down Rates

| Air Pressure | PP/PP | | PLA/PP | | PET/PP | |
|---|---|---|---|---|---|---|
| (psi) | 50:50 | 30:70 | 50:50 | 30:70 | 50:50 | 30:70 |
| 60 | 1,973 | 2,271 | 3,491 | 1,707 | 1,220 | 1,404 |
| 70 | 2,325 | 2,648 | 4,022 | 2,254 | 1,814 | 1,775 |
| 80 | 2.529 | 2,881 | 5,316 | 2,717 | 2,209 | 2,043 |
| 90 | 2.855 | 3,031 | 5,824 | 2,757 | 2,342 | 1,736 |
| 100 | 2,877 | 3,031 | 5,367 | 2,899 | 2,516 | 2,256 |
| 110 | 3,332 | 3,373 | 8,591 | 3,475 | 2,311 | 2,256 |

This example shows that a side-by-side bicomponent with PLA/PP, or other polymer having low mutual affinity for PLA, produces a self-fibrillatable, degradable-containing microfilament that can be spun at higher throughputs than conventional microfilament spinning.

Example 6

A polylactic acid polymer from Lot/Box: 515-710 was combined with a 35 MFR polypropylene (Montell) in a 50/50 and 30/70 weight ratio into a side-by-side bicomponent. PP/PP and PLA/PP were extruded at a final melt temperature of 230° C. PET and PP were configured side-by-side with the same ratios. Pump speeds were adjusted to deliver 0.8 g/min/capillary a total throughput of 230.4 g/min. Filaments were quenched and attenuated with a Lurgi-style air aspiration device. Air draw forces between 20 and 110 psi were applied. Samples were carefully collected at 10 psi increments and labeled. Table 6 contains filament diameters for PP/PP, PLA/PP and PET/PP side by sides. Clearly, PLA/PP filaments have the finest diameters. Finer filament diameters offer advantages like down gauging web thickness, while getting more uniform filament distribution on the web. Again, the ability to spin filaments at high velocity enables the manufacturer to either produce finer denier or increase production rate.

TABLE 6

Filament Velocities for PP/PP, PLA/PP and PET/PP Side-by-Side Bicomponents at 0.8 g/min/capillar and Varying Draw Down Rates

| Air Pressure | PP/PP | | PLA/PP | | PET/PP | |
|---|---|---|---|---|---|---|
| (psi) | 50:50 | 30:70 | 50:50 | 30:70 | 50:50 | 30:70 |
| 20 | 34.94 | 38.06 | 48.69 | 46.94 | 46.63 | 50.31 |
| 30 | 24.19 | 23.94 | 37.7 | 36.38 | 34.5 | 40.64 |
| 40 | 23.44 | 23.94 | 26 | 30.06 | 27.69 | 36.38 |
| 50 | 20.38 | 22.31 | 22.88 | 26.06 | 27.94 | 29.31 |
| 60 | 19.25 | 19.5 | 15.5 | 22.56 | 26.75 | 24.88 |
| 70 | 17.38 | 18.06 | 14.44 | 19.63 | 21.94 | 22.13 |
| 80 | 17 | 17.38 | 12.56 | 17.88 | 19.88 | 20.63 |
| 90 | 16 | 16.88 | 12 | 17.75 | 19.31 | 22.38 |
| 100 | 15.94 | 16.88 | 12.5 | 17.31 | 18.63 | 19.63 |
| 110 | 14.81 | 16 | 9.88 | 15.81 | 19.44 | 19.63 |

This example shows that using PLA in a multicomponent fiber configured side-by-side with a polyolefin to make finer denier filaments on conventional equipment.

Example 7

Polylactic acid polymer from Cargill Lot/Box 515-710 (Mn: 69,000; Mw: 146,000 and 1.2% R) was combined with polypropylene (Montell, MFI~35) in a side-by-side bicomponent at 50:50 and 30:70. Side-by-side bicomponents at the same weight ratios were made for PET (IV 0.64)/PP (Montell, 35 MFR), however, final extruder melt temperature for PET/PP was 295° C. Throughputs for both side-by-side systems were increased from 0.1 g/min/capillary to 1.2 g/min/hole with increments of 0.1 g/min.

TABLE 7

Crimp Frequency (crimps/inch) for PLA/PP and PET/PP Side-by-Side Bicomponents at Constant Draw Down Ratio at 50° C.

| Throughputs | 50:50 | | 30:70 | |
|---|---|---|---|---|
| (g/min/capillary) | PLA/PP | PET/PP | PLA/PP | PET/PP |
| 0.3 | 20.7 | 6.3 | 26.3 | 19.1 |
| 0.4 | 14.1 | 7.2 | 24 | 12.1 |
| 0.5 | 9.3 | 9.5 | 29.8 | 13.5 |
| 0.6 | 18.5 | 5.4 | 24 | 9.9 |
| 0.7 | 12 | 4.9 | 25.4 | 10.4 |
| 0.8 | 11.8 | 5.8 | 14.4 | 8.5 |
| 0.9 | 4.3 | 6.2 | 19.4 | 8.4 |
| 1 | 10.6 | 3.6 | | |
| 1.1 | 9 | 5.7 | | |
| 1.2 | 9.3 | 9.3 | | |

A polylactic acid polymer (Cargill Lot/Box: 515-710, approximately Mn: 69,000/Mw: 146,000 and 1.2% R) combined with polypropylene (Montell, MFI: 35) in a 50:50 and 30:70 weight basis ratio into sheath-core configuration. Both PLA and PP were extruded at a final melt temperature of 230° C. PET and PP were combined at the same weight basis ratios and configurations. Pump speeds were adjusted to deliver 0.8 g/min/capillary, for a total of 230.4 g/min. Filaments were quenched and attenuated with a Lurgi-style air aspiration device. Air draw forces between 20 and 120 psi were applied. Samples were collected at 10 psi increments and labeled. Table 8 depicts the crimp frequency for PLA/PP and PET/PP side-by-sides at each draw down rate.

TABLE 8

Crimp Frequency (crimps/inch) at 100° C. for PLA/PP and PET/PP Side-by-Side Bicomponents at Constant Draw Down Ratio (80 psig)

| Throughputs | 50:50 | | 30:70 | |
|---|---|---|---|---|
| (g/min/capillary) | PLA/PP | PET/PP | PLA/PP | PET/PP |
| 0.3 | 105.8 | 108.7 | 44.5 | 35.3 |
| 0.4 | 52.2 | 35.3 | 45.2 | 35.3 |
| 0.5 | 56.4 | 38.8 | 35.3 | 38.8 |
| 0.6 | 43.7 | 42.3 | 36.8 | 38.8 |

TABLE 8-continued

Crimp Frequency (crimps/inch) at 100° C. for PLA/PP and PET/PP Side-by-Side Bicomponents at Constant Draw Down Ratio (80 psig)

| Throughputs | 50:50 | | 30:70 | |
|---|---|---|---|---|
| (g/min/capillary) | PLA/PP | PET/PP | PLA/PP | PET/PP |
| 0.7 | 55 | 38.8 | 52.2 | 22.6 |
| 0.8 | 46.6 | 49.4 | 48.7 | 45.9 |
| 0.9 | 40.1 | 63.5 | 23.7 | 30.3 |
| 1.0 | 44.5 | 49.4 | | |
| 1.1 | 26.1 | 39.5 | | |
| 1.2 | 57.2 | 45.2 | | |

This example shows that using PLA as one of the components in a multicomponent system to make a fiber offering more crimp in the as spun and inducing additional crimp at lower temperatures than conventional polyesters used in high loft applications. A comparison between Tables 7 and 8 demonstrate that PLA-containing fibers begin crimping at a lower temperature than PET/PP fibers. The crimp frequency measurement is difficult, accounting for some scatter in the data.

Example 8

It is useful to understand how D level influences the crystalline melting temperature and thermal bondability characteristics of PLA fibers. The desirable attributes of bicomponent fibers is to have high heat resistance and low thermal bonding temperatures. The data generated from this experiment provides for the selection of grades of PLA to be used in bicomponent fibers for various applications.

Polylactide samples with an Mn of 90,000–100,000 and various optical compositions, shown in Table 9, were melted in a capillary rheometer and pulled from the melt to product as-spun fibers. The as-spun fibers were subsequently oriented by drawing to three times their original length at 70° C., to produce oriented fibers. Samples of the polymer pellets were also annealed at 100° C. for 48 hours.

The data in the table below show a dramatic decrease in both crystallinity (J/g) and peak melting temperature as the D-level is increased. There appears to be little or no difference in peak melting point between the as spun fiber and the oriented fiber, although the oriented fiber has much higher levels of crystallinity in this experiment. The oriented fiber has a higher Tg than does the as spun fiber and, shows a 10° C. decrease in Tg as the D-level is increased. Thus, we would expect a high D-level fiber to bond at a lower temperature and to be less crystalline than a low D-level fiber.

TABLE 9

| Material | Mn | Mw | PDI | Lactide w % | D-Level (% R-Lactic Acid Residuals) |
|---|---|---|---|---|---|
| a | 95,500 | 218,000 | 2.28 | 1.6 | 3.0 |
| b | 98,900 | 226,000 | 2.28 | 0.8 | 6.3 |
| c | 95,400 | 203,000 | 2.13 | 0.3 | 8.5 |
| d | 99,000 | 230,000 | 2.30 | 1.3 | 11.8 |
| e | 90,800 | 210,000 | 2.30 | 0.9 | 15.3 |
| f | 92,000 | 234,000 | 2.55 | 1.0 | 17.8 |

TABLE 9-continued

| | Midpoint Tg (° C.) | | | Crystallinity (J/g) | | | Peak Melting Point (° C.) | | |
|---|---|---|---|---|---|---|---|---|---|
| Material | Annealed Pellets | As Spun Fiber | Oriented Fiber | Annealed Pellets | As Spun Fiber | Oriented Fiber | Annealed Pellets | As Spun Fiber | Oriented Fiber |
| a | 62 | 52.8 | 66 | 40.7 | 4.0 | 27.4 | 164.6 | 163.6 | 160.7 |
| b | 54.9 | 54.5 | 65.1 | 38.7 | 1.3 | 13.3 | 150.3 | 148.8 | 148.0 |
| c | 60.7 | 53.6 | 62.7 | 27.0 | 0 | 7.8 | 143.7 | 139.0 | 137.4 |
| d | 56.9 | 52.9 | 60.2 | 13.3 | | 2.1 | 124.5 | | 120.2 |
| e | 58.2 | 51.3 | 56.2 | | | | | | |
| f | 57.9 | 51.9 | 56.2 | | | | | | |

Example 9

A polylactic acid polymer (Cargill Lot/Box: 474-703-~4%D) was combined in a 1:1 ratio with a polybutylene succinate adipate copolymer (Bionolle 3020, by Showa Highpolymer Co. Ltd.) into a sheath-core configuration. The PLA composed the sheath, the Bionolle composed the core. Each polymer was extruded separately to a special spinneret designed by Hills, Inc. where the two become coextruded into bicomponent filaments. The PLA was extruded at a final melt temperature of about 230° C. The Bionolle was extruded at a melt temperature of about 200° C. The spinning head was maintained at a temperature of about 235° C. Pump speeds were adjusted to yield about 0.6 cc/minute/capillary for a total 144 capillaries or 86.4 cc/minute total. The filaments were quenched and attenuated using a Lurgi-style air aspiration device. The aspiration device applies a draw force to the filaments by adjusting air pressure. An air pressure of 60 psig was applied to the filaments which were then collected by hand, carefully bagged to avoid accidental drawing of the filaments, then tested to determine properties and labeled 3067-12-8 (Table 1, attached). During the spinning procedure, relative spinnability was observed for each sample and draw force. Spinning speeds were calculated based on filament diameters and the formula at the bottom of Table 10. The filaments were observed to spin very well, with no filament breaks. The as-spun filaments appeared to be very fine diameters, and possessed a soft "hand."

TABLE 10

| SAMPLE ID (3067-12) | (1) BICC CONFIG. | (2) 1st Poly. (eg. sheath) | (2) 2nd Poly (eg. core) | s/c ratio | Cap. Tput (cc/min/cap) | Gun Press. (psig) | (3) Spin Rate (1–8) | Fil. Diam. (um) | (4) Calc. Fil. Vel. (mpm) |
|---|---|---|---|---|---|---|---|---|---|
| 4 | s/c | 474 | B1030 | 2:1 | 0.6 | 60 | 5 | 18.1 | 1848 |
| 5 | s/c | 474 | B1030 | 1:1 | 0.6 | 60 | 5 | 15.4 | 2553 |
| 6 | s/c | 474 | B1030 | 1:1 | 0.6 | 80 | 5.1 | 14.4 | 2920 |
| 7 | s/c | 474 | B1030 | 1:1 | 0.6 | 100 | 5.1 | 13.8 | 3179 |
| 8 | s/c | 474 | B3020 | 1:1 | 0.6 | 60 | 5 | 15.9 | 2395 |
| 9 | s/c | 474 | B3020 | 1:1 | 0.6 | 80 | 4.5 | 14.3 | 2961 |
| 10 | s/c | 474 | B3020 | 1:1 | 0.6 | 100 | 4.5 | 14.8 | 2764 |
| 16 | s/c | 474 | 513 | 1:1 | 0.6 | 60 | 4 | — | — |
| 17 | s/c | 474 | 513 | 1:1 | 0.6 | 80 | 3.5 | — | — |
| 18 (3067-13) | s/c | 474 | 513 | 1:1 | 0.6 | 100 | 3 | — | — |
| 3 | s/s | 474 | 513 | 1:1 | 0.6 | 60 | 4.5 | 14.2 | 3003 |
| 4 | s/s | 474 | 513 | 1:1 | 0.6 | 80 | 3.5 | 12.6 | 3814 |

1. Bicomponent Configuration: s/c: Sheath/Core
s/s: Side-by-Side
2. Polymer Identification:

| | Lot/Box | Mn | Mw | Mz | Mz + 1 | PDI | % D | % M | % olig. | MFR |
|---|---|---|---|---|---|---|---|---|---|---|
| PLA | 503–701 | 67500 | 149K | 280K | 445K | 2.22 | 0.95 | 0.4 | 1.75 | — |
| | 503–701Ex. | 58200 | 134K | 294K | 680K | 2.3 | 0.95 | 0.3 | 2.2 | — |
| | 474–703 | 70560 | 175K | 353K | 595K | 2.48 | 4.5 | 0.7 | 2.8 | — |
| | 474–703Ex. | 59835 | 136K | 266K | 455K | 2.27 | 4.5 | 0.4 | 3.5 | — |
| Bionolle | 1030 | 56700 | 110K | 188K | 291K | 1.95 | — | | 2.2 | 30–39 |
| | 3020 | 60500 | 119K | 200K | 310K | 1.97 | — | | 2.1 | 20–29 |

3. Spin Rating assumes continuum between ductile and brittle or elastic failure (see attachment)
4. Velocity = (Volumetric output/(((filament radius (um))^)*pi))*Density ratio (~1.07/1.35)

Example 10

To demonstrate mechanical spinning and drawing of a lactide polymer-containing bicomponent, a polylactic acid polymer (Cargill Lot 474-703) was extruded with a different polylactic acid (Cargill Lot 513-701-~1.6%D) in a side-by-side configuration. The capillary throughput was ~0.6 cc/min/hole, and the ratio of each polymer was about 1:1. A 144 capillary spinneret was used, and extrusion conditions were essentially the same as described in Example 9. The filaments were quenched, passed over a finish application roll, accelerated with a series of godet rolls, and collected on a bobbin at 1000 meters per minute. The bobbin was allowed to age overnight. The filaments were then drawn and annealed using heated godets and again collected on a bobbin and labeled 3067-13-1. Those properties appear in Table 11. The filaments appeared to have substantial strength and elongation.

TABLE 11

| SAMPLE ID (3067-12) | (1) BICC CONFIG. | (2) 1st Poly. (eg. sheath) | (2) 2nd Poly (eg. core) | s/c ratio | Cap. Tput (cc/min/cap) | Wind-up Speed (mpm) | (3) Spin Rate (1–8) | Fil. Diam. (um | (4) Calc. Fil. Vel. (mpm) | Tenacity (g/d) | % Elon (%) |
|---|---|---|---|---|---|---|---|---|---|---|---|
| 1 | s/c | 474 | B1030 | 1:1 | 0.6 | 1000 | 4 | 26 | 896 | | |
| 2 | s/c | 474 | B1030 | 2:1 | 0.6 | 1000 | 4 | 27.2 | 818 | | |
| 3 | s/c | 474 | B1030 | 2:1 | 0.6 | 1000 | 4 | 25.4 | 939 | | |
| 11 | s/c | 474 | B3020 | 1:1 | 0.6 | 1000 | 4 | 24.4 | 1017 | 0.64 | 85 |
| 12 | s/c | 474 | B3020 | 2:1 | 0.6 | 1000 | 4 | 25.1 | 961 | | |
| 13 | s/c | 474 | B3020 | 2:1 | 0.6 | 1000 | 4 | 24.94 | 973 | | |
| 14 | s/c | 474 | 513 | 1:1 | 0.6 | 1000 | 4 | 24.6 | 1001 | 1.27 | 126 |
| 15 | s/c | 474 | 513 | 1:2 | 0.6 | 1000 | 4 | 25.3 | 946 | 123 | 118 |
| (3067-13) | | | | | | | | | | | |
| 1 | s/s | 474 | 513 | 1:1 | 0.6 | 1000 | 4 | 24.8 | 984.48 | | |
| 2 | s/s | 474 | 513 | 2:1 | 0.6 | 1000 | 4 | 24.7 | 982.47 | | |

1. Bicomponent Configuration: s/c: Sheath/Core
s/s: Side-by-Side
2. Polymer Identification:

| | Lot/Box | Mn | Mw | Mz | Mz + 1 | PDI | % D | % M | % olig. | MFR |
|---|---|---|---|---|---|---|---|---|---|---|
| PLA | 503–701 | 67500 | 149K | 280K | 445K | 2.22 | 0.95 | 0.4 | 1.75 | — |
| | 503–701Ex. | 58200 | 134K | 294K | 680K | 2.3 | 0.95 | 0.3 | 2.2 | — |
| | 474–703 | 70560 | 175K | 353K | 595K | 2.48 | 4.5 | 0.7 | 2.8 | — |
| | 474–703Ex. | 59835 | 136K | 266K | 455K | 2.27 | 4.5 | 0.4 | 3.5 | — |
| Bionolle | 1030 | 56700 | 110K | 188K | 291K | 1.95 | — | | 2.2 | 30–39 |
| | 3020 | 60500 | 119K | 200K | 310K | 1.97 | — | | 2.1 | 20–29 |

3. Spin Rating assumes continuum between ductile and brittle or elastic failure (see attachment)
4. Velocity = (Volumetric output/(((filament radius (um))^)*Pi))*Density ratio (~1.07/1.35)

Example 11

To demonstrate drawing and annealing of the mechanically spun filaments, the filament bundle of sample 3067-13-1 was threaded from the bobbin over a series of three heated godet rolls. Each godet temperature and rpm was independently controlled. The differential speed of the godets determine the Draw Ratio as listed in Table 12. The filament bundle is heated to facilitate drawing and to anneal stresses from the drawn filaments. Drawing conditions and filament properties appear in Table 12. The drawn filaments possessed substantial strength and elongation.

TABLE 12

| SAMPLE ID | (1) BICO CONFIG. | (2) 1st Poly. (eg sheath) | (2) 2nd Poly (eg core) | s/c ratio | (4) Fil. Diam. (um) | Calc. Fil. Vel. (mpm) | Drawn Tenacity (g/d) | Fiber % Elong (%) | Fiber DRAWING |
|---|---|---|---|---|---|---|---|---|---|
| (3067-12) | | | | | | | | | |
| 1A | s/c | 474 | B1030 | 1:1 | 28 | 898 | | | Roll Speeds (mpm) Roll Temp. (c) # of wraps |
| 2A | s/c | 474 | B1030 | 2:1 | 27.2 | 818 | | | Roll Speeds (mpm) Roll Temp. (c) # of wraps |
| 2B | s/c | 474 | B1030 | 2:1 | 27.2 | 818 | | | Roll Speeds (mpm) Roll Temp. (c) # of wraps |
| 2C | s/c | 474 | B1030 | 2:1 | 27.2 | 818 | | | Roll Speeds (mpm) Roll Temp. (c) # of wraps |
| 11A | s/c | 474 | B3020 | 1:1 | 24.4 | 1017 | 0.64 | 85 | Roll Speeds (mpm) Roll Temp. (c) # of wraps |
| 14A | s/c | 474 | 513 | 1:1 | 24.8 | 1001 | 1.27 | 126 | Roll Speeds (mpm) Roll Temp. (c) # of wraps |
| 14B | s/c | 474 | 513 | 1:1 | 24.8 | 1001 | 1.27 | 126 | Roll Speeds (mpm) Roll Temp. (c) # of wraps |

TABLE 12-continued

| | | | | | | | | |
|---|---|---|---|---|---|---|---|---|
| 15A | s/c | 474 | 513 | 1:2 | 25.3 | 948 | 1.23 | 118 | Roll Speeds (mpm) Roll Temp. (c) # of wraps |
| 15B | s/c | 474 | 513 | 1:2 | 25.3 | 948 | 1.23 | 118 | Roll Speeds (mpm) Roll Temp. (c) # of wraps |
| (3067-13) | | | | | | | | | |
| 1A | s/c | 474 | 513 | 1:1 | 24.8 | 984 | | | Roll Speeds (mpm) Roll Temp. (c) # of wraps |
| 1B | s/c | 474 | 513 | 1:1 | 24.8 | 984 | | | Roll Speeds (mpm) # of wraps Roll Temp. (c) |
| 2A | s/c | 474 | 513 | 2:1 | 24.7 | 992 | | | Roll Speeds (mpm) Roll Temp. (c) # of wraps |
| 2B | s/c | 474 | 513 | 2:1 | 24.7 | 992 | | | Roll Speeds (mpm) Roll Temp. (c) # of wraps |

| SAMPLE ID (3067-12) | Roll 1 | Roll 2 | Roll 2 | Draw Ratio | Drawn Fiber Denier | Drawn Fiber Tenacity (g/d) | Drawn Fiber Elong. (%) |
|---|---|---|---|---|---|---|---|
| 1A | 200 | 300 | 300 | 1.5 | 3.7 | 1.26 | 31 |
| | 75 | 80 | 80 | | | | |
| | 10 | 9 | 9 | | | | |
| 2A | 400 | 700 | 700 | 1.75 | 3.26 | 1.72 | 22 |
| | 85 | 90 | 90 | | | | |
| | 10 | 9 | 9 | | | | |
| 2B | 400 | 600 | 600 | 1.5 | 3.75 | 1.46 | 32 |
| | 80 | 85 | 90 | | | | |
| | 10 | 9 | 9 | | | | |
| 2C | 400 | 625 | 625 | 1.3 | 3.7 | 1.4 | 30 |
| | 75 | 80 | 80 | | | | |
| | 10 | 9 | 9 | | | | |
| 11A | 400 | 625 | 625 | 1.3 | 3.5 | 1.26 | 27 |
| | 75 | 80 | 80 | | | | |
| | 10 | 9 | 9 | | | | |
| 14A | 300 | 750 | 750 | 2.5 | 2.32 | 3.3 | 22 |
| | 80 | 85 | 90 | | | | |
| | 10 | 9 | 9 | | | | |
| 14B | 300 | 600 | 600 | 2.88 | 2 | 2.5 | 28 |
| | 80 | 85 | 90 | | | | |
| | 10 | 9 | 9 | | | | |
| 15A | 300 | 650 | 650 | 2.1 | 80 | 85 | 90 |
| | 80 | 85 | 90 | | | | |
| | 10 | 9 | 9 | | | | |
| 15B | 300 | 600 | 600 | | | | |
| | 80 | 85 | 90 | | | | |
| | 10 | 9 | 9 | | | | |
| (3067-13) | | | | | | | |
| 1A | 400 | 800 | 800 | 2 | 3.6 | 1.95 | 41 |
| | 75 | 80 | 80 | | | | |
| | 9 | 8 | 9 | | | | |
| 1B | 400 | 1000 | 1000 | 2.5 | 2.29 | 3.4 | 30 |
| | 75 | 80 | 80 | | | | |
| | 9 | 8 | 9 | | | | |
| 2A | 200 | 500 | 500 | 2.5 | 2.24 | 2.9 | 25 |
| | 75 | 80 | 80 | | | | |
| | 10 | 9 | 9 | | | | |
| 2B | 200 | 400 | 400 | 2 | 2.7 | 2.3 | 37 |
| | 75 | 80 | 80 | | | | |
| | 10 | 9 | 9 | | | | |

| | Lot/Box | Mn | Mw | Mz | Mz + 1 | PDI | % D | % M | % olig. | MFR |
|---|---|---|---|---|---|---|---|---|---|---|
| PLA | 503–701 | 67500 | 149K | 280K | 445K | 2.22 | 0.95 | 0.4 | 1.75 | — |
| | 503–701 Ex. | 58200 | 134K | 294K | 680K | 2.3 | 0.95 | 0.3 | 2.2 | — |
| | 474–703 | 70560 | 175K | 353K | 595K | 2.48 | 4.5 | 0.7 | 2.8 | — |
| | 474–703 Ex. | 59835 | 138K | 266K | 455K | 2.27 | 4.5 | 0.4 | 3.5 | — |
| Bionolle | 1030 | 58700 | 110K | 188K | 291K | 1.95 | — | | 2.2 | 30–39 |
| | 3020 | 60500 | 119K | 200K | 310K | 1.97 | — | | 2.1 | 20–29 |

1. Bicomponent Configuration: s/c: Sheath/Core
2. Polymer Identification: s/s: Side-by-side

Example 12

This example evaluates the spinning and physical properties of hydrolyzed PLA.

A pilot spin line was used to test spinning performance of a PLA hydrolyzed using extrusion of moist molten polymer. Thermal-hydrolysis was used to reduce the molecular weight of PLA which in turn reduced the viscosity to a level more suitable for spunbond processing. Polymer was hydrolyzed by adding water to the surface of PLA pellets, then extruding and repelletizing the PLA using a 30 mm extruder.

Hydrolyzed PLA pellets were crystallized and dried to <100 ppm moisture using Karl-Fisher analysis. Dried pellets were stored in sealed bags until used. In preparation for use, the pellets are transferred directly from the sealed bag into a $N_2$ sparged hopper of the pilot spin line.

Higher molecular weight PLA's were blended prior to the hydrolysis reprocessing. PLA's were selected that had low %D levels (<1.5%D). Their average values appear below:

|  | Before Hydrolysis | After Hydrolysis |
| --- | --- | --- |
| Mn: | 94000 | 63,800 |
| % D: | 1.3% | 1.3 |

The spin line included of a sealed hopper with $N_2$ entering the bottom of the hopper, and exiting the top. The hopper set atop the water-cooled feed section of a 1" extruder, with 24:1 length:diameter ratio (l/d). The polymer was conveyed to a Zenith gear pump which metered 0.9 grams per minute per capillary to the 68 capillary spinneret. The extruder rpm was controlled at a constant head pressure of 300 psig.

A Lurgi-Docan style air aspirator device was positioned ~2 meters from the spinneret. The draw force can be varied by adjusting the air pressure supplied to the aspirator device. Filaments were collected as they exited the attenuator (air aspirator device). Properties appear in Table 13.

TABLE 13

| Extruder | 1", 24:1, 4 zones |
| --- | --- |
| Pump | 1.752 cc/rev |
| Pump Rpm | 32 rpm |
| Cap. Tput | 0.9 g/m/h |
| Spinneret | 68 capillaries, 0.4 diameter |
| Extruder Head | 300 psig |

PLA: 584-71 1 (Hydrolyzed PLA)

| Sample | Pack Pressure (psig) | Attenuator Pressure (psig) | Melt Temp (°C.) | Spin Rate (1–8) | Slick Point (cm) | Fil. Diam. (um) | Calc. Fil. Velocity (mpm) | Bire ($\times 10^{-2}$) | Crystallinity (J/g) | Boil Shrink (%) |
| --- | --- | --- | --- | --- | --- | --- | --- | --- | --- | --- |
| 1 | 575 | 40 | 228 | 4.5 | 18 | 20.1 | 2425 | 0.7 | 8.6 | 73 |
| 2 | 505 | 60 | 228 | 4.5 | 20 | 18.5 | 2862 | 0.94 | 20.9 | 58 |
| 3 | 497 | 80 | 228 | 3.8 | 23 | 15.5 | 4077 | 1.3 | 32.2 | 22 |
| 4 | 489 | 100 | 228 | 3.5 | 20 | 14.4 | 4724 | 1.33 | 34.2 | 15 |
| 5 | 485 | 120 | 228 | 3.3 | 25 | 14 | 4998 | 1.62 | 39.0 | 13 |
| 6 | 512 | 40 | 223 | 4.6 | 20 | 23.9 | 1715 | 0.62 | 13.6 | 74 |
| 7 | 505 | 60 | 223 | 4.5 | 20 | 18.9 | 2742 | 0.91 | 15.6 | 61 |
| 8 | 495 | 80 | 223 | 4.3 | 23 | 16.07 | 3793 | 1.33 | 29.6 | 11 |
| 9 | 489 | 100 | 223 | 3.5 | 20 | 16 | 3826 | 1.4 | 36.1 | 16 |
| 10 | 486 | 120 | 223 | 3.1 | 18 | 13.47 | 5399 | 1.41 | 39.1 | 13 |
| PLA: 584–711 (With Stabilizer) | | | | | | | | | | |
| 11 | 442 | 80 | 223 | 4.5 | 20 | 17.6 | 3162 | 1.24 | 34.8 | 14 |
| 12 | 471 | 100 | 223 | 3.9 | 18 | 16.2 | 3732 | 1.45 | 34.4 | 12 |
| PLA: 584–711 (Wth TiO2) | | | | | | | | | | |
| 13 | 525 | 40 | 223 | 4.2 | 20 | 22.9 | 1868 | 0.66 | 13.1 | 75 |
| 14 | 523 | 60 | 223 | 3.7 | 20 | 18.1 | 2990 | 0.93 | 25.4 | 63 |
| 15 | 515 | 80 | 223 | 3.5 | 23 | 16.5 | 3598 | 1.25 | 29.1 | 21 |
| 16 | 526 | 100 | 223 | 3.3 | 20 | 14.9 | 4412 | 1.4 | 34 | 14 |
| 17 | 518 | 120 | 223 | 2.9 | 18 | 13.9 | 5070 | 1.46 | 32.1 | 13 |

| Polymer Properties | Mn | Mw | PDI | % RL | MFR | % D |
| --- | --- | --- | --- | --- | --- | --- |
| 584-711 | 63.8K | 136.6K | 2.14 | 0.11 | 31 | 1.3 |

Similar to standard reactor grades of PLA, hydrolyzed PLA exhibited the following characteristics:

- Higher attenuator pressure produced lower filament diameters (higher velocity)
- Birefringence increased with calculated filament velocity
- Crystallinity increased with calculated filament velocity
- Boil Shrinkage decreased (nonlinearly) with increase in filament velocity
- Lower melt temperature produced lower shrinkage values relative to filament velocity. In other words, the shrinkage/velocity curve shifted to the left with lower melt temperature.

The addition of tartaric acid as a stabilizer (0.05%) did not appear to negatively affect fiber processability, attenuation, crystallinity, or shrinkage.

The addition of $TiO_2$ also did not appear to negatively impact processability, attenuation or shrinkage.

Applicants found that hydrolyzed PLA appears suitable for use in fiber and nonwoven processes and applications. Furthermore, the use of hydrolysis appears to be a viable alternative to producing fiber grades of PLA solely by polymerization. It is expected that a polymerization process could be used to produce a single grade of PLA, that would then be reprocessed to meet individual market or customer specifications. By so doing, the economics of polymerization and production may be improved, since the production of fewer grades means less transition waste.

It is expected that the hydrolyzed PLA can be combined with selected additives to improve properties, such as whiteness or stability, without imparting processability or shrinkage performance.

Example 13

This example shows the production of low shrinkage fabric using high speed filament velocity and low %D PLA.

Nippon-Kodoshi is a Japanese manufacturer of spunbond equipment. A low molecular weight PLA having 1.1 %D isomer content was processed on this equipment to produce low shrinkage fabric. The process is described below:

| Polymer | Mn | Mw | Mz | Mz + 1 | PDI | Mz/Mn | % R | ESO | MFR (210° C.) |
|---|---|---|---|---|---|---|---|---|---|
| | 73K | 156K | 297K | 506K | 2.15 | 4.07 | 1.1 | 0.35 | 15 |

Polymer was dried to less than 100 ppm moisture and fed to a twin screw, vented extruder equipped with 4 heating zones. Final melt temperature was approximately 225° C. The extrudate was passed through a filter to a pair of 20 cc/revolution gear pumps. To produce low denier fabric samples the pump metered molten polymer to a 0.5M wide spinneret equipped with about 700 capillaries, at the rate of 0.35 grams per minute per capillary. To produce higher denier samples the pump rate was increased in proportion to the fiber mass.

The extruded filaments were drawn using a slot attenuator after first passing through a cross-flow quench zone. Pressure was adjusted to the slot to effect a filament velocity near 5000 meters per minute. Under these conditions, spinning was excellent. Essentially no filament breaks were observed.

The filaments were collected on a porous conveyor belt and bonded by passing the web through the nip of a heated calender system equipped with smooth and embossed steel rolls. Calender temperature was maintained near 130° C. Different fabric weights were obtained by adjusting the speed of the conveyor. The results appear in Table 14.

Applicants found that thermally stable fabric (~15, 19, 24 gsm) was produced at two throughputs; that calendaring of the web increase polymer crystallinity and reduced shrinkage that excellent fabric properties were observed for both high and low denier fabric samples; and that filament properties were very similar to those observed in previous experiments.

TABLE 14

Eco-PLA (tm)/Nippon-Kodoshi Spunbond Fabric

| Denier (dpf) | Fabric Wt. (gsm) | Boil Shrinkage** MD (%) | CD (%) | 60C Air Shrinkage MD (%) | CD (%) | Crystillinity (J/g) | Pk Strip Tensile MD (g/in) | CD (g/in) | Pk Elongation MD (%) | CD (%) | TEA MD (N—M/M^2) | CD (N—M/M^2) |
|---|---|---|---|---|---|---|---|---|---|---|---|---|
| 1* | 14.4 | 2.5 | 1.1 | 1.0 | 1.0 | 47.6 | 1590 | 830 | 21 | 20 | 96.47 | 46.62 |
| 1* | 18.5 | 3.1 | 0.7 | 0.4 | 0.2 | 47.8 | 2350 | 1200 | 26 | 24 | 172.38 | 81.62 |
| 1* | 23.1 | 1.7 | 0.5 | 0.5 | 0.6 | 47.0 | 2970 | 1790 | 23 | 24 | 169.87 | 124.67 |
| 2 | 18.5 | 1.6 | 0.6 | 0.5 | 0.4 | 45.7 | 1780 | 1000 | 23 | 17 | 123.3 | 51.2 |
| 2 | 24.1 | 1.4 | 0.4 | 0.3 | 0.4 | 45.2 | 1740 | 1660 | 21 | 22 | 107.7 | 110.6 |

| *1 Denier | Diameter (um) | Filament Velocity (mpm) | Birefing. (×10^−2) | Boil Shrinkage (%) | Residual Lactide (%) | Mn (×10^×3) | Mw (×10^×3) | Mz (×10^×3) | Crystallinity (J/g) |
|---|---|---|---|---|---|---|---|---|---|
| Filament Properties | 9.2 | 4814 | 1.58 | 18.8 | 0.46 | 67 | 134 | 231 | 39.4 |

Example 14

This example evaluates the affect of melt temperature on shrinkage of as-spun filaments.

whether a tartaric acid stabilizer was present or not; that capillary diameter (0.4 vs. 0.8 mm) had minimal affect on filament properties (compare samples G&D); the higher capillary throughput produced slightly higher shrinkages at a given draw force; and thermal stability (as measured by Boil Shrinkage) generally increases with Airgun Pressure.

TABLE 16

| Force Force (psig) | 0.4 mm. 0.8 g/m/h 220° C. (B) | 0.4 mm. 0.6 g/m/h 220° C. | 0.4 mm. 0.6 g/m/h 230° C. (G) | ????? 0.6 g/m/h 240° C. (h) | 0.8 mm. 0.6 g/m/h 220° C. (E) | 0.8 mm. 0.8 g/m/h 220° C. (D) | 0.4 mm. 0.6 g/m/h 240° C. (T) | 0.4 0.6 g/m/h 220° C. (TT) |
|---|---|---|---|---|---|---|---|---|
| 50 | 30.0 | 16.3 | 12.2 | 49.4 | 63.0 | 11.6 | 49.4 | 70.0 | 9.6 |
| 55 | 16.3 | 13.1 | | | | 10.0 | 23.8 | | |
| 60 | 13.8 | 10.6 | 10.9 | 15.3 | 52.2 | 10.6 | 16.3 | 56.6 | 11.9 |
| 65 | 11.3 | 10.0 | | | | 11.9 | 15.3 | | |
| 70 | 9.4 | 6.3 | 10.9 | 12.9 | 26.3 | 10.9 | 11.9 | 20.0 | 10.9 |
| 75 | 7.5 | 3.1 | | | | 12.2 | 12.1 | | |
| 80 | 10.0 | 6.9 | 12.5 | 12.9 | 21.3 | 12.5 | 11.3 | 14.0 | 11.5 |
| 85 | 11.9 | 11.9 | | | | 13.1 | 11.9 | | |
| 90 | 15.0 | 11.9 | | | 16.3 | 13.8 | | 13.4 | |
| Freefall 0 psi | | 11.3 | | | | | | | |

\* Numbers shown are percent shrinkage of a 20 inch fiber subjected to boiling water immediately after spinning. Two samples of fiber were tested for shrinkage and the results averaged.

The PLA used in these studies was a reactor product:

| Mn | Mw | Mz | Mz + 1 | PDI | Mz/Mn | % D |
|---|---|---|---|---|---|---|
| 72400 | 156000 | 273000 | 418000 | 2.15 | 3.77 | 1.1 |

Applicants found that the shrinkage/filament velocity curve (see Table 15) is shifted to the right (higher velocity required to achieve lower shrinkage) as melt temperature is increased; and the ultimate shrinkage (minimum shrinkage achieved at high filament velocity) is generally higher for filaments spun at higher temperatures.

TABLE 15

| Melt Temp. | 240 | | 230 | | 220 | |
|---|---|---|---|---|---|---|
| Attenuator Pressure | Fil. Vel (mpm) | Boil Shrink | Fil. Vel. (mpm) | Boil Shrink | Fil. Vel. (mpm) | Boil Shrink |
| 50 | 1929 | 63 | 2957 | 39 | 2481 | 16 |
| 55 | — | — | — | — | 3278 | 13 |
| 60 | 3348 | 52 | 3726 | 11 | 2960 | 11 |
| 65 | — | — | — | — | 2980 | 10 |
| 70 | 3829 | 26 | 4099 | 11 | 3940 | 6 |
| 75 | — | — | — | — | 4420 | 7 |
| 80 | 4630 | 21 | 4060 | 10 | 3743 | 7 |
| 85 | — | — | — | — | 3794 | 12 |
| 90 | 4677 | 16 | — | — | 3622 | 12 |

Example 15

This example evaluates the affect of processing conditions (capillary diameter, capillary throughput, melt temperature) on thermal stability of as-spun filaments. Results are reported in Table 16.

Applicants found that higher melt temperatures generally produced filaments with higher shrinkage, regardless of

Example 16

This example evaluates the effect of processing conditions (melt temperature, capillary throughput, and attenuator pressure) and polymer parameters (molecular weight and %D) on spinning, shrinkage, crystallinity of as-spun filaments.

A statistical design approach was used to determine process and polymer effects and interactions. Results are provided in Table 17.

Applicants found that higher molecular weight samples generally produced filaments with lower shrinkage, at a given set of processing conditions (melt temperature, tput, etc.); and that lower airgun pressure (therefore lower filament velocity) generally produced filaments with higher shrinkage, lower crystallinity and lower Birefringence. The exception exists at higher velocity where a minimum shrinkage is achieved. After a minimum shrinkage is achieved, higher velocities do not necessarily result in further reduction of shrinkage. Applicants additionally found that the combination of lower filament velocity and higher temperatures (250 vs. 240) produced filaments with lower orientation, lower crystallinity and higher shrinkage. Furthermore, Applicants did not identify a significant effect on shrinkage by either the %D (0.8 and 1.3% D), or capillary throughput 0.6 & 0.8 cubic centimeters per minute per capillary (cc/m/h).

TABLE 17

| SMPL ID 3036-72 3067-28 | Polymer Lot/Box | POLYMER PROPERTIES | | | | | | | | | |
|---|---|---|---|---|---|---|---|---|---|---|---|
| | | MFR | % D | Mn (10^3) | Mw (10^3) | Mp (10^3) | Mz (10^3) | Mz + 1 (10^3) | Mz/Mw | Mw/Mn | % M | % olig |
| 1 | 503 728 | 8.3 | 1.3 | 92 | 201 | 153 | 361 | 574 | 1.8 | 2.2 | 1.2 | 0.6 |
| 2 | 503 728 | 8.3 | 1.3 | 92 | 201 | 153 | 361 | 574 | 1.8 | 2.2 | 1.2 | 0.6 |
| 3 | 503 728 | 8.3 | 1.3 | 92 | 201 | 153 | 361 | 574 | 1.8 | 2.2 | 1.2 | 0.6 |
| 4 | 503 728 | 8.3 | 1.3 | 92 | 201 | 153 | 361 | 574 | 1.8 | 2.2 | 1.2 | 0.6 |
| 5 | 503 709 | 7.7 | 0.9 | 98 | 205 | 148 | 360 | 552 | 1.8 | 2.1 | 1.2 | 0.5 |
| 5 (dup) | 503 709 | 7.7 | 0.9 | 98 | 205 | 148 | 360 | 552 | 1.8 | 2.1 | 1.2 | 0.5 |
| 6 | 503 709 | 7.7 | 0.9 | 98 | 205 | 148 | 360 | 552 | 1.8 | 2.1 | 1.2 | 0.5 |
| 7 | 503 709 | 7.7 | 0.9 | 98 | 205 | 148 | 360 | 552 | 1.8 | 2.1 | 1.2 | 0.5 |
| 8 | 503 709 | 7.7 | 0.9 | 98 | 205 | 148 | 360 | 552 | 1.8 | 2.1 | 1.2 | 0.5 |
| 9 | 517 724 | 11 | 1 | 84 | 180 | 130 | 318 | 497 | 1.8 | 2.1 | 1 | 0.7 |
| 10 | 517 724 | 11 | 1 | 84 | 180 | 130 | 318 | 497 | 1.8 | 2.1 | 1 | 0.7 |
| 11 | 517 724 | 11 | 1 | 84 | 180 | 130 | 318 | 497 | 1.8 | 2.1 | 1 | 0.7 |
| 12 | 517 724 | 11 | 1 | 84 | 180 | 130 | 318 | 497 | 1.8 | 2.1 | 1 | 0.7 |
| 13 | 510 737 | 4.1 | 0.8 | 94 | 210 | 151 | 378 | 587 | 1.8 | 2.2 | 1.2 | 0.8 |
| 13 (dup) | 510 737 | 4.1 | 0.8 | 94 | 210 | 151 | 378 | 587 | 1.8 | 2.2 | 1.2 | 0.8 |
| 14 | 510 737 | 4.1 | 0.8 | 94 | 210 | 151 | 378 | 587 | 1.8 | 2.2 | 1.2 | 0.8 |
| 15 | 510 737 | 4.1 | 0.8 | 94 | 210 | 151 | 378 | 587 | 1.8 | 2.2 | 1.2 | 0.8 |
| 16 | 510 737 | 4.1 | 0.8 | 94 | 210 | 151 | 378 | 587 | 1.8 | 2.2 | 1.2 | 0.8 |
| 17 | 503 709 | 7.7 | 0.9 | 98 | 205 | 205 | 360 | 552 | 1.8 | 2.1 | 1.2 | 0.5 |
| 18 | 503 709 | 7.7 | 0.9 | 98 | 205 | 205 | 360 | 552 | 1.8 | 2.1 | 1.2 | 0.5 |
| 19 | 503 709 | 7.7 | 0.9 | 98 | 205 | 205 | 360 | 552 | 1.8 | 2.1 | 1.2 | 0.5 |
| 20 | 503 709 | 7.7 | 0.9 | 98 | 205 | 205 | 360 | 552 | 1.8 | 2.1 | 1.2 | 0.5 |
| 21 | 503 728 | 8.3 | 1.3 | 92 | 201 | 153 | 381 | 574 | 1.8 | 2.2 | 1.2 | 0.6 |
| 22 | 503 728 | 8.3 | 1.3 | 92 | 201 | 153 | 381 | 574 | 1.8 | 2.2 | 1.2 | 0.6 |
| 23 | 503 728 | 8.3 | 1.3 | 92 | 201 | 153 | 381 | 574 | 1.8 | 2.2 | 1.2 | 0.6 |
| 24 | 503 728 | 8.3 | 1.3 | 92 | 201 | 153 | 381 | 574 | 1.8 | 2.2 | 1.2 | 0.6 |
| 25 | 517 724 | 11 | 1 | 84 | 180 | 130 | 318 | 497 | 1.8 | 2.1 | 1 | 0.7 |
| 26 | 517 724 | 11 | 1 | 84 | 180 | 130 | 318 | 497 | 1.8 | 2.1 | 1 | 0.7 |
| 27 | 517 724 | 11 | 1 | 84 | 180 | 130 | 318 | 497 | 1.8 | 2.1 | 1 | 0.7 |
| 28 | 517 724 | 11 | 1 | 84 | 180 | 130 | 318 | 497 | 1.8 | 2.1 | 1 | 0.7 |
| 29 | 510 737 | 4.1 | 0.8 | 94 | 210 | 151 | 378 | 587 | 1.8 | 2.2 | 1.2 | 0.8 |
| 30 | 510 737 | 4.1 | 0.8 | 94 | 210 | 151 | 378 | 587 | 1.8 | 2.2 | 1.2 | 0.8 |
| 31 | 510 737 | 4.1 | 0.8 | 94 | 210 | 151 | 378 | 587 | 1.8 | 2.2 | 1.2 | 0.8 |
| 32 | 510 737 | 4.1 | 0.8 | 94 | 210 | 151 | 378 | 587 | 1.8 | 2.2 | 1.2 | 0.8 |

| SMPL ID 3036-72 3067-28 | BOIL WATER SHRINK | SPIN RATE (1–8) | PACK PRESS (psig) | PROCESS CONDITIONS | | | | |
|---|---|---|---|---|---|---|---|---|
| | | | | Tput Capillary (g/min/hole) | MT (C) | Air gun (psig) | Diam (um) | Fvel (mpm) |
| 1 | 15 | 3.4 | 448 | 0.8 | 240 | 80 | 17.5 | 2857 |
| 2 | 13 | 2.5 | 318 | 0.8 | 240 | 80 | 13.9 | 3406 |
| 3 | 12 | 2.6 | 440 | 0.8 | 240 | 80 | 15.3 | 3757 |
| 4 | 10 | 3.5 | 325 | 0.8 | 240 | 80 | 18.4 | 1942 |
| 5 | 11 | 3.7 | 475 | 0.8 | 240 | 80 | 18.5 | 2556 |
| 5 (dup) | 13 | 3.6 | 466 | 0.8 | 240 | 80 | 19.6 | 2270 |
| 6 | 11 | 2.7 | 340 | 0.8 | 240 | 80 | 13.6 | 3532 |
| 7 | 11 | 2.7 | 467 | 0.8 | 240 | 80 | 16.8 | 3107 |
| 8 | 10 | 3.6 | 358 | 0.8 | 240 | 80 | 16.8 | 2322 |
| 9 | 10 | 3.4 | 245 | 0.8 | 240 | 80 | 14.8 | 3016 |
| 10 | 15 | 3.8 | 243 | 0.8 | 240 | 80 | 15.5 | 2731 |
| 11 | 18 | 4.2 | 327 | 0.8 | 240 | 80 | 18 | 2709 |
| 12 | 10 | 3.6 | 341 | 0.8 | 240 | 80 | 15.9 | 3443 |
| 13 | 12 | 2.1 | 662 | 0.8 | 240 | 80 | 16.5 | 3225 |
| 13 (dup) | 12 | 2.2 | 688 | 0.8 | 240 | 80 | 18.4 | 2590 |
| 14 | 12 | 1.9 | 557 | 0.8 | 240 | 80 | 15.9 | 2582 |
| 15 | 11 | 3.2 | 684 | 0.8 | 240 | 80 | 19.3 | 2361 |
| 16 | 11 | 3.4 | 588 | 0.8 | 240 | 80 | 17.7 | 2097 |
| 17 | 12 | 7 | 166 | 0.8 | 250 | 80 | 14.7 | 4026 |
| 18 | 53 | 6.5 | 152 | 0.8 | 250 | 80 | 18.9 | 2422 |
| 19 | 10 | 7 | 94 | 0.8 | 250 | 80 | 15.4 | 2755 |
| 20 | 40 | 6.3 | 88 | 0.8 | 250 | 80 | 15.1 | 2847 |
| 21 | 11 | 8 | 110 | 0.8 | 250 | 80 | 13.2 | 3763 |
| 22 | 33 | 2.8 | 173 | 0.8 | 250 | 80 | 18.6 | 2503 |
| 23 | 11 | 2.4 | 169 | 0.8 | 250 | 80 | 15.3 | 3707 |
| 24 | 32 | 2.8 | 110 | 0.8 | 250 | 80 | 15.6 | 2802 |
| 25 | 48 | 3.1 | 70 | 0.8 | 250 | 80 | 15.6 | 2802 |
| 26 | 13 | 2.8 | 69 | 0.8 | 250 | 80 | 12.9 | 3928 |
| 27 | 54 | 3.7 | 105 | 0.8 | 250 | 80 | 17.1 | 2985 |
| 28 | 13 | 3.2 | 114 | 0.8 | 250 | 80 | 15.3 | 3692 |
| 29 | 9 | 3 | 351 | 0.8 | 250 | 80 | 17.8 | 2739 |
| 30 | 11 | 1.4 | 352 | 0.8 | 250 | 80 | 16.7 | 3108 |

TABLE 17-continued

| | | | | | | | | |
|---|---|---|---|---|---|---|---|---|
| 31 | 10 | 2.9 | 265 | 0.8 | 250 | 80 | 16.4 | 2411 |
| 32 | 10 | 2.5 | 268 | 0.8 | 250 | 80 | 14.6 | 3074 |

| SMPL ID | FILAMENT POLYMER PROPERTIES | | | | | | | | | | | | bire-fring- | crystal- |
|---|---|---|---|---|---|---|---|---|---|---|---|---|---|---|
| 3036-72 3067-28 | Mn $(10^3)$ | Mw $(10^3)$ | Mp $(10^3)$ | Mz $(10^3)$ | Mz + 1 $(10^3)$ | Mz/ Mw | Mw/ Mn | % D | % lac-tide | % M | % oli-gomers | % Add | ence $(10^3)$ | linity (/g) |
| 1 | 81.2 | 173 | 125 | 303 | 464 | 1.8 | 2.1 | 1.4 | 0.9 | 1.5 | 0.9 | | 12.9 | 29.9 |
| 2 | 78.4 | 167 | 121 | 292 | 452 | 1.8 | 2.1 | 1.4 | 0.9 | 1.4 | 0.8 | | 10.8 | 25.0 |
| 3 | 78 | 169 | 124 | 297 | 157 | 1.8 | 2.2 | 1.4 | 0.9 | 1.4 | 1 | | 11.7 | 29.1 |
| 4 | 48.6 | 164 | 119 | 291 | 459 | 1.8 | 2.1 | 1.4 | 1.1 | 1.3 | 1 | | 11.6 | 34.6 |
| 5 | 81.3 | 172 | 124 | 299 | 460 | 1.7 | 2.1 | 1.5 | 0.9 | 1.4 | 0.9 | | 12.0 | 29.5 |
| 5 (dup) | 80.7 | 170 | 122 | 294 | 449 | 1.7 | 2.1 | 1.5 | 0.9 | 1.4 | 0.8 | | 12.7 | 30.5 |
| 6 | 77.4 | 164 | 118 | 289 | 452 | 1.8 | 2.1 | 1.5 | 1.1 | 1.3 | 0.8 | | 11.4 | 29.3 |
| 7 | 81.3 | 169 | 124 | 298 | 469 | 1.8 | 2.1 | 1.5 | 0.9 | 1.3 | 0.8 | | 12.4 | 29.3 |
| 8 | 77.7 | 162 | 114 | 282 | 430 | 1.7 | 2.1 | 1.5 | 1.1 | 1.4 | 0.7 | | 13.2 | 32.0 |
| 9 | 73.7 | 152 | 115 | 260 | 396 | 1.7 | 2.1 | 1 | 0.9 | 1.6 | 0.7 | | 13.1 | 30.7 |
| 10 | 74 | 152 | 110 | 259 | 389 | 1.7 | 2.1 | 1 | 1.0 | 1.6 | 0.8 | | 12.4 | 31.0 |
| 11 | 73.9 | 153 | 108 | 273 | 454 | 1.8 | 2.1 | 1 | 1.0 | 1.4 | 0.8 | | 12.7 | 30.0 |
| 12 | 74 | 154 | 113 | 263 | 398 | 1.7 | 2.1 | 1 | 0.9 | 1.5 | 0.8 | | 13.2 | 35.6 |
| 13 | 87.7 | 195 | 137 | 361 | 590 | 1.9 | 2.2 | 0.9 | 0.5 | 0.9 | 1.1 | 0.7 | 8.9 | 22.5 |
| 13 (dup) | 92 | 199 | 144 | 359 | 566 | 1.8 | 2.2 | 0.9 | 0.3 | 1.2 | 0.4 | | 9.2 | 23.4 |
| 14 | 88.2 | 197 | 143 | 355 | 558 | 1.8 | 2.2 | 0.9 | 0.6 | 0.9 | 1.2 | 0.9 | 7.8 | 19.7 |
| 15 | 86.9 | 194 | 139 | 356 | 572 | 1.8 | 2.2 | 0.9 | 0.3 | 1 | 0.9 | 0.7 | 11.0 | 29.1 |
| 16 | 80.3 | 188 | 136 | 348 | 558 | 1.9 | 2.3 | 0.9 | 0.3 | 0.8 | 2 | 1 | 9.8 | 24.8 |
| 17 | 75.6 | 157 | 115 | 274 | 425 | 1.7 | 2.1 | 1.5 | 1.0 | 1.5 | 0.4 | | 13.5 | 30.5 |
| 18 | 75.2 | 155 | 109 | 267 | 405 | 1.7 | 2.1 | 1.5 | 1.0 | 1.5 | 0.7 | | 10.9 | 28.9 |
| 19 | 72.8 | 152 | 110 | 260 | 394 | 1.7 | 2.1 | 1.5 | 1.2 | 1.7 | 1.71.1 | | 12.0 | 30.8 |
| 20 | 71.1 | 150 | 106 | 259 | 393 | 1.7 | 2.1 | 1.5 | 1.1 | 1.3 | 1.31.1 | | 11.4 | 28.2 |
| 21 | 75.7 | 157 | 117 | 270 | 406 | 1.7 | 2.1 | 1.4 | 1.2 | 1.8 | 0.9 | | 13.5 | 30.1 |
| 22 | 77.2 | 162 | 119 | 279 | 424 | 1.7 | 2.1 | 1.4 | 1.0 | 1.7 | 1 | | 11.8 | 28.7 |
| 23 | 73.6 | 159 | 114 | 279 | 433 | 1.8 | 2.2 | 1.4 | 1.0 | 1.5 | 1.3 | | 14.5 | 32.8 |
| 24 | 74.2 | 158 | 116 | 268 | 406 | 1.7 | 2.1 | 1.4 | 1.1 | 1.7 | 0.8 | | 12.3 | 26.1 |
| 25 | 68.4 | 141 | 102 | 237 | 348 | 1.7 | 2.1 | 1 | 1.3 | 1.8 | 0.9 | | 10.4 | 25.2 |
| 26 | 67.9 | 140 | 100 | 241 | 367 | 1.7 | 2.1 | 1 | 1.2 | 1.7 | 0.9 | | 14.3 | 29.9 |
| 27 | 69.5 | 144 | 106 | 248 | 380 | 1.7 | 2.1 | 1 | 0.9 | 1.5 | 1 | | 10.3 | 25.8 |
| 28 | 70.9 | 146 | 109 | 348 | 372 | 1.7 | 2.1 | 1 | 1.0 | 1.7 | 0.9 | | 13.3 | 35.3 |
| 29 | 85.4 | 188 | 136 | 342 | 538 | 1.8 | 2.2 | 0.9 | 0.4 | 1 | 0.8 | 1 | 13.1 | 29.4 |
| 30 | 85.9 | 187 | 128 | 352 | 615 | 1.9 | 2.2 | 0.9 | 0.3 | 0.8 | 0.9 | 1 | 12.1 | 28.5 |
| 31 | 87.3 | 188 | 136 | 339 | 533 | 1.8 | 2.2 | 0.9 | 0.5 | 1 | 0.6 | 1 | 12.5 | 28.3 |
| 32 | 85.4 | 186 | 135 | 339 | 541 | 1.8 | 2.2 | 0.9 | 0.4 | 1 | 1.2 | 1 | 10.0 | 28.4 |

It will be understood that even though these numerous characteristics and advantages of the invention have been set forth in the foregoing description, together with details of the structure and function of the invention, the disclosure is illustrative only, and changes may be made in detail, especially in matters of shape, size and arrangement of the parts or in the sequence or the timing of the steps, within the broad principle of the present invention to the full extent indicated by the broad general meaning of the terms in which the appended claims are expressed.

We claim:

1. A fibrous material comprising:
   a plurality of polylactide containing fibers prepared from a polylactide composition containing polylactide having less than about 5 wt. % R-lactic acid residues, a lactide concentration of less than about 0.5 wt. %, and a number average molecular weight of between about 25,000 and about 150,000;
   said plurality of polylactide containing fibers exhibiting a crystallinity of greater than 20 J/g, a tenacity of greater than 1.5 grams/denier, and an average fiber boiling water shrinkage propensity of less than about 15%; and
   wherein said plurality of polylactide containing fibers are prepared by spunbonding the polylactide composition at a fiber velocity of between about 1,000 and about 10,000 m/min., a throughput of between about 0.3 and about 3 g/min/capillary, and a temperature of between about 200° C. and about 250° C. and are deposited as a web.

2. A fibrous material according to claim 1, wherein the polylactide containing fibers are prepared from polylactide containing less than about 1 wt % R-lactic acid residues.

3. A fibrous material according to claim 1, wherein said plurality of polylactide containing fibers exhibit a birefringence of between about 0.017 and about 0.012.

4. A fibrous material according to claim 1, wherein said plurality of polylactide containing fibers exhibit a tenacity of greater than about 5 grams/denier.

5. A fibrous material according to claim 1, wherein the plurality of polylactide containing fibers are monocomponent fibers comprising at least about 50%, by weight, polylactide polymer.

6. A fibrous material according to claim 1, wherein the plurality of polylactide containing fibers are monocomponent fibers comprising a blend of polylactide polymer and non-polylactide polymer.

7. A fibrous material according to claim 4, wherein the non-polylactide containing polymer is a polymer selected from the group consisting of polyolefins, polyamides, polyesters, blends thereof, alloys thereof, and copolymers thereof.

8. A fibrous material according to claim 1, wherein the fibrous material is provided as a calendered nonwoven product.

9. A fibrous material according to claim 1, wherein the fibrous material is provided as a heat bonded nonwoven product.

10. A fibrous material according to claim 1, wherein the plurality of polylactide containing fibers are multicomponent fibers comprising a first component comprising polylactide polymer and a second component comprising polylactide polymer or non-polylactide polymer.

11. A fibrous material according to claim 10, wherein the second component comprises a non-lactide polymer selected from the group consisting of polyolefins, polyamides, polyesters, blends thereof, alloys thereof, and copolymers thereof.

12. A fibrous material according to claim 10, wherein the multicomponent fiber is provided in a sheath/core construction comprising a sheath component exterior to a core component.

13. A fibrous material according to claim 12, wherein the first component comprising a polylactide polymer is provided as the sheath component of the sheath/core construction.

14. A fibrous material according to claim 1, further comprising a plurality of non-polylactide containing fibers.

15. A fibrous material according to claim 10, wherein the first component is provided as the core component of the sheath/core construction.

16. A fibrous material according to claim 15, wherein the second is provided as the sheath component and comprises polylactide polymer.

17. A fibrous material according to claim 16, wherein the polyactide polymer of the core component is provided with an enantiomeric purity which is greater than the enantiomeric purity of the polylactide polymer of the sheath component.

18. A fibrous material according to claim 10, wherein the multicomponent fiber is provided in a construction selected from the group consisting of side-by-side, construction, segmented pie construction, and islands-in-sea construction.

19. A fibrous material according to claim 10, wherein the first component comprises a bend of polyactide polymer and non-polylactide polymer.

20. A fibrous material according to claim 1, wherein the plurality of polylactide containing fibers are provided as a woven material.

21. A fibrous material according to claim 1, wherein said polylactide containing fibers have a crystallinity of greater than 25 J/g.

22. A fibrous material comprising:
a plurality of polylactide containing fibers prepared from a polylactide composition containing polylactide having less than about 3 wt. % R-lactic acid residues, a lactide concentration of less than about 0.5 wt. %, and a number average molecular weight of between about 25,000 and about 150,000;
said plurality of polylactide containing fibers exhibiting a crystallinity of greater than 20 J/g, a tenacity of greater than 1.5 grams/denier, and an average fiber boiling water shrinkage propensity of less than about 15%; and
wherein said plurality of polylactide containing fibers are prepared by spunbonding the polylactide composition at a fiber velocity of at least about 1,000 m/min., a throughput of between about 0.3 and about 3 g/min/capillary, and a temperature of between about 200° C. and about 250° C. and are deposited as a web.

23. A fibrous material according to claim 22, wherein said plurality of polylactide containing fibers exhibit a birefringence of between about 0.017 and about 0.012.

24. A fibrous material according to claim 22, wherein said plurality of polylactide containing fibers exhibit a tenacity of greater than about 5 grams/denier.

25. A multicomponent fiber comprising a first component and a second component,
said first component comprising polylactide composition containing polylactide having less than about 5 wt. % R-lactic acid residues, a lactide concentration of less than about 0.5 wt. %, and a number average molecular weight of between about 25,000 and about 150,000;
wherein said multicomponent fiber being prepared by spunbonding the polylactide composition at a fiber velocity of at least about 1,000 m/min., a throughput of between about 0.3 and about 3 g/min/capillary, and a temperature of between about 200° C. and about 250° C. and are deposited as a web.

26. A method for preparing low shrink polylactide containing fibers, the method comprising a step of:
(a) spunbonding a polylactide composition at a fiber velocity of at least about 1,000 m/min., a throughput of between about 0.3 and about 3 g/min/capillary, and a temperature of between about 200° C. and about 250° C. to provide a plurality of polylactide containing fibers exhibiting a crystallinity of greater than 20 J/g, a tenacity of greater than 1.5 grams/denier, and an average fiber boiling water shrinkage propensity of less than about 15%; wherein said polylactide composition comprises polylactide containing less than about 3 wt. % R-lactic acid residues, a lactide concentration of less than about 0.5 wt. %, and having a number average molecular weight of between about 25,000 and about 150,000;
(b) depositing the plurality of polylactide containing fibers as a web.

27. A method according to claim 26, wherein the plurality of polylactide containing fibers are monocomponent fibers comprising at least about 50%, by weight, polylactide polymer.

28. A method according to claim 26, wherein the plurality of polylactide containing fibers are provided as a heat bonded nonwoven product.

29. A method according to claim 26, wherein the plurality of polylactide containing fibers are multicomponent fibers comprising a first component comprising polylactide polymer and a second component comprising polylactide polymer or non-polylactide polymer.

30. A method according to claim 29, wherein the second component comprises a non-lactide polymer selected from the group consisting of polyolefins, polyamides, polyesters, blends thereof, alloys thereof, and copolymers thereof.

31. A method according to claim 29, wherein the multicomponent fiber is provided in a sheath/core construction comprising a sheath component exterior to a core component.

32. A method according to claim 31, wherein the first component comprising a polylactide polymer is provided as the sheath component of the sheath/core construction.

33. A method according to claim 26, further comprising providing a plurality of non-polylactide containing fibers.

34. A method according to claim 31, wherein the first component is provided as the core component of the sheath/core construction.

35. A method according to claim 34, wherein the second is provided as the sheath component and comprises polylactide polymer.

36. A method according to claim 35, wherein the polylactide polymer of the core component is provided with an enantiomeric purity which is greater than the enantiomeric purity of the polylactide polymer of the sheath component.

37. A method according to claim 29, wherein the multicomponent fiber is provided in a construction selected from the group consisting of side-by-side construction, segmented pie construction, and island-in-sea construction.

38. A method according to claim 29, wherein the first component comprises a bend of polylactide polymer and non-polylactide polymer.

39. A method according to claim 26, wherein the plurality of polylactide containing fibers have a crystallinity of greater than 25 J/g.

40. A method according to claim 26, wherein the plurality of polylactide containing fibers are prepared from polylactide containing less than about 1 wt % R-lactic acid residues.

41. A method according to claim 26, wherein the plurality of polylactide containing fibers exhibit a birefringente of between about 0.017 and about 0.012.

42. A method according to claim 26, wherein the plurality of polylactide containing fibers exhibit a tenacity of greater than about 5 grams/denier.

43. A method according to claim 26, wherein the step of spunbonding further comprises drawing the plurality of polylactide containing fibers in an air attenuator.

44. A method according to claim 26, further comprising a step of:
   (a) bonding the fibers together.

45. A method according to claim 26, further comprising a step of:
   (a) bonding the fibers in the web by at least one of needle punching, stitch bonding, and hydro entanglement.

46. A method according to claim 26, further comprising a step of:
   (a) bonding the fibers in the web by at least one of melting the fibers and by chemical bonding.

47. A multicomponent fiber according to claim 25, wherein the second component comprises at least one of polycaprolactone, polypropylene, and polyethylene terephthalate.

48. A multicomponent fiber according to claim 25, wherein the second component comprises a polylactide composition different from the first component.

49. A fibrous material according to claim 1, wherein said plurality of polylactide containing fibers are prepared by spunbonding the polylactide composition at a fiber velocity of between about 1,000 and about 3,000 m/min, a throughput of between about 0.5 and 1.2 g/min/capillary and a temperature of between about 220° C and about 245° C.

50. A fibrous material according to claim 22, wherein said plurality of polylactide containing fibers are prepared by spunbonding the polylactide composition at a throughput of between about 0.3 and 3 g/min/capillary and a temperature of between 220° C and about 245° C.

51. A multicomponent fiber according to claim 25, wherein said multi component fiber is prepared by spunbonding the polylactide composition at a throughput of between about 0.5 and about 1.2 g/min/capillary and a temperature of between 220° C and about 245° C.

52. A method according to claim 26, wherein the step of spunbonding comprises spunbonding the polylactide composition at a throughput of between 0.5 and about 1.2 g/min/capillary and a temperature of between 220° C and about 245° C.

* * * * *